(12) United States Patent
Xiong

(10) Patent No.: US 12,164,759 B2
(45) Date of Patent: Dec. 10, 2024

(54) CONTROL MOVING METHOD AND ELECTRONIC DEVICE

(71) Applicant: HUAWEI TECHNOLOGIES CO., LTD., Guangdong (CN)

(72) Inventor: Liudong Xiong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/006,797

(22) PCT Filed: Jul. 26, 2021

(86) PCT No.: PCT/CN2021/108354
§ 371 (c)(1),
(2) Date: Jan. 25, 2023

(87) PCT Pub. No.: WO2022/022443
PCT Pub. Date: Feb. 3, 2022

(65) Prior Publication Data
US 2023/0280894 A1    Sep. 7, 2023

(30) Foreign Application Priority Data
Jul. 28, 2020 (CN) .......................... 202010739567.6

(51) Int. Cl.
*G06F 3/048* (2013.01)
*G06F 3/01* (2006.01)
*G06F 3/04845* (2022.01)

(52) U.S. Cl.
CPC .......... *G06F 3/04845* (2013.01); *G06F 3/013* (2013.01)

(58) Field of Classification Search
CPC ............................ G06F 3/013; G06F 3/04845
See application file for complete search history.

(56) References Cited

U.S. PATENT DOCUMENTS

| 2012/0032979 | A1 | 2/2012 | Blow et al. |
| 2017/0177079 | A1 | 6/2017 | George-Svahn et al. |
| 2017/0242479 | A1 | 8/2017 | Moravetz |
| 2018/0032816 | A1 | 2/2018 | Trapp et al. |
| 2018/0046352 | A1* | 2/2018 | Johnson .............. G06F 3/04812 |

(Continued)

FOREIGN PATENT DOCUMENTS

| CN | 104423870 A | 3/2015 |
| CN | 104461287 A | 3/2015 |

(Continued)

OTHER PUBLICATIONS

International Search Report and Written Opinion in International Appln. No. PCT/CN2021/108354, mailed on Nov. 1, 2021, 19 pages (with English translation).

(Continued)

*Primary Examiner* — Claudia Dragoescu
(74) *Attorney, Agent, or Firm* — Fish & Richardson P.C.

(57) ABSTRACT

The present disclosure relates to control moving method; and electronic device. In one example method, go electronic device determines an eyeball gaze location of a user on a display. When determining that duration of the eyeball gaze location in a first preset area continuously reaches first preset duration, the electronic device moves a floating control, so that the floating control is moved away from the eyeball gaze location.

20 Claims, 52 Drawing Sheets

(a)

(b)

(56) References Cited

U.S. PATENT DOCUMENTS

| | | | | |
|---|---|---|---|---|
| 2018/0284954 A1* | 10/2018 | Alcorn | ............. | G06F 3/0481 |
| 2019/0026589 A1* | 1/2019 | Sugihara | ............. | G06T 19/20 |
| 2021/0357023 A1* | 11/2021 | Muta | ............. | G06F 3/013 |
| 2021/0357028 A1* | 11/2021 | Moravetz | ............. | G06F 3/013 |

FOREIGN PATENT DOCUMENTS

| | | | |
|---|---|---|---|
| CN | 104915099 | A | 9/2015 |
| CN | 103052937 | B | 3/2016 |
| CN | 105631280 | A | 6/2016 |
| CN | 105718063 | A | 6/2016 |
| CN | 105765513 | A | 7/2016 |
| CN | 106527867 | A | 3/2017 |
| CN | 107908338 | A | 4/2018 |
| CN | 108089801 | A | 5/2018 |
| CN | 108182019 | A | 6/2018 |
| CN | 108449490 | A | 8/2018 |
| CN | 110362373 | A | 10/2019 |
| CN | 110435539 | A | 11/2019 |
| CN | 110489689 | A | 11/2019 |
| WO | 2014172656 | A1 | 10/2014 |
| WO | 2019224866 | A1 | 11/2019 |

OTHER PUBLICATIONS

Extended European Search Report in European Appln No. 21850076.7, dated Dec. 4, 2023, 9 pages.

* cited by examiner

Reflection point (a)                    (b)

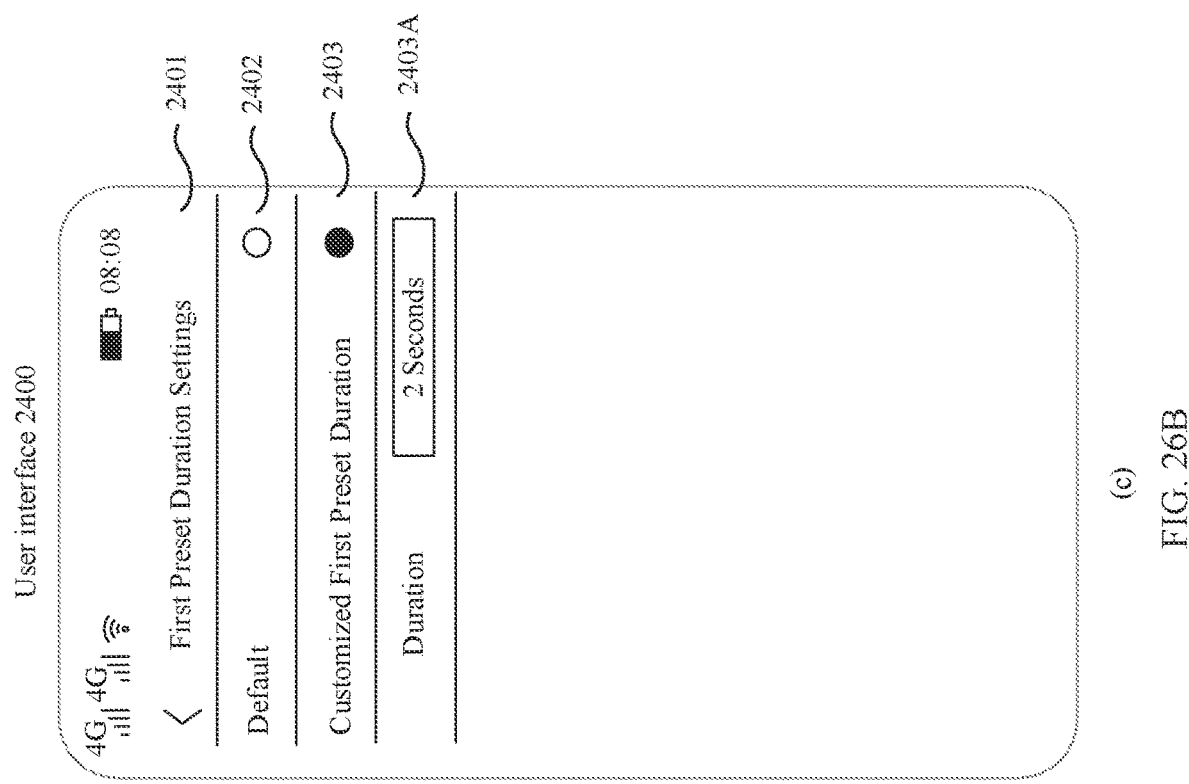

CONTROL MOVING METHOD AND ELECTRONIC DEVICE

CROSS-REFERENCE TO RELATED APPLICATIONS

This application is a national stage of International Application No. PCT/CN2021/108354, filed Jul. 26, 2021, which claims priority to Chinese Patent Application No. 202010739567.6, filed Jul. 28, 2020. Both of the aforementioned applications are hereby incorporated by reference in their entireties.

TECHNICAL FIELD

This application relates to the field of terminal and communications technologies, and in particular, to a control moving method and an electronic device.

BACKGROUND

A floating action button (floating action button, FAB), or a floating control, is a common control in a terminal application, and is one of key elements in interaction in a user interface of a system.

The floating control can make a user interface layout more flexible, and is applicable to a case in which a control needs to stay on a screen for a long time. However, the floating control is usually located at a top layer of a user interface, and therefore definitely blocks some lower-layer content or controls. When a user expects to read the lower-layer content or operate the lower-layer controls, the content or the control is blocked by the floating control, which affects reading experience and operation experience.

SUMMARY

This application provides a control moving method and an electronic device, so that a floating control can be normally used without affecting reading and an operation of a user.

According to a first aspect, this application provides a control moving method. The method includes: An electronic device determines an eyeball gaze location of a user on a display. When the electronic device determines that the eyeball gaze location of the user enters a first preset area, the electronic device determines whether duration of the eyeball gaze location in the first preset area continuously reaches first preset duration, where the first preset area is a preset size of area that surrounds a floating control but does not include the floating control on the display. The electronic device moves the floating control when the electronic device determines that the duration of the eyeball gaze location in the first preset area continuously reaches the first preset duration, so that the floating control is away from the eyeball gaze location.

In the foregoing embodiment, when determining that the eyeball gaze location of the user on the display is in the first preset area and the duration of the eyeball gaze location of the user on the display in the first preset area reaches the first preset duration, the electronic device may determine that the floating control may block content that is to be read by the user. In this case, the electronic device may move the floating control, so that the floating control is away from the current eyeball gaze location of the user. Therefore, the user no longer needs to manually move the floating control frequently to prevent the floating control from blocking the content that is to be read, which causes reading experience to deteriorate. The electronic device automatically moves the floating control based on a reading location of the user, to prevent the floating control from blocking the content that is to be read by the user. In this way, the floating control can be normally used without affecting reading and an operation of the user, which greatly improves the reading experience of the user.

With reference to some embodiments of the first aspect, in some embodiments, the first preset area is the preset size of area that surrounds the floating control but does not include the floating control on the display.

In the foregoing embodiment, the first preset area surrounds the floating control on the display, and the eyeball gaze location approaching the floating control in all directions may cause the floating control to move.

With reference to some embodiments of the first aspect, in some embodiments, the first preset area is an area that does not include the floating control in a second preset area on the display, and the second preset area surrounds the floating control and a center of the second preset area moves along with the floating control.

In the foregoing embodiment, the first preset area is the area that does not include the floating control in the second preset area on the display. Therefore, the first preset area can change with a change of a location of the floating control on the display, so that a range of the first preset area is more flexible.

With reference to some embodiments of the first aspect, in some embodiments, the first preset area does not surround the floating control, and a boundary of the first preset area is in contact with or not in contact with a boundary of the floating control.

In the foregoing embodiment, the first preset area does not surround the floating control, to avoid meaningless moving of the floating control caused by setting the first preset area at an unnecessary location.

With reference to some embodiments of the first aspect, in some embodiments, a location of the first preset area changes with a change of a location of the floating control on the display.

In the foregoing embodiment, the location of the first preset area changes with the change of the location of the floating control on the display, so that a range of the first preset area better meets a user requirement.

With reference to some embodiments of the first aspect, in some embodiments, after the step in which the electronic device determines the eyeball gaze location of the user on the display, and before the step in which the electronic device moves the floating control, the method further includes: The electronic device determines whether the floating control blocks content displayed in a first window, where the first window is a window below the floating control displayed on the display. That the electronic device moves the floating control when the electronic device determines that the duration of the eyeball gaze location in the first preset area continuously reaches the first preset duration, so that the floating control is away from the eyeball gaze location specifically includes: The electronic device moves the floating control when the electronic device determines that the duration of the eyeball gaze location in the first preset area continuously reaches the first preset duration, and the floating control blocks the content displayed in the first window, so that the floating control is away from the eyeball gaze location.

In the foregoing embodiment, the floating control moves only when the floating control blocks the content displayed on the display, which avoids distracting attention of the user due to meaningless moving of the floating control.

With reference to some embodiments of the first aspect, in some embodiments, the floating control and the first window belong to a same application; and that the electronic device determines whether the floating control blocks content displayed in a first window specifically includes: The application to which the floating control and the first window belong in the electronic device determines whether the floating control blocks the content displayed in the first window.

In the foregoing embodiment, when the floating control and the first window belong to the same application, the application may directly determine whether the floating control blocks the displayed content, and complete a following moving operation without feeding back to a system layer, to improve processing efficiency.

With reference to some embodiments of the first aspect, in some embodiments, the floating control and the first window do not belong to a same application; and that the electronic device determines whether the floating control blocks content displayed in a first window specifically includes: The electronic device obtains a location area of the floating control from an application to which the floating control belongs; the electronic device determines whether an application to which the first window belongs displays content in the location area of the floating control; and when the electronic device determines that the application to which the first window belongs displays the content in the location area of the floating control, the electronic device determines that the floating control blocks the content displayed in the first window; or when the electronic device determines that the application to which the first window belongs does not display the content in the location area of the floating control, the electronic device determines that the floating control does not block the content displayed in the first window.

In the foregoing embodiment, when the floating control and the first window do not belong to the same application, the electronic device may determine whether the floating control blocks the content in the first window, to improve adaptability to a running environment.

With reference to some embodiments of the first aspect, in some embodiments, before the step in which the electronic device determines whether the floating control blocks the content displayed in the first window, the method further includes: The electronic device enables a first function in response to a first operation of the user, where the first function is used to move the floating control only when the floating control blocks the displayed content; or is to not move the floating control when the floating control does not block the displayed content.

In the foregoing embodiment, the first function is enabled only after the user operation is performed, to improve interaction performance of the electronic device.

With reference to some embodiments of the first aspect, in some embodiments, that the electronic device moves the floating control, so that the floating control is away from the eyeball gaze location specifically includes: The electronic device moves the floating control, so that the first preset area no longer covers the eyeball gaze location.

In the foregoing embodiment, the electronic device moves the floating control, so that the first preset area no longer covers the eyeball gaze location, to avoid continuously triggering moving of the floating control in a short time, and reduce power consumption of the electronic device.

With reference to some embodiments of the first aspect, in some embodiments, that the electronic device moves the floating control, so that the floating control is away from the eyeball gaze location specifically includes: The electronic device determines whether a first blank area exists on the display, where the first blank area does not display content and can accommodate the floating control. The electronic device moves the floating control to the first blank area when determining that the first blank area exists on the display; or the electronic device moves the floating control when determining that the first blank area does not exist on the display, so that the first preset area no longer covers the eyeball gaze location.

In the foregoing embodiment, the electronic device preferentially moves the floating control to the blank area on the display, to avoid blocking the displayed content by the floating control again, and reduce power consumption of the electronic device.

With reference to some embodiments of the first aspect, in some embodiments, before the step in which the electronic device determines the eyeball gaze location of the user on the display, the method further includes: The electronic device enables a second function in response to a second operation of the user, where the second function is used to move the floating control when the duration of the eyeball gaze location in the first preset area continuously reaches the first preset duration.

In the foregoing embodiment, the electronic device determines, only when the user enables the second function, whether to move the floating control, to improve interaction performance of the electronic device.

According to a second aspect, an embodiment of this application provides an electronic device. The electronic device includes one or more processors, a memory, and a display. The memory is coupled to the one or more processors, the memory is configured to store computer program code, the computer program code includes computer instructions, and the one or more processors invoke the computer instructions to enable the electronic device to perform the following operations: determining an eyeball gaze location of a user on the display; when determining that the eyeball gaze location of the user enters a first preset area, determining whether duration of the eyeball gaze location in the first preset area continuously reaches first preset duration, where the first preset area is a preset size of area that surrounds a floating control but does not include the floating control on the display; and moving the floating control when determining that the duration of the eyeball gaze location in the first preset area continuously reaches the first preset duration, so that the floating control is away from the eyeball gaze location.

In the foregoing embodiment, when determining that the eyeball gaze location of the user on the display is in the first preset area and the duration of the eyeball gaze location of the user on the display in the first preset area reaches the first preset duration, the electronic device may determine that the floating control may block content that is to be read by the user. In this case, the electronic device may move the floating control, so that the floating control is away from the current eyeball gaze location of the user. Therefore, the user no longer needs to manually move the floating control frequently to prevent the floating control from blocking the content that is to be read, which causes reading experience to deteriorate. The electronic device automatically moves the floating control based on a reading location of the user, to prevent the floating control from blocking the content that is to be read by the user. In this way, the floating control can be normally used without affecting reading and an operation of the user, which greatly improves the reading experience of the user.

With reference to some embodiments of the second aspect, in some embodiments, the first preset area is the preset size of area that surrounds the floating control but does not include the floating control on the display.

With reference to some embodiments of the second aspect, in some embodiments, the first preset area is an area that does not include the floating control in a second preset area on the display, and the second preset area surrounds the floating control, and a center of the second preset area moves along with the floating control.

With reference to some embodiments of the second aspect, in some embodiments, the first preset area does not surround the floating control; and a boundary of the first preset area is in contact with or not in contact with a boundary of the floating control.

With reference to some embodiments of the second aspect, in some embodiments, a location of the first preset area changes with a change of a location of the floating control on the display.

With reference to some embodiments of the second aspect, in some embodiments, the one or more processors are further configured to invoke the computer instructions to enable the electronic device to perform the following operation: determining whether the floating control blocks content displayed in a first window, where the first window is a window below the floating control displayed on the display; and the one or more processors are specifically configured to invoke the computer instructions to enable the electronic device to perform the following operation: moving the floating control when determining that the duration of the eyeball gaze location in the first preset area continuously reaches the first preset duration, and the floating control blocks the content displayed in the first window, so that the floating control is away from the eyeball gaze location.

With reference to some embodiments of the second aspect, in some embodiments, the floating control and the first window belong to a same application, and the one or more processors are specifically configured to invoke the computer instructions to enable the electronic device to perform the following operation: enabling the application to which the floating control and the first window belong to determine whether the floating control blocks the content displayed in the first window.

With reference to some embodiments of the second aspect, in some embodiments, the floating control and the first window do not belong to a same application; and the one or more processors are specifically configured to invoke the computer instructions to enable the electronic device to perform the following operations: obtaining a location area of the floating control from an application to which the floating control belongs; determining whether an application to which the first window belongs displays content in the location area of the floating control; and when determining that the application to which the first window belongs displays the content in the location area of the floating control, determining that the floating control blocks the content displayed in the first window; or when determining that the application to which the first window belongs does not display the content in the location area of the floating control, determining that the floating control does not block the content displayed in the first window.

With reference to some embodiments of the second aspect, in some embodiments, the one or more processors are further configured to invoke the computer instructions to enable the electronic device to perform the following operation: enabling a first function in response to a first operation of the user, where the first function is used to move the floating control only when the floating control blocks the displayed content; or is to not move the floating control when the floating control does not block the displayed content.

With reference to some embodiments of the second aspect, in some embodiments, the one or more processors are specifically configured to invoke the computer instructions to enable the electronic device to perform the following operation: moving the floating control, so that the first preset area no longer covers the eyeball gaze location.

With reference to some embodiments of the second aspect, in some embodiments, the one or more processors are specifically configured to invoke the computer instructions to enable the electronic device to perform the following operations: determining whether a first blank area exists on the display, where the first blank area does not display content and can accommodate the floating control; and moving the floating control to the first blank area when determining that the first blank area exists on the display; or moving the floating control when determining that the first blank area does not exist on the display, so that the first preset area no longer covers the eyeball gaze location.

With reference to some embodiments of the second aspect, in some embodiments, the one or more processors are further configured to invoke the computer instructions to enable the electronic device to perform the following operation: enabling a second function in response to a second operation of the user, where the second function is used to move the floating control when the duration of the eyeball gaze location in the first preset area continuously reaches the first preset duration.

According to a third aspect, an embodiment of this application provides a chip system. The chip system is applied to an electronic device, the chip system includes one or more processors, and the processor is configured to invoke computer instructions to enable the electronic device to perform the method according to any one of the first aspect or the possible implementations of the first aspect.

It may be understood that the chip system may include a processor 110 in an electronic device 100 shown in FIG. 16, or may include a plurality of processors 110 in the electronic device 100 shown in FIG. 16. The chip system may further include one or more other chips, for example, may include an image signal processing chip in the camera 193 in the electronic device 100 shown in FIG. 16, or may include an image display chip on the display 194. This is not limited herein.

According to a fourth aspect, an embodiment of this application provides a computer program product including instructions. When the computer program product is run on an electronic device, the electronic device is enabled to perform the method according to any one of the first aspect or the possible implementations of the first aspect.

According to a fifth aspect, an embodiment of this application provides a computer-readable storage medium, including instructions. When the instructions are run on an electronic device, the electronic device is enabled to perform the method according to any one of the first aspect or the possible implementations of the first aspect.

It may be understood that the electronic device according to the second aspect, the chip system according to the third aspect, the computer program product according to the fourth aspect, and the computer storage medium according to the fifth aspect are all configured to perform the method provided in embodiments of this application. Therefore, for beneficial effects that can be achieved by the electronic device, the chip system, the computer program product, and the computer storage medium, refer to beneficial effects in the corresponding method. Details are not described herein again.

BRIEF DESCRIPTION OF DRAWINGS

FIG. 26A and FIG. 26B are another group of schematic diagrams of user interfaces according to an embodiment of this application;

DESCRIPTION OF EMBODIMENTS

Terms used in the following embodiments of this application are merely intended to describe specific embodiments, but are not intended to limit this application. Terms "one", "a", "the", "the foregoing", "this", and "the one" of singular forms used in this specification and the appended claims of this application are also intended to include plural forms, unless otherwise specified in the context clearly. It should be further understood that a term "and/or" used in this application indicates and includes any or all possible combinations of one or more listed items.

In the following descriptions, the terms "first" and "second" are merely intended for a purpose of description, and shall not be understood as an implication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more.

For ease of understanding, the following first describes related terms and concepts in embodiments of this application.

(1) Eye Tracking Technology

There are many researches on the eyeball tracking technology. Currently, common implementation principles of the eyeball tracking technology are as follows:

Principle 1: Perform tracking based on feature changes of an eyeball and around the eyeball.

Principle 2: Perform tracking based on an iris angle change.

Principle 3: Extract a feature by actively casting a beam such as infrared light on an iris.

These implementation principles are based on a fact that when human eyes look in different directions, some subtle changes occur in the eyes. These changes generate features that can be extracted. An electronic device may extract these features through image capture or scanning, to track an eye change in real time and determine an eyeball gaze location.

Main devices of the eyeball tracking technology may include an infrared device, or may be an image collection device. Even a camera on a common electronic device may also implement eyeball tracking with support of software.

Usually, eyeball tracking performed according to Principle 1 or Principle 2 is inferior to eyeball tracking performed according to Principle 3 in terms of tracking accuracy. The following briefly describes an eyeball tracking technology performed according to Principle 3.

Figure 1:
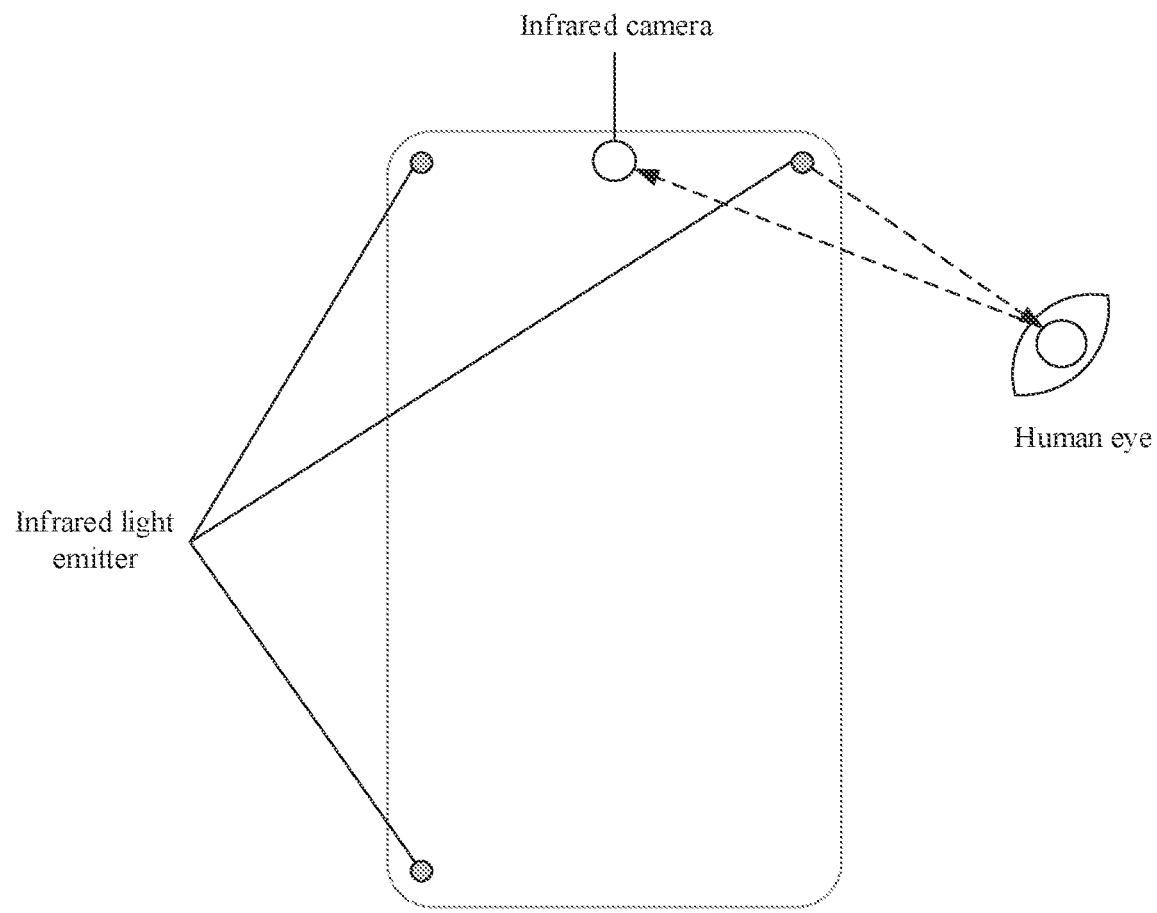
FIG. 1 is a schematic diagram of a scenario of an eyeball tracking technology according to an embodiment of this application.

For example, FIG. 1 is a schematic diagram of a scenario of an eyeball tracking technology according to an embodiment of this application. The eyeball tracking technology performed according to Principle 3 needs to include an infrared light emitter and an infrared camera in hardware. As shown in FIG. 1, three infrared light emitters and one infrared camera are installed on an electronic device. As shown by dashed line arrows in FIG. 1, when the infrared light emitter emits infrared light and the infrared light is reflected by human eyes, a video of emitting the infrared light is captured by the infrared camera.

Figure 2:
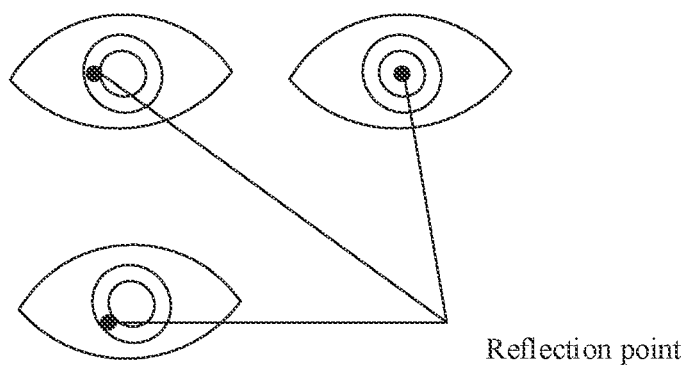
FIG. 2 is a schematic diagram of an effect of reflecting infrared light by an eyeball according to an embodiment of this application.

FIG. 2 is a schematic diagram of an effect of reflecting infrared light by an eyeball according to an embodiment of this application. Each time a user gazes at a location on a display, for each eye, the electronic device may obtain a group of locations of reflection points at which a pupil and a cornea reflect infrared light because the locations of the reflection points at which the eyeball reflects infrared light emitted by infrared light emitters at different locations on the electronic device are different.

Figure 3:
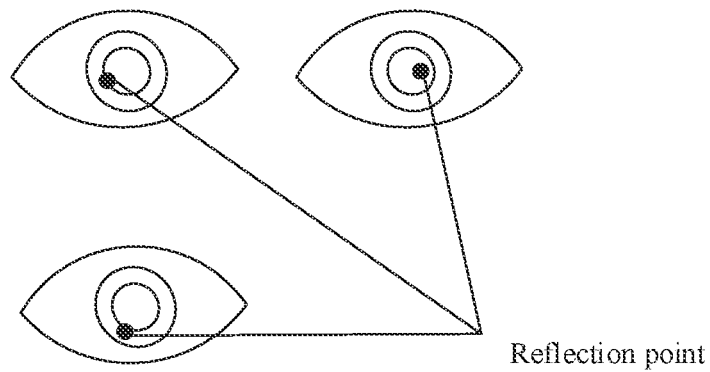
FIG. 3 is another schematic diagram of an effect of reflecting infrared light by an eyeball according to an embodiment of this application.

FIG. 3 is another schematic diagram of an effect of reflecting infrared light by an eyeball according to an embodiment of this application. When the eyeball of the user gazes at another location on the display, for each eye, the electronic device may obtain another group of locations of reflection points at which the pupil and the cornea reflect the infrared light. Because the user gazes at another location at this time, an angle of the eyeball changes slightly from a previous angle. The reflection points at which the pupil and the cornea of the user reflect the infrared light deviate from previous reflection points.

Figure 4:
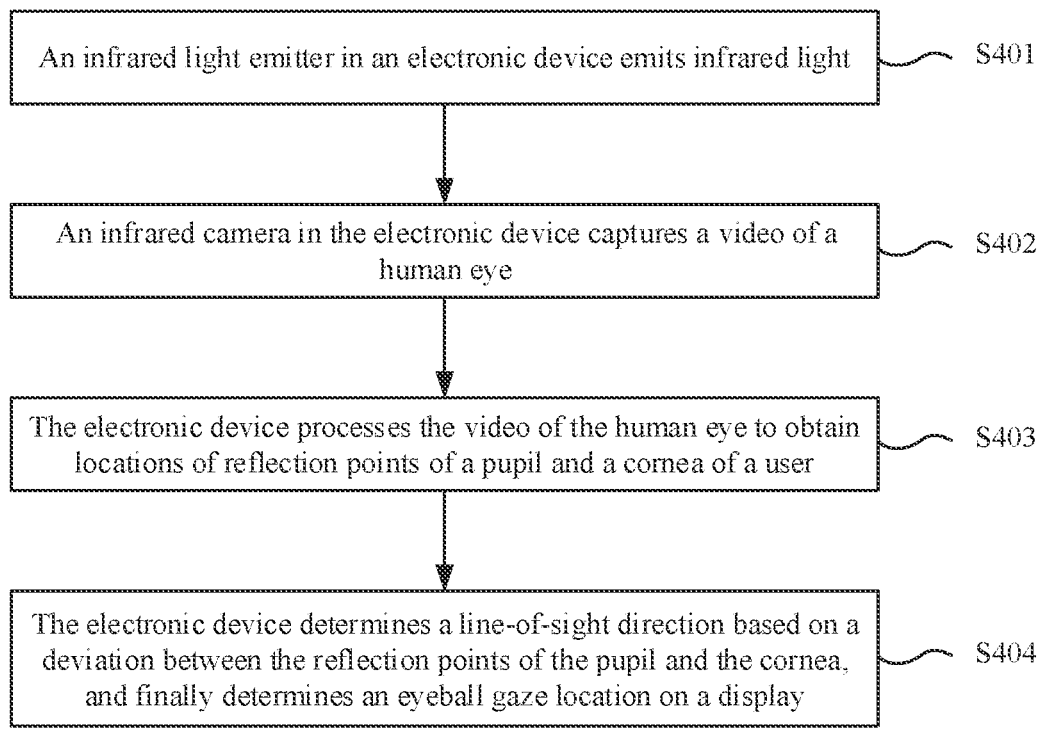
FIG. 4 is a schematic flowchart of an eyeball tracking technology according to an embodiment of this application.

The electronic device may perform the following information processing based on the infrared light reflected after entering the human eyes, to obtain an eyeball gaze location on the display of the electronic device. FIG. 4 is a schematic flowchart of an eyeball tracking technology according to an embodiment of this application.

S401: An infrared light emitter in an electronic device emits infrared light.

S402: An infrared camera in the electronic device captures a video of a human eye.

S403: The electronic device processes the video of the human eye to obtain locations of reflection points of a pupil and a cornea of a user.

S404: The electronic device determines a line-of-sight direction based on a deviation between the reflection points of the pupil and the cornea, and finally determines an eyeball gaze location on the display.

How to implement the eyeball tracking technology is not a focus of embodiments of this application. Therefore, a specific algorithm is not described in detail in embodiments of this application.

In embodiments of this application, a principle of the eyeball tracking technology to be used is not limited, provided that the eyeball gaze location of the user on the display can be finally determined by using the eyeball tracking technology. This is not limited herein.

Usually, after determining the eyeball gaze location by using the eyeball tracking technology, the electronic device may output coordinates of the eyeball gaze location on the display. It may be understood that a reference coordinate system of the coordinates may be a default coordinate system of the electronic device, or may be another coordinate system. If the reference coordinate system that outputs the coordinates is another coordinate system, the electronic device may also convert the reference coordinate system into the default coordinate system of the electronic device. This is not limited herein.

(2) Floating Control

A floating window, floating ball, and floating button are all floating controls.

The floating control can be classified into an in-app floating type and a system-level floating type.

A floating control of the in-app floating type is usually a floating control of an application. Usually, the floating control can be displayed on a display of an electronic device only when an interface of the application is displayed on the electronic device.

For example, a floating control a is a floating control of an application A, and the floating control a is of the in-app floating type. When an interface of the application A is displayed on the display of the electronic device, the floating control a is also displayed on the display of the electronic device. When the interface of the application A exits from the display of the electronic device, the floating control a exits from the display of the electronic device.

A floating control of the system-level floating type may be a floating control of an application, or may be a function of an operating system. The floating control is always displayed on the display of the electronic device no matter whether the display of the electronic device displays an operating system interface or an interface of an application.

For example, a floating control b is a floating control of an application B, and the floating control b is of the system-level floating type. When an interface of the application B is displayed on the display of the electronic device, the floating control b is also displayed on the display of the electronic device. When the interface of the application B exits from the display of the electronic device, the floating control b does not exit from the display of the electronic device, but continues to be displayed on the display of the electronic device.

Usually, the floating control complies with the following design principles:

1. An Appropriate Floating Control Size is Selected.

The floating control is mainly used to promote user behavior, and has moving behavior including deformation, startup, or anchor transmission. Therefore, the display size of the floating control should be appropriate.

2. The Floating Control Carries More Positive Operations.

The floating control usually carries a major and representative operation. Therefore, the floating control should usually perform a positive interaction, such as creation, sharing, and exploration. The floating control seldom performs destructive operations, such as deletion and archiving.

In addition, the operations carried by the floating control should not be an incomplete interaction. For example, cutting and pasting are a group of combined interactions, which should exist in a menu bar instead of being carried by the floating control.

3. Display of the Floating Control:

Usually, only one floating control is displayed on each page. Abuse of the floating control distracts attention of a user.

It may be understood that, in actual application, the floating control may completely or partially comply with the foregoing design principle, or may not comply with the foregoing design principle. This is not limited herein.

Figure 5:
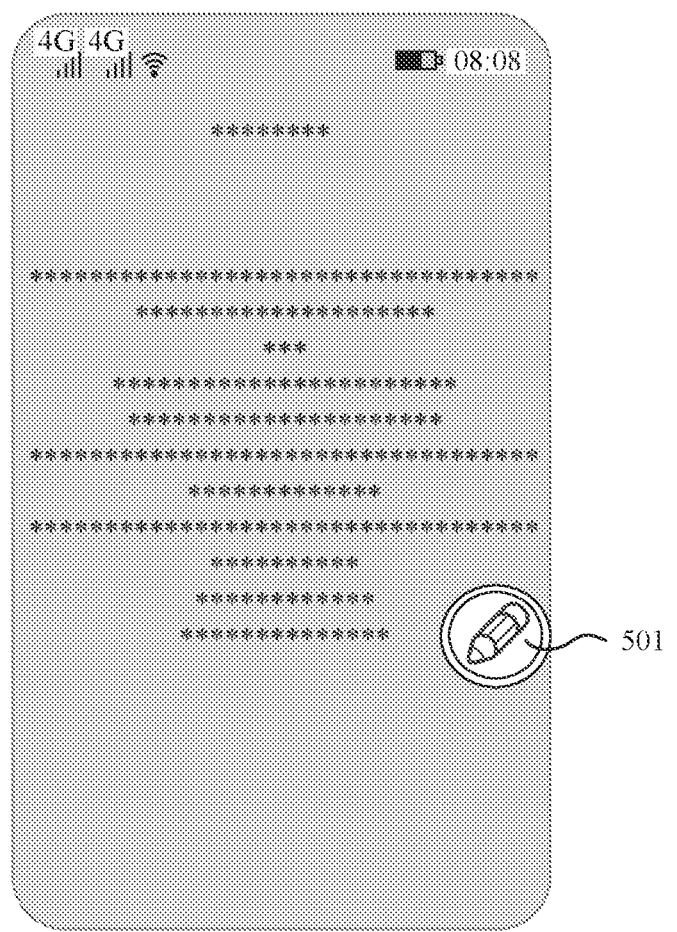
FIG. 5 is an example schematic diagram of a floating control according to an embodiment of this application.

The floating control is used in the following scenarios:

1. Important Operation Carrying on a Page:

In this scenario, the floating control can be a single button. For example, FIG. 5 is an example schematic diagram of a floating control according to an embodiment of this application. In response to an operation of tapping the floating control 501 by a user, an electronic device may open a new document writing page for the user to operate.

Figure 6:
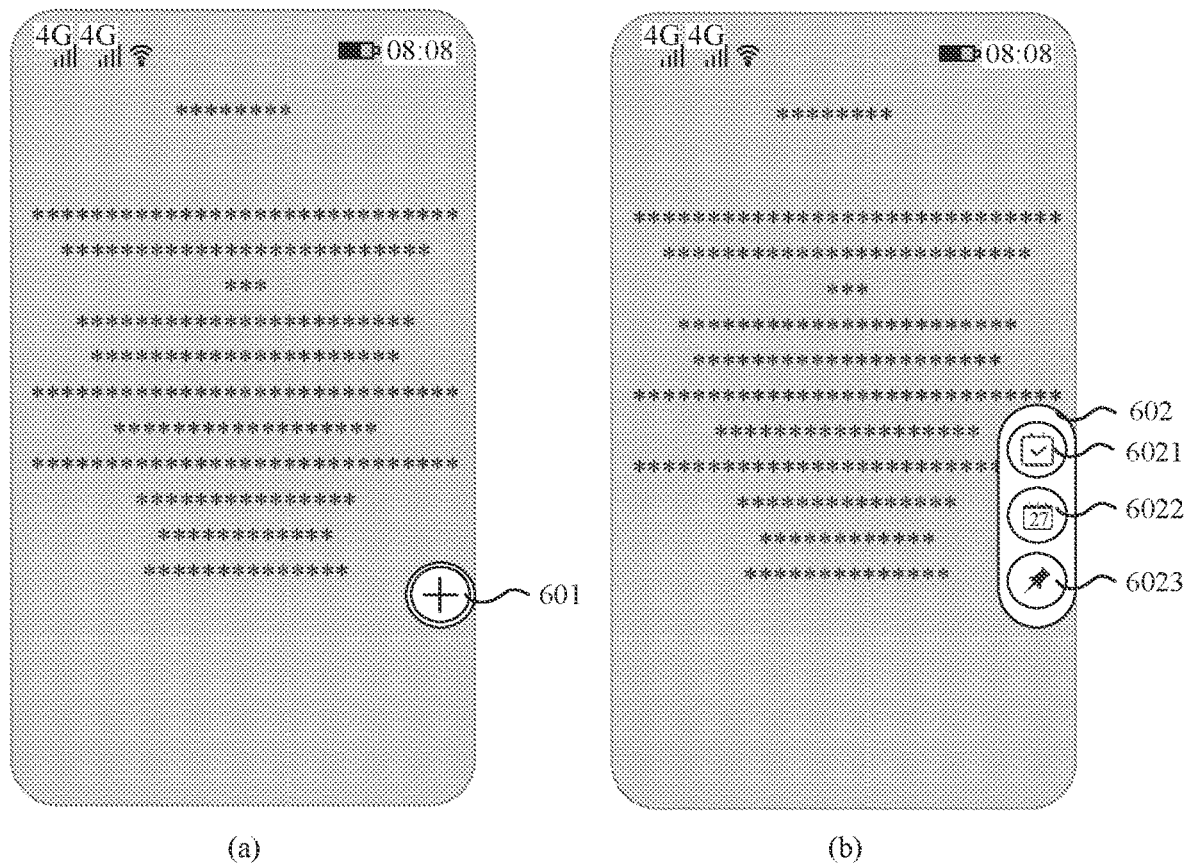
FIG. 6 is another example schematic diagram of a floating control according to an embodiment of this application.

The floating control may also be a group of buttons with related functions. For example, FIG. 6 is another example schematic diagram of a floating control according to an embodiment of this application. In a user interface shown in (a) in FIG. 6, in response to an operation of tapping a floating control 601 by a user, the floating control may be expanded into a floating control 602 in a user interface shown in (b) in FIG. 6. The floating control 602 may include a floating control 6021, a floating control 6022, and a floating control 6023. In response to an operation of tapping the floating control 6021 by the user, an electronic device may open a to-do list window. In response to an operation of tapping the floating control 6022 by the user, the electronic device may open a calendar window. In response to an operation of tapping the floating control 6023 by the user, the electronic device may fix the floating control 602 to an expanded state.

Figure 7:
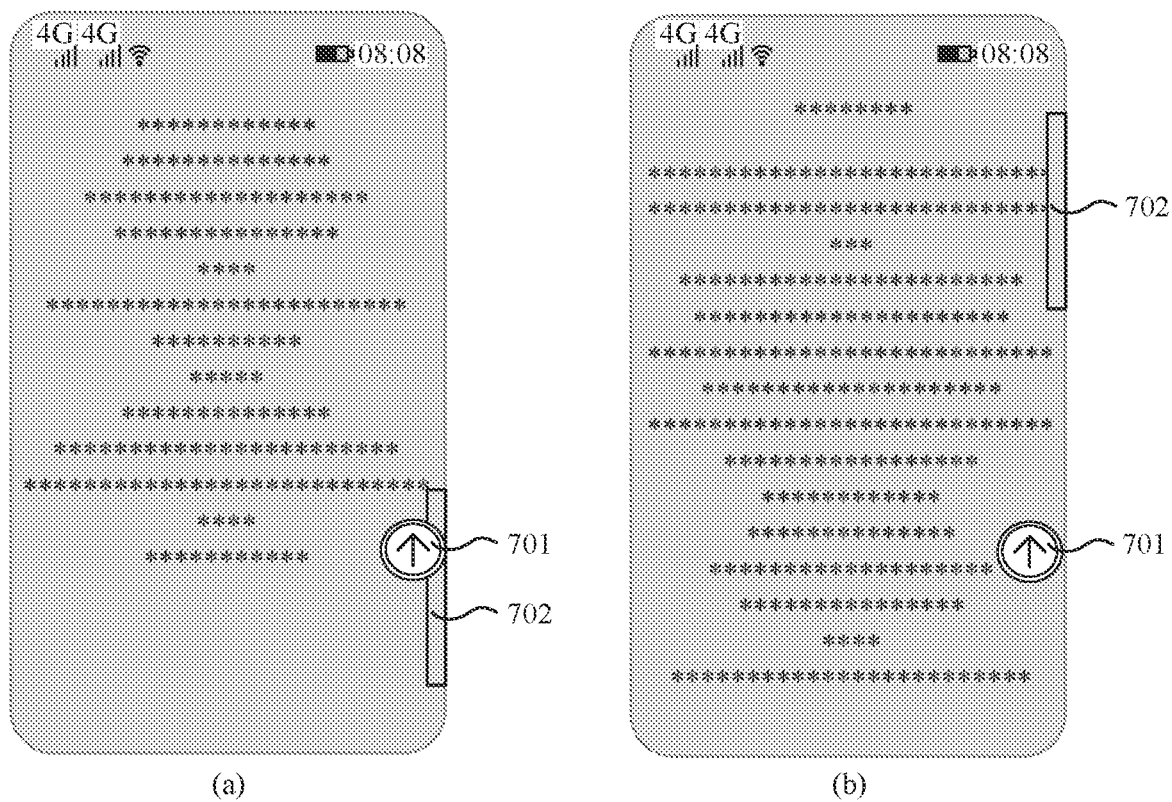
FIG. 7 is another example schematic diagram of a floating control according to an embodiment of this application.

2. Anchor Locating:

When browsing a long list page on a display of an electronic device, a requirement for returning to the top is encountered. In some current solutions, functions such as double tapping a status bar to return to the top, and double tapping a specific tag in a bottom tag bar to return to the top are usually unknown to the user because these functions are hidden well. In this case, the floating control may be used to implement the anchor locating. For example, FIG. 7 is another example schematic diagram of a floating control according to an embodiment of this application. In a user interface shown in (a) in FIG. 7, an interface progress slider 702 has reached the bottom of a page. In response to an operation of tapping a floating control 701 by a user, an electronic device returns the page to the top. As shown in (b) in FIG. 7, in this case, an interface slider 702 returns to the top of the page.

In addition to returning to the top, the floating control may also be used to implement another requirement for performing the anchor locating, for example, tapping to jump to a recommended location on a page, or tapping to jump to the bottom of a page. This is not limited herein.

Figure 8:
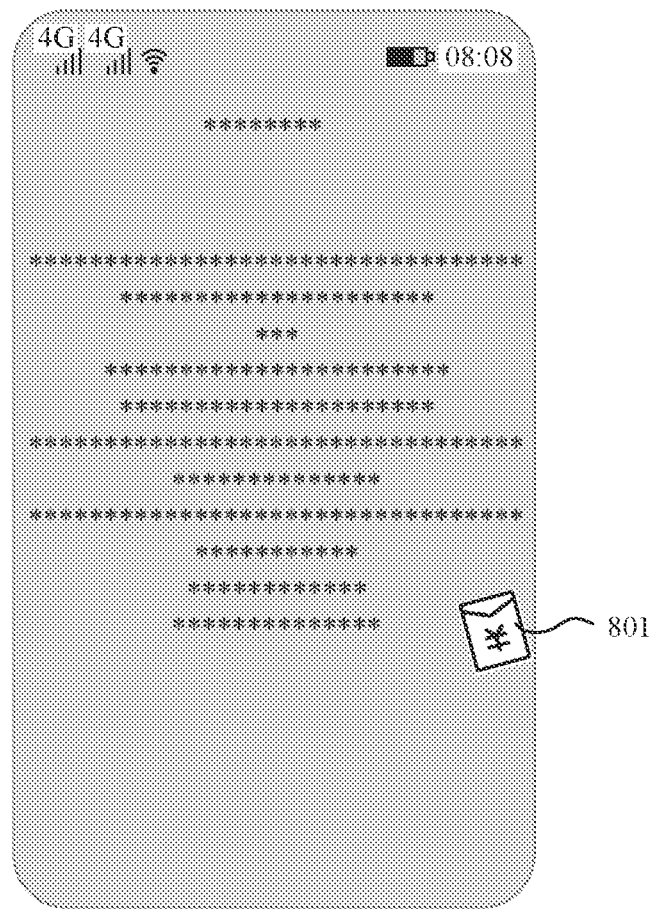
FIG. 8 is another example schematic diagram of a floating control according to an embodiment of this application.

3. Forcible Prompt Providing:

In addition to functional requirements, some prompt requirements may also be made as a floating control to create stronger visual performance. For example, FIG. 8 is another example schematic diagram of a floating control according to an embodiment of this application. In FIG. 8, a shaking red packet 801 attached to a side edge may be a floating control.

Figure 9:
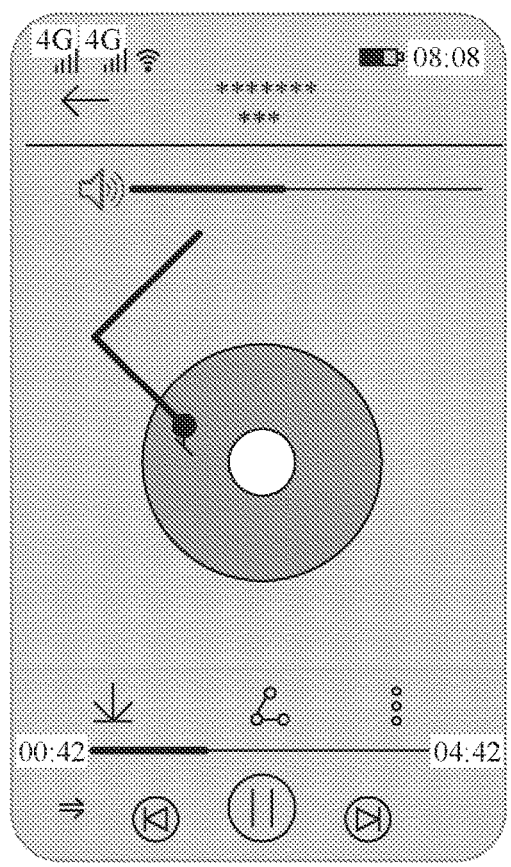
FIG. 9 is another example schematic diagram of a floating control according to an embodiment of this application.
Figure 9:
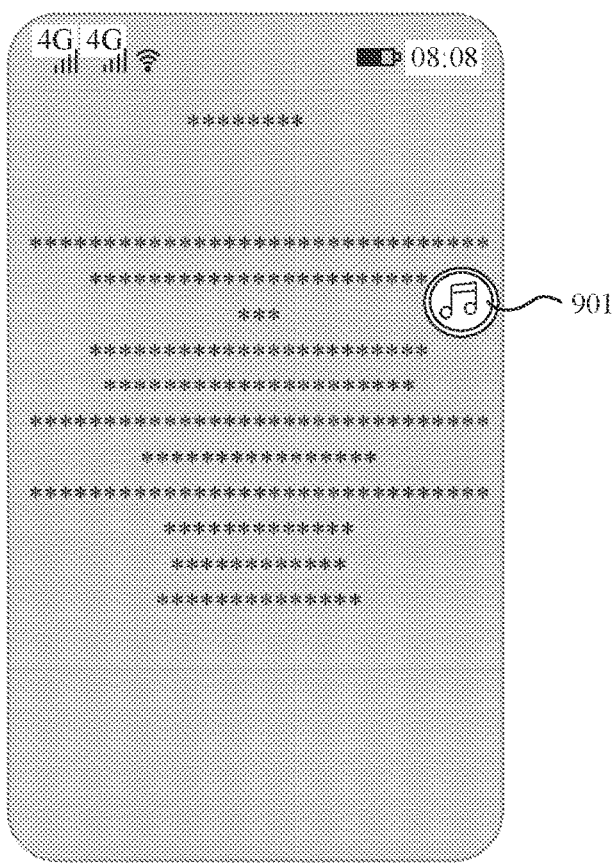

4. Support of Multi-Process Operation:

As functions in an application become increasingly complex, requirements for opening a plurality of tasks and switching between the plurality of tasks by a user emerge. For example, FIG. 9 is another example schematic diagram of a floating control according to an embodiment of this application. (a) in FIG. 9 is a schematic diagram of a user interface of a music playing page on which a user listens to music in an application A. If the user needs to process another task on another page of the application A or in an application B, as shown in (b) in FIG. 9, an electronic device may display the music playing page in the application A as a floating control 901 in miniature. After the user completes the processing of the another task, in response to an operation of tapping the floating control 901 by the user, the electronic device may display the music playing page shown in (a) in FIG. 9 again.

It may be understood that, in addition to using the floating control in the foregoing scenario, in actual application, there may be many other scenarios in which the floating control is used. This is not limited herein.

(3) First Preset Area

In this embodiment of this application, the first preset area is a preset size of area that surrounds a floating control but does not include the floating control on a display of an electronic device.

In a possible implementation, the first preset area is the preset size of area that surrounds the floating control but does not include the floating control on the display of the electronic device.

Figure 10:
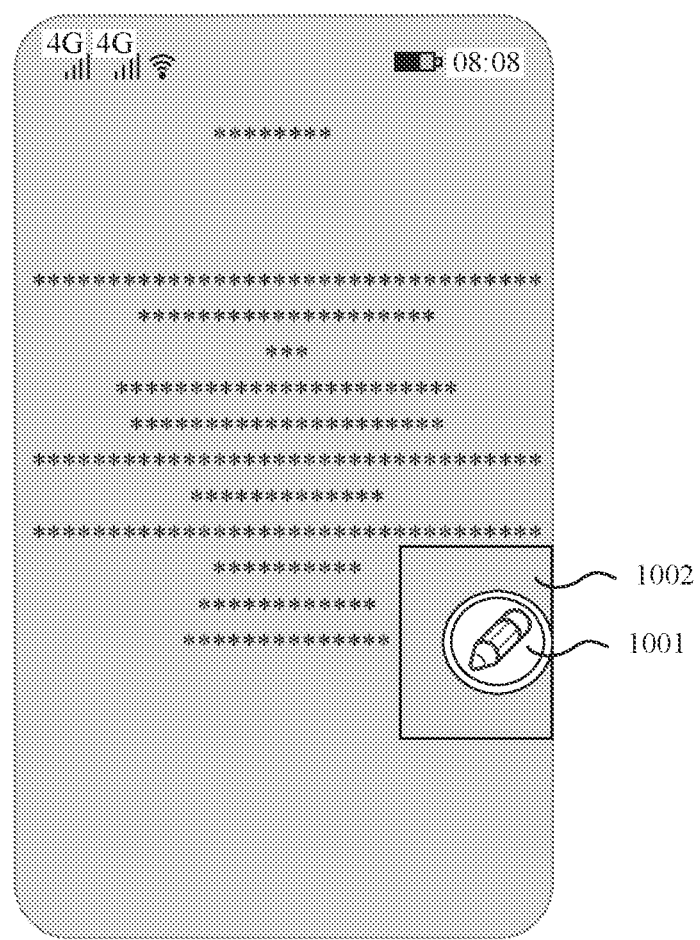
FIG. 10 is an example schematic diagram of a first preset area according to an embodiment of this application.

FIG. 10 is an example schematic diagram of a first preset area according to an embodiment of this application. A preset size of area that is outside a floating control 1001 on a display and that surrounds the floating control 1001 but does not include the floating control 1001 is a first preset area 1002.

It may be understood that if the floating control moves, the first preset area also moves.

Preferably, the first preset area may be an area that does not include the floating control in a second preset area that surrounds a floating control and whose center moves along with the floating control on a display of an electronic device.

It may be understood that a location relationship between the center of the second preset area and a center of the floating control is not limited. For example, the center of the floating control may be on the top, bottom, left or right of the center of second preset area, in an upper left corner, a lower left corner, an upper right corner or a lower right corner of the center of the second preset area, or the like. This is not limited herein.

Preferably, the center of the second preset area is the center of the floating control.

A shape and a size of an outer frame of the second preset area may be preset, for example, may be a rectangle or a circle. This is not limited herein. The shape and the size of the outer frame of the second preset area may be preset before delivery, or may be manually specified by a user on a setting interface of the electronic device. This is not limited herein.

Figure 11A:
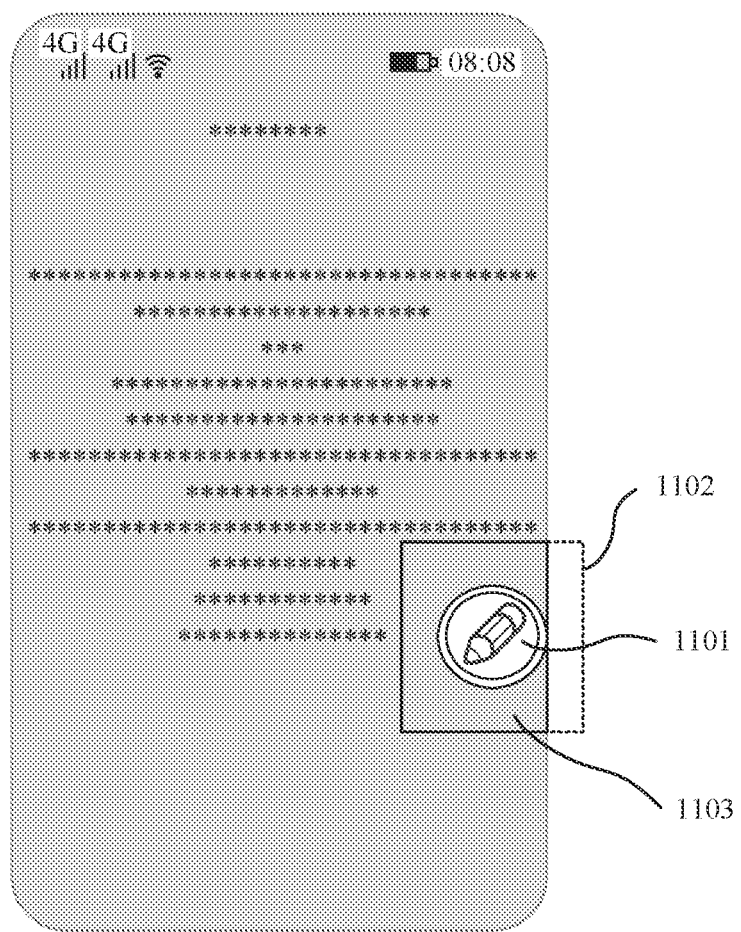
FIG. 11a is an example schematic diagram of a first preset area and a second preset area according to an embodiment of this application.

For example, if the shape of the outer frame of the second preset area is preset to be a rectangle, and the center of the second preset area is the center of the floating control, a side length of the second preset area is twice a side length of a longest side or a diameter of the floating control. FIG. 11*a* is an example schematic diagram of a first preset area and a second preset area according to an embodiment of this application. A rectangular area that surrounds a floating control 1101 and whose center is the floating control 1101 and side length is twice a diameter of the floating control 1101 is a second preset area 1102. An area in which the second preset area 1102 is on a display and does not include the floating control 1101 is a first preset area 1103.

Figure 11B:
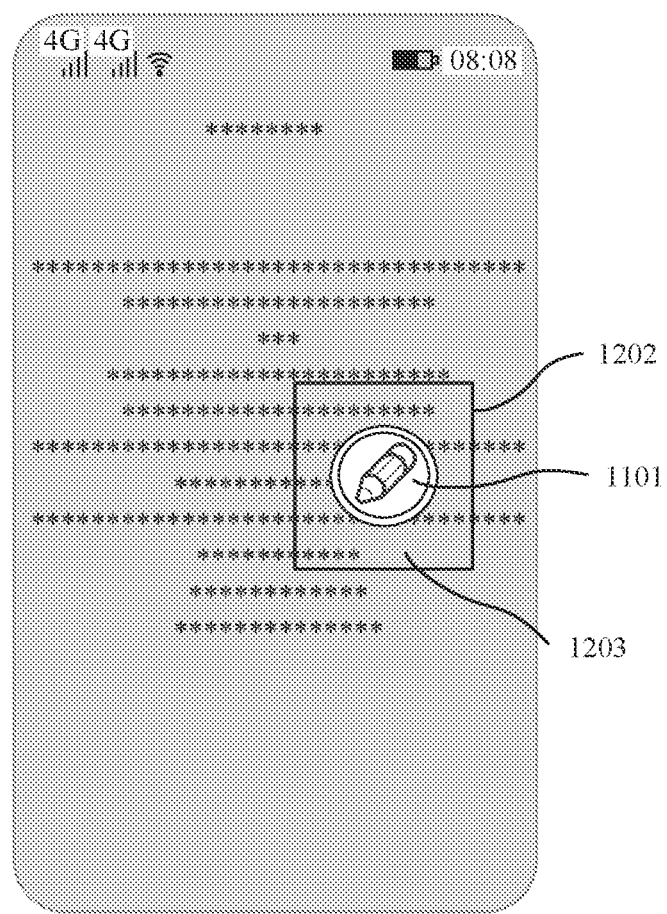
FIG. 11b is another example schematic diagram of a first preset area and a second preset area according to an embodiment of this application.

For example, a user may move the floating control 1101 in FIG. 11*a*. If the floating control 1101 is moved to a middle part of the display, the second preset area moves accordingly. Because more areas in the second preset area enter the display, a size of the first preset area changes. FIG. 11*b* is another example schematic diagram of a first preset area and a second preset area according to an embodiment of this application. The floating control 1101 moves to a middle location of a display, and the second preset area 1104 whose shape and size are the same as those of the second preset area 1102 in FIG. 11*a* also moves to the middle location of the display along with the floating control 1001. In this case, a part that is of the second preset area 1102 that does not appear on the display in FIG. 11*a* appears on the display in the second preset area 1104 in FIG. 11*b*. Therefore, a size of a first preset area 1105 in FIG. 11*b* is larger than the size of the first preset area 1103 in FIG. 11*a*.

It may be understood that when the shape of the outer frame of the second preset area is another shape, a size is another preset size, and a center is another preset center point, an area represented by the second preset area and impact on the size of the first preset area after the second preset area moves along with the floating control are similar to those in the examples shown in FIG. 11*a* and FIG. 11*b*. Details are not described herein again.

In a possible implementation, the first preset area does not surround the floating control.

Optionally, a location of the first preset area may correspondingly change with a change of a location of the floating control on a display.

Figure 12A:
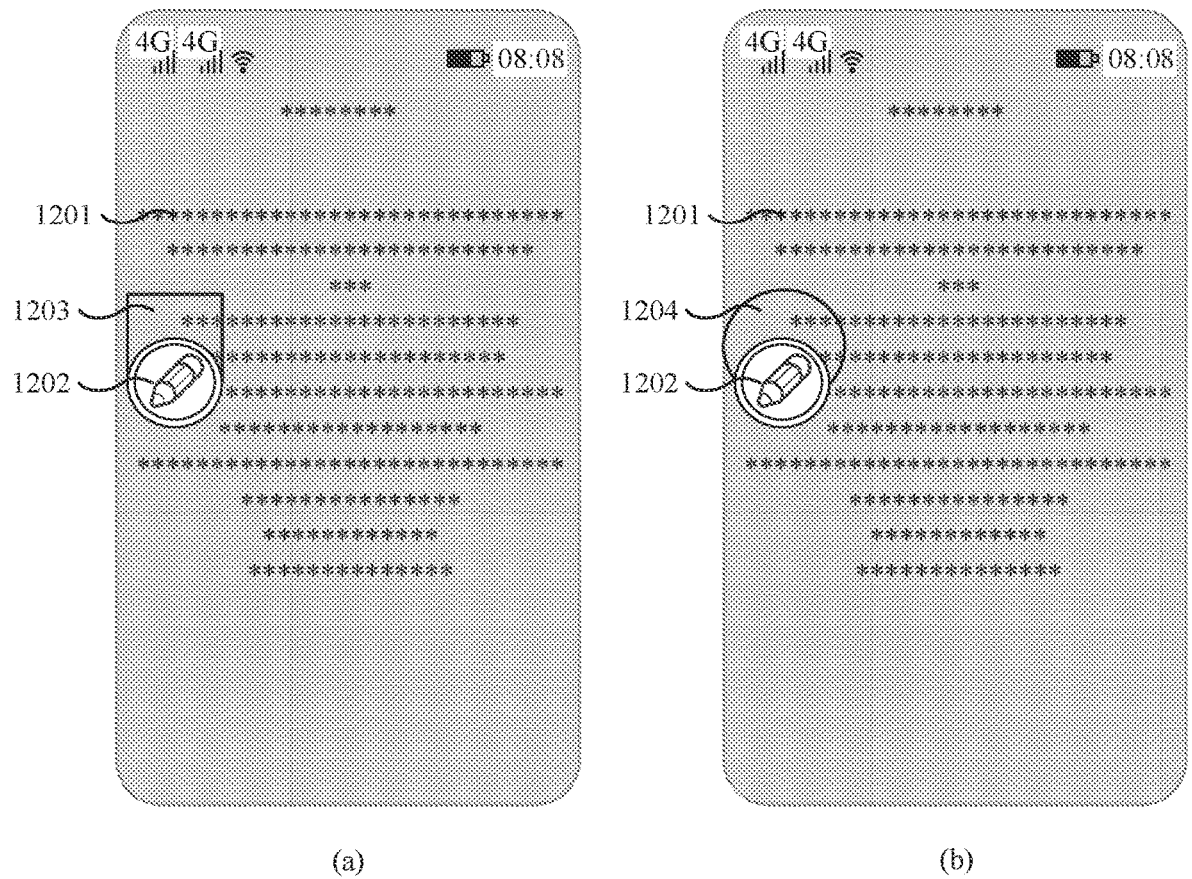
FIG. 12a is a group of example schematic diagrams of a first preset area according to an embodiment of this application.

For example, when the floating control is located on a left side edge of the display, the location of the first preset area may be located right above the floating control. FIG. 12*a* is a group of example schematic diagrams of a first preset area according to an embodiment of this application. As shown in (a) in FIG. 12*a*, a floating control 1202 is located on a left side edge of a display 1201, and a first preset area 1203 does not surround the floating control 1202, and is located right above the floating control 1202. It may be understood that a shape and a size of the first preset area 1203 may also be different based on different settings. As shown in (b) in FIG. 12*a*, a shape of a first preset area 1204 may also include two semi-arcs.

Figure 12B:
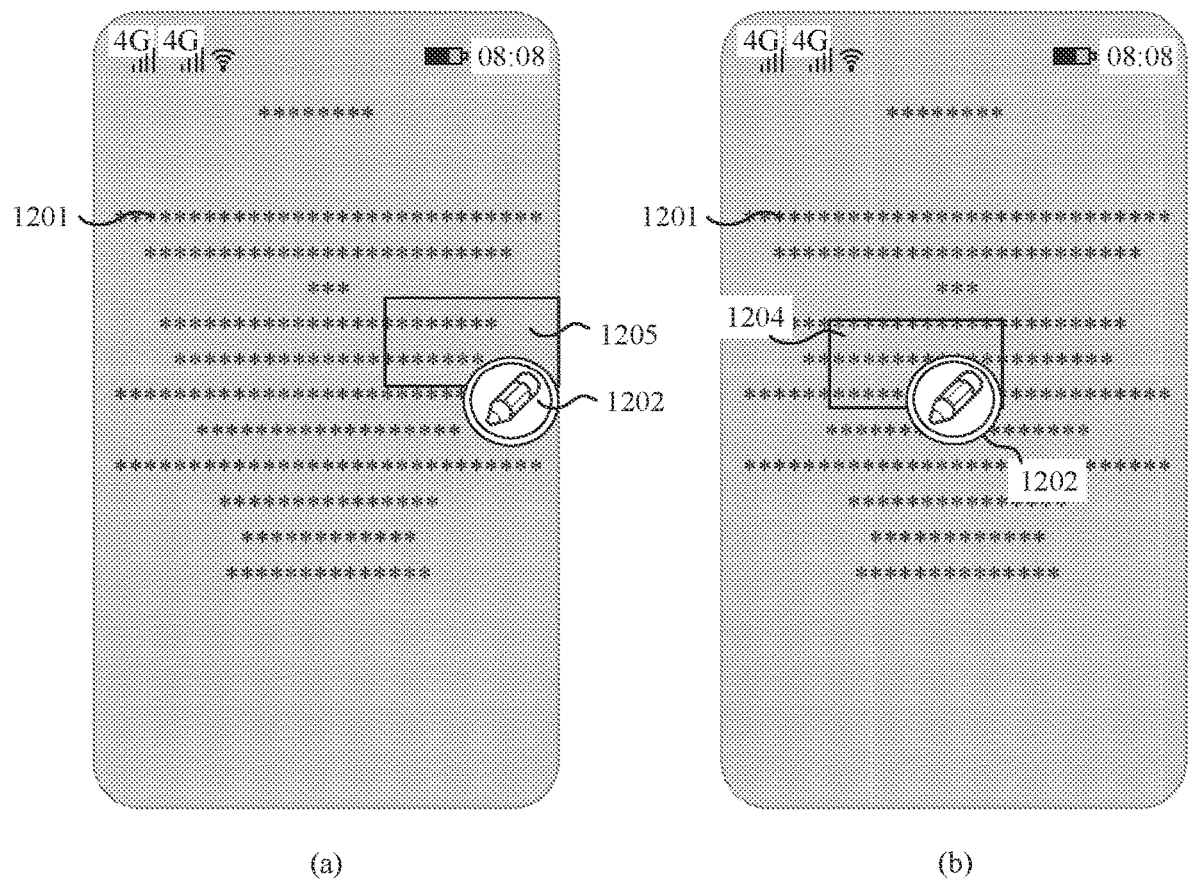
FIG. 12b is another group of example schematic diagrams of a first preset area according to an embodiment of this application.

For example, when the floating control is located on a right side edge or a central area of the display, the location of the first preset area may be located in the upper left of the floating control. FIG. 12*b* is another group of example schematic diagrams of a first preset area according to an embodiment of this application. As shown in (a) in FIG. 12*b*, the floating control 1202 is located on a right side edge of the display 1201, and a first preset area 1205 is located in the upper left of the floating control 1202. As shown in (b) in FIG. 12*b*, the floating control 1202 is located at a central location of the display 1201, and the first preset area 1205 is located in the upper left of the floating control 1202.

It may be understood that the location of the first preset area relative to the floating control may be set based on an actual requirement. This is not limited herein.

It may be understood that the shape and the size of the first preset area may be set based on an actual requirement. This is not limited herein.

Figure 12C:
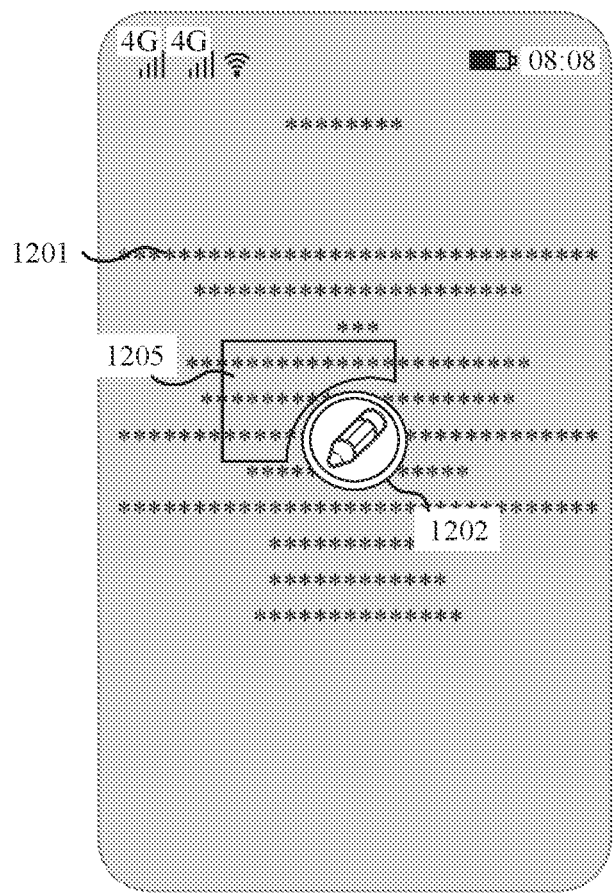
FIG. 12c is another example schematic diagram of a first preset area according to an embodiment of this application.

Optionally, a boundary of the first preset area may be in contact with a boundary of the floating control, or may not be in contact with the boundary of the floating control. This is not limited herein. FIG. 12*c* is another example schematic diagram of a first preset area according to an embodiment of this application. The first preset area 1205 is located in the upper left of the floating control 1202, and a boundary of the first preset area 1205 is not in contact with a boundary of the floating control 1202.

(4) First Window

In this embodiment of this application, the first window is a window below a floating control displayed on a display.

Figure 13A:
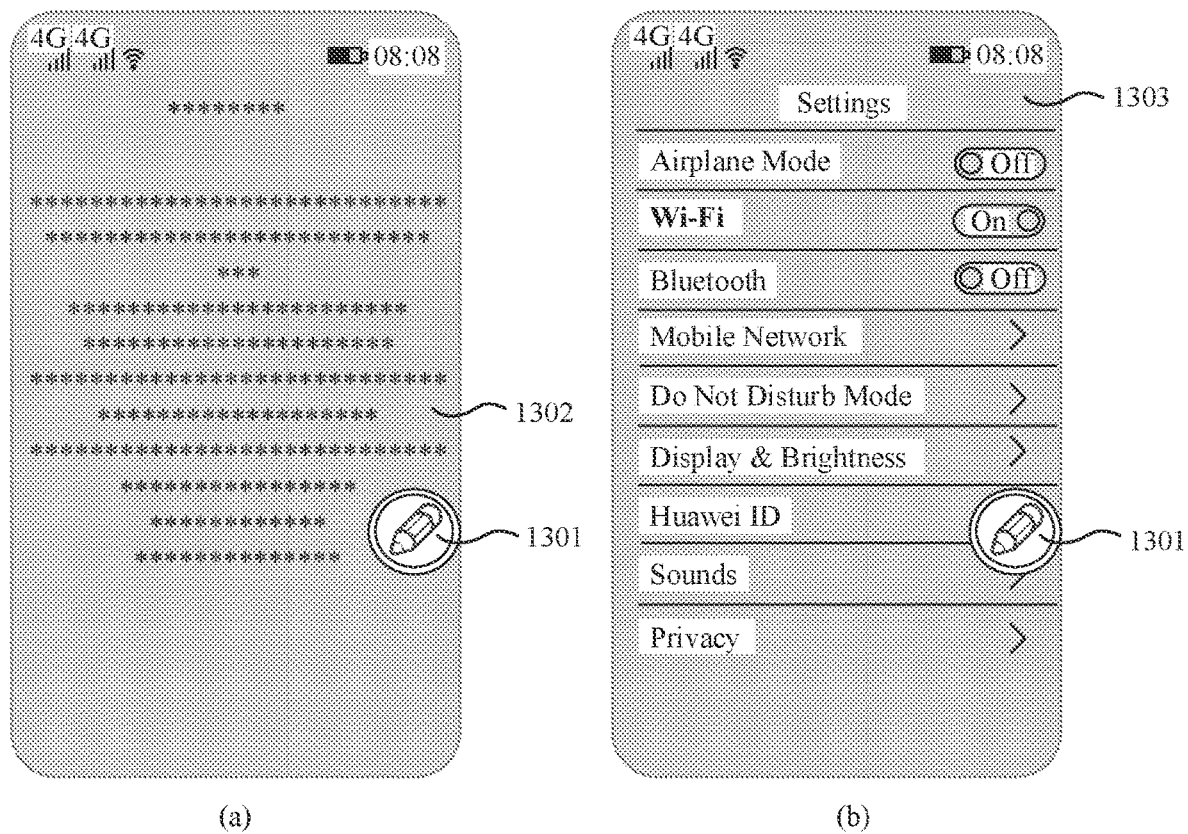
FIG. 13A and FIG. 13B are an example schematic diagram of a first window according to an embodiment of this application.
Figure 13B:
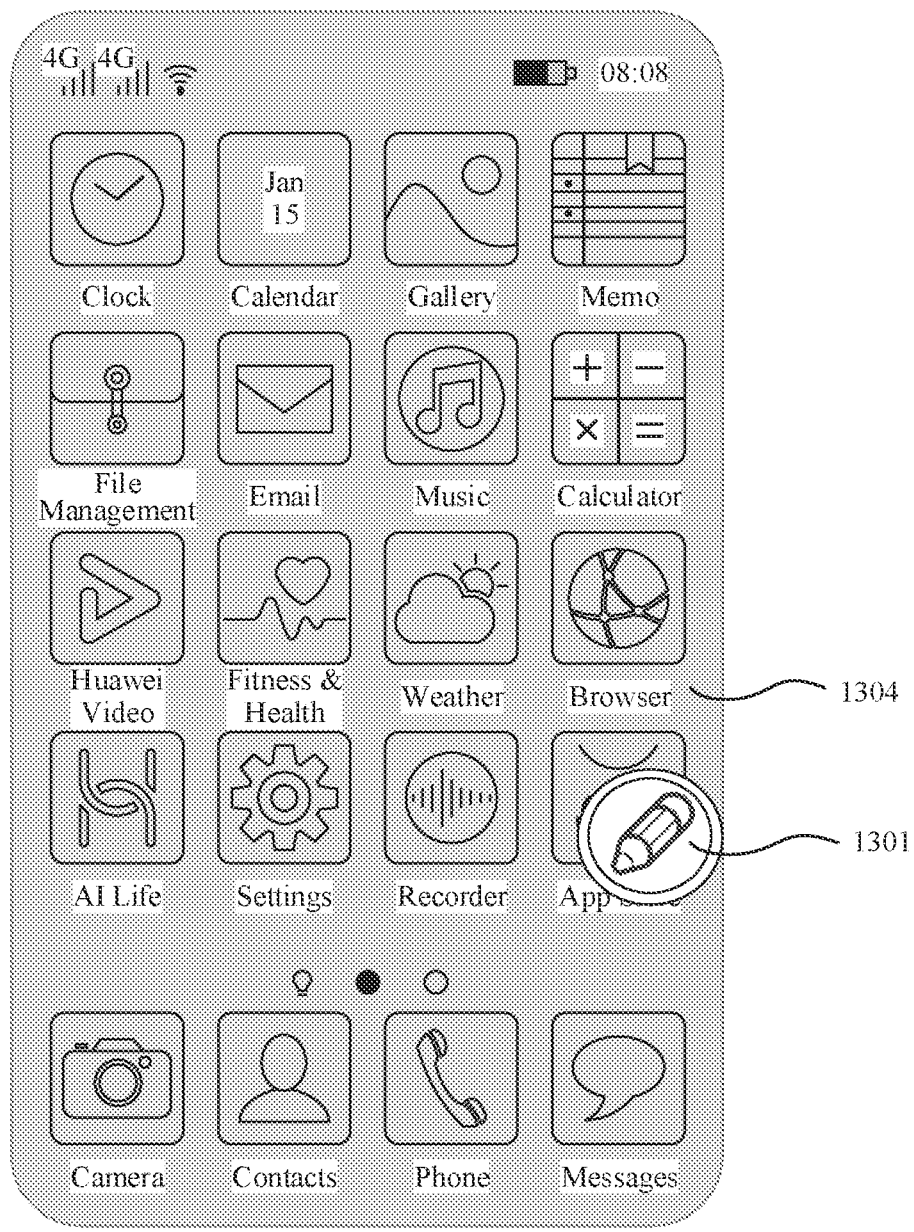

FIG. 13A and FIG. 13B are an example schematic diagram of a first window according to an embodiment of this application.

For example, as shown in (a) in FIG. 13A, the first window may be a window that is in an application and that is below a floating control 1301 displayed on a display. The floating control 1301 may be a floating control of the application, or may not be a floating control of the application. This is not limited herein.

For example, as shown in (b) in FIG. 13A, the first window may alternatively be a window of a setting interface that is in a system of an electronic device and that is below the floating control 1301 displayed on the display.

For example, as shown in (c) in FIG. 13B, the first window may alternatively be a window that is of a home screen of an electronic device and that is below the floating control 1301 displayed on the display.

It may be understood that the first window may alternatively be a window that is of another type and that is below the floating control displayed on the display. This is not limited herein.

Figure 14:
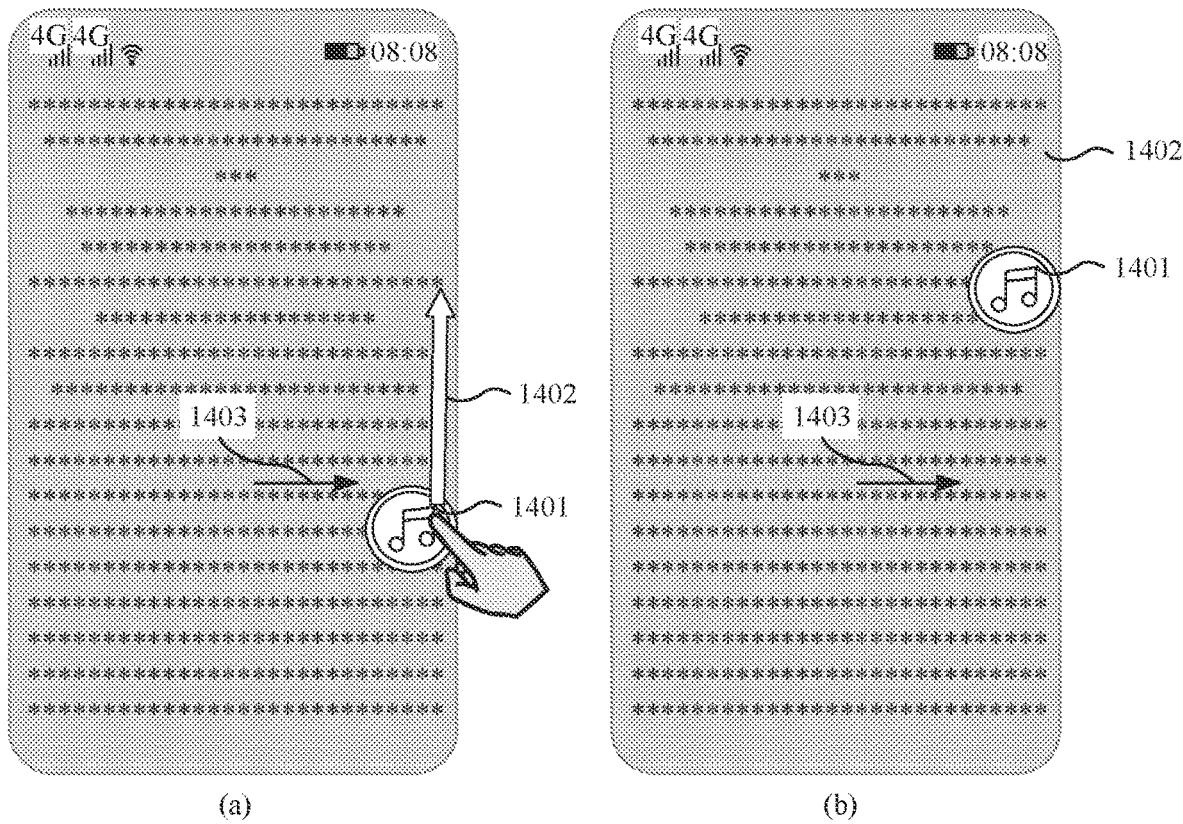
FIG. 14 is a schematic diagram of a scenario in which a control moves according to the conventional technology.

FIG. 14 is a schematic diagram of a scenario in which a control moves in the conventional technology. As shown in (a) in FIG. 14, a user reads an article in a first window 1402, and a current reading location and direction of the user are a first orientation 1403. The user finds that a floating control 1401 blocks content that is to be read. Therefore, the user touches the floating control 1401, and drags the floating control 1401 up to drag the floating control 1401 away from an area that is to be read. As shown in (b) in FIG. 14, in response to the drag operation performed by the user on the floating control 1401, an electronic device moves the floating control 1401 to a location specified by the user. After completing the drag operation, the user may continue to read along the first orientation 1403.

In the conventional technology, when the floating control 1401 blocks the content, and after finding that the floating control 1401 blocks the content that the user needs to read, the user needs to manually drag a location of the floating control 1401, so that the floating control 1401 no longer blocks the content that the user needs to read. If the user reads the location of the floating control 1401 again, the user needs to manually drag the floating control 1401 to another location again. Such an operation requirement interrupts reading continuity of the user, and greatly reduces reading experience of the user. If the floating control 1401 is disabled, the user cannot enjoy a convenient function of the floating control 1401.

Figure 15:
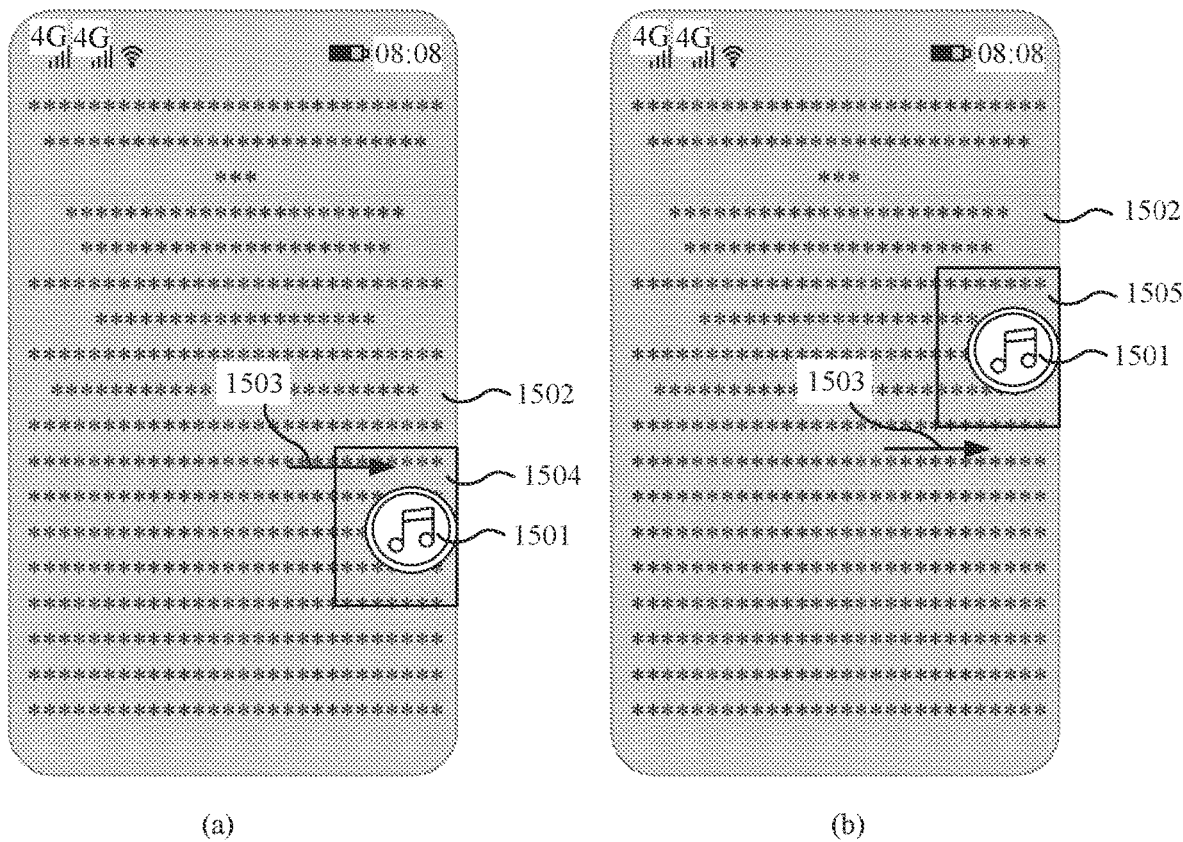
FIG. 15 is a schematic diagram of a scenario in which a control moves according to an embodiment of this application.

FIG. 15 is a schematic diagram of a scenario in which a control moves according to an embodiment of this application. As shown in (a) in FIG. 15, a user reads an article in a first window 1502 below a floating control 1501, and a current reading location and direction of the user are a second orientation 1503. When an electronic device detects that an eyeball gaze location of the user is located in a first preset area 1504 around the floating control 1501 and exceeds preset first duration, the electronic device automatically moves the floating control 1501. As shown in (b) in FIG. 15, the moved floating control 1501 no longer blocks content that is to be read by the user. The user does not need to perform any manual operation, and may continue reading along the second orientation 1503 without an obstacle, without worrying that content to be read is blocked by the floating control 1501.

According to a control moving method provided in this embodiment of this application, the user no longer needs to manually move the floating control frequently to prevent the floating control from blocking the content that is to be read, which causes reading experience to deteriorate. The electronic device automatically moves the floating control based on a reading location of the user, to prevent the floating control from blocking the content that is to be read by the user. In this way, the floating control can be normally used without affecting reading and an operation of the user, which greatly improves the reading experience of the user.

The following first describes an example electronic device 100 according to an embodiment of this application.

Figure 16:
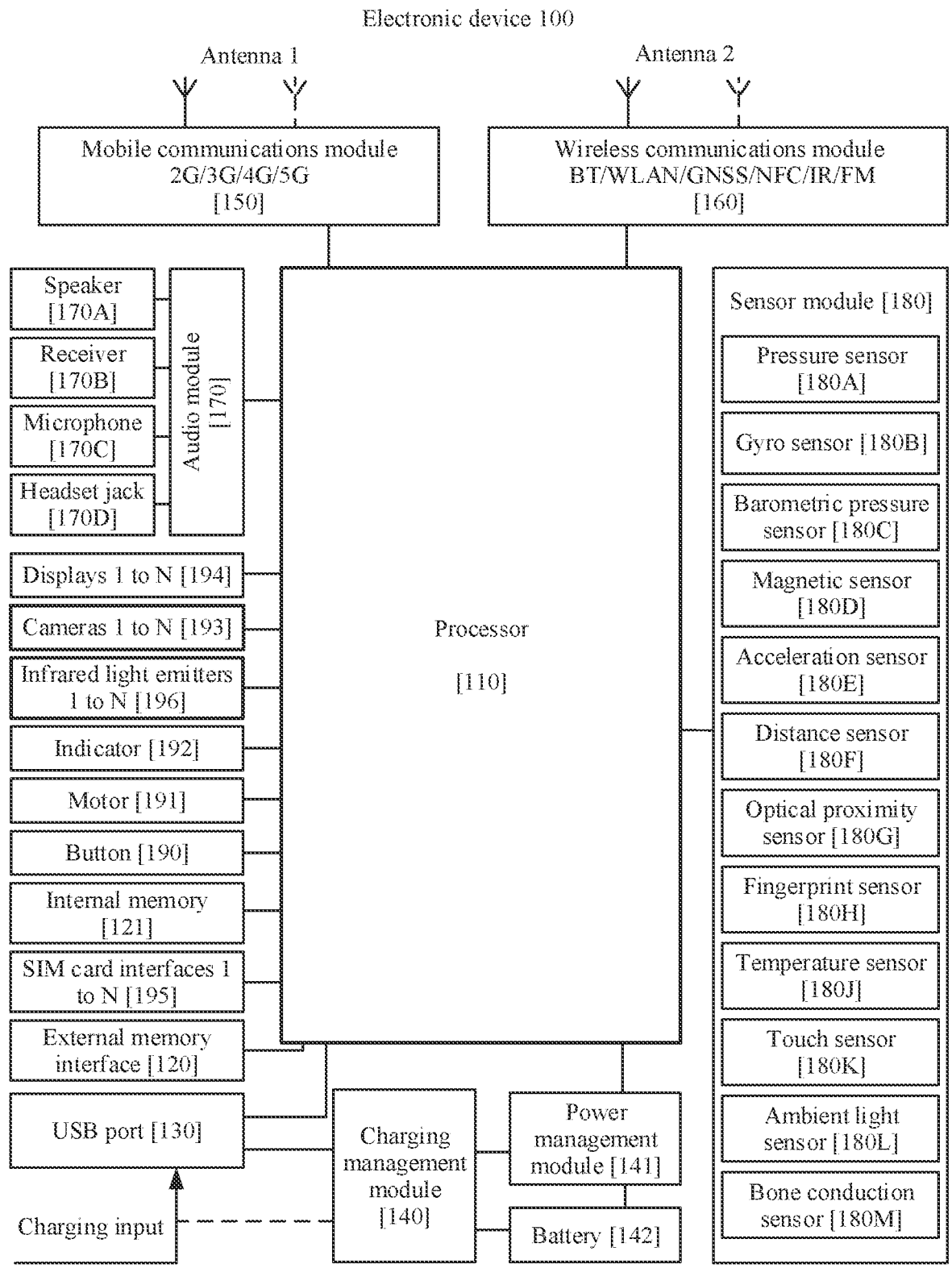
FIG. 16 is a schematic diagram of a structure of an example electronic device 100 according to an embodiment of this application.

FIG. 16 is a schematic diagram of a structure of an electronic device 100 according to an embodiment of this application.

The electronic device 100 is used as an example below to describe embodiments in detail. It should be understood that the electronic device 100 may have more or fewer components than those shown in the figure, or may combine two or more components, or may have different component configurations. Components shown in the figure may be implemented by hardware including one or more signal processing and/or application-specific integrated circuits, software, or a combination of hardware and software.

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, an infrared light emitter 196, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180W, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identification module, SIM) interface, a universal serial bus (universal serial bus, USB) port, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be used to perform audio communication, and sample, quantize, and code an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call by using a Bluetooth headset. Both the I2S interface and the PCM interface may be used for audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI, to implement a photographing function of the electronic device 100. The processor 110 communicates with the display 194 through the DSI, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as the I2C interface, the I2S interface, the UART interface, the MIPI interface, or the like.

The SIM interface may be configured to communicate with the SIM card interface 195, to implement a function of transmitting data to an SIM card or reading data in an SIM card.

The USB port 130 is a port that conforms to a USB standard specification, and may be specifically a mini USB port, a micro USB port, a USB Type-C port, or the like. The USB port 130 may be configured to connect to a charger to charge the electronic device 10, or may be configured to perform data transmission between the electronic device 100 and a peripheral device. The USB port 130 may alternatively be configured to connect to a headset, to play an audio through the headset. The port may alternatively be configured to connect to another electronic device such as an AR device.

It may be understood that an interface connection relationship between the modules shown in this embodiment of the present invention is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The charger may be a wireless charger, or a wired charger.

The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display 194, the camera 193, the wireless communications module 160, and the like.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antennas may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave by using the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave by using the antenna 1 for radiation. In some embodiments, at least some functional modules in the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate the received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent device.

In some other embodiments, the modem processor may be independent of the processor 110, and is disposed in a same device as the mobile communications module 150 or another functional module.

The wireless communications module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 100. The wireless communications module 160 may be one or more components integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave by using the antenna 2 for radiation.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 may implement a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is opened, and light is transferred to a photosensitive element of the camera through a lens. An optical signal is converted into an electrical signal, and the photosensitive element of the camera transfers the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto a photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

In some embodiments, the electronic device 100 may include one or N infrared cameras, and the infrared camera may photograph a video including infrared light.

The infrared light emitter 196 is configured to emit infrared light. In some embodiments, infrared light emitted by the infrared light emitter 196 is reflected by eyeballs of a user. The electronic device 100 may include one or N infrared light emitters 196, where N is a positive integer greater than 1.

In this embodiment of this application, the infrared camera and the infrared light emitter 196 in the electronic device 100 may form a hardware basis for implementing an eyeball tracking technology by using the principle 3 in the eyeball tracking technology in (1) in the foregoing term description.

In actual application, if the eyeball tracking technology is implemented by using the principle 1 or the principle 2 in the eyeball tracking technology in (1) in the foregoing term description, the electronic device 100 may have or may not have the infrared camera or the infrared light emitter 196. This is not limited herein.

The digital signal processor is configured to process a digital signal, and may process another digital signal in addition to processing the digital image signal. For example, when the electronic device 100 selects a frequency, the digital signal processor is configured to perform Fourier transform on frequency energy, and the like.

The video codec is configured to: compress or decompress a digital video. The electronic device 100 may support one or more types of video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network. NN) computing processor. The NPU quickly processes input information by referring to a structure of a biological neural network, for example, with reference to a transfer mode between human brain neurons, and may further continuously perform self-learning. Applications such as intelligent cognition of the electronic device 100 may be implemented by using the NPU, for example, image recognition, facial recognition, speech recognition, and text understanding.

The external memory interface 120 may be used to connect to an external storage card, for example, a Micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a facial recognition function, a fingerprint recognition function, and a mobile payment function), and the like. The data storage area may store data (for example, facial information template data and a fingerprint information template) and the like created during use of the electronic device 100. In addition, the internal memory 121 may include a high-speed random access memory, and may further include a nonvolatile memory, for example, at least one magnetic disk storage device, a flash storage device, a universal flash storage (universal flash storage, UFS), and the like.

The electronic device 100 may implement an audio function such as music playing or recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to: code and decode an audio signal. In some embodiments, the audio module 170 may be disposed in the processor 110, or some functional modules in the audio module 170 are disposed in the processor 110.

The speaker 170A, also referred to as a "horn", is configured to convert an audio electrical signal into a sound signal. The electronic device 100 may listen to music or answer a hands-free call by using the speaker 170A.

The receiver 170B, also referred to as an "earpiece", is configured to convert the audio electrical signal into the sound signal. When a call is answered or voice information is received by using the electronic device 100, the receiver 170B may be put close to a human ear to listen to a voice.

The microphone 170C, also referred to as a "mike" or a "mic", is configured to convert a sound signal into an electrical signal. When making a call or sending voice information, a user may make a sound near the microphone 170C through the mouth of the user, to input the sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, reduce noise, further identify a sound source, implement a directional recording function, and the like.

The headset jack 170D is configured to connect to a wired headset. The headset jack 170D may be the USB port 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages application icon, an instruction for viewing an SMS message is executed. When a touch operation whose touch operation intensity is greater than or equal to the first pressure threshold is performed on the Messages application icon, an instruction for creating a new SMS message is performed.

The gyro sensor 180B may be configured to determine a motion posture of the electronic device 100. In some embodiments, an angular velocity of the electronic device 100 around three axes (namely, axes x, y, and z) may be determined by using the gyro sensor 180B. The gyro sensor 180B may be configured to implement image stabilization during photographing. For example, when a shutter is pressed, the gyro sensor 180B detects an angle at which the electronic device 100 jitters, obtains, through calculation based on the angle, a distance for which a lens module needs to compensate, and allows the lens to cancel the jitter of the electronic device 100 through reverse motion, to implement image stabilization. The gyro sensor 180B may be further used in navigation and motion sensing game scenarios.

The barometric pressure sensor 180C is configured to measure barometric pressure. In some embodiments, the electronic device 100 calculates an altitude by using a value of the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D, and further set, based on a detected opening or closing state of the flip cover, a feature such as automatic unlocking of the flip cover.

The acceleration sensor 180E may detect accelerations in various directions (usually on three axes) of the electronic device 100, and may detect magnitude and a direction of gravity when the electronic device 100 is static. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure a distance in an infrared manner or a laser manner. In some embodiments, in a photographing scenario, the electronic device 100 may measure a distance through the distance sensor 180F to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor nearby the temperature sensor 180J, to reduce power consumption to implement thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 form a touchscreen, which is also referred to as a "touchscreen". The touch sensor 180K is configured to detect a touch operation performed on or near the touch sensor 180K. The touch sensor may transfer the detected touch operation to the application processor to determine a type of a touch event. A visual output related to the touch operation may be provided by using the display 194. In some other embodiments, the touch sensor 180K may also be disposed on a surface of the electronic device 100 at a location different from that of the display 194.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt, or may be configured to provide a touch vibration feedback. For example, touch operations performed on different applications (for example, photographing and audio play) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may further be customized.

The indicator 192 may be an indicator lamp, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may also be compatible with an external storage card. The electronic device 100 interacts with a network through the SIM card, to implement functions such as calling and data communication.

Figure 17:
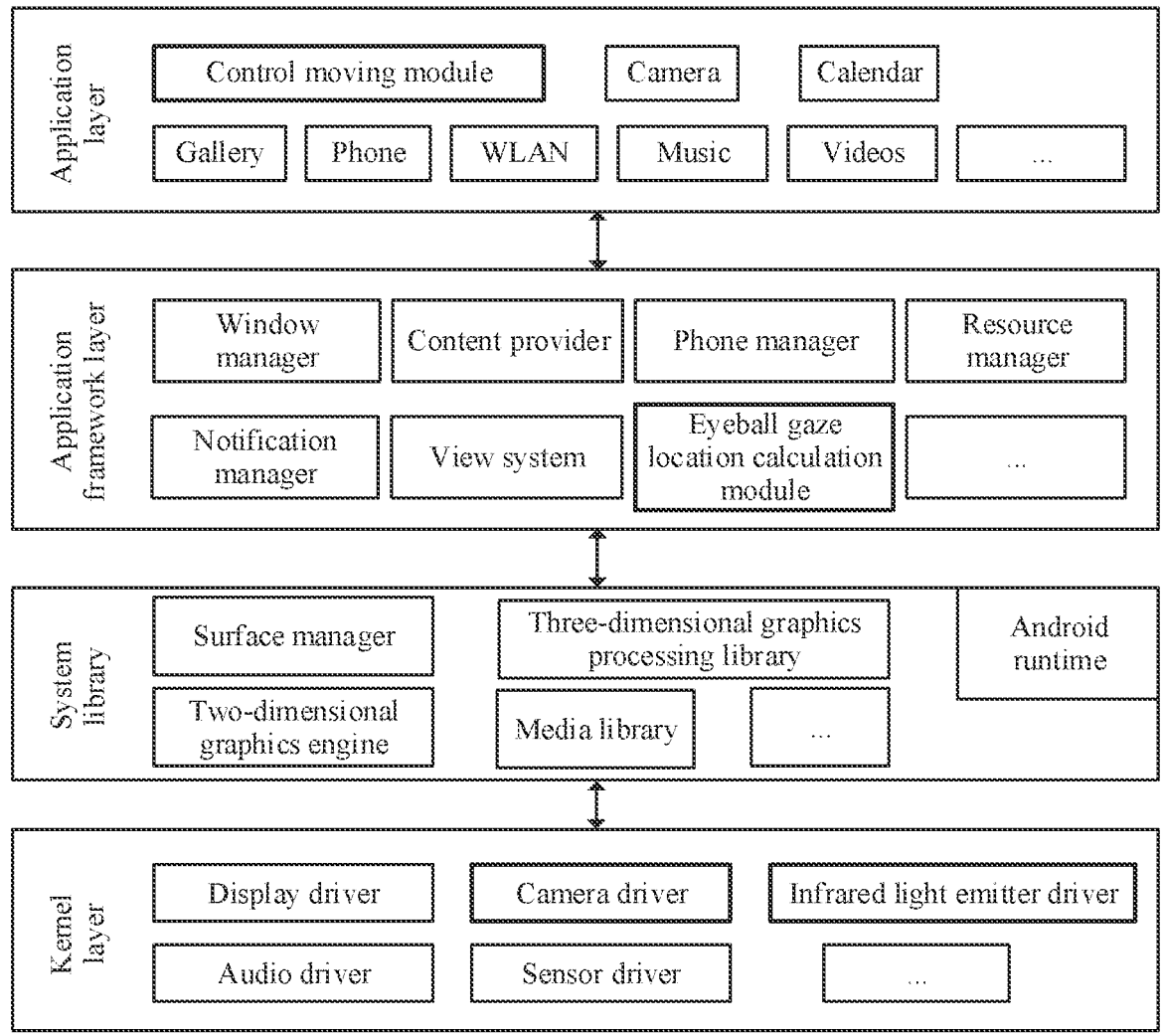
FIG. 17 is a block diagram of a software structure of an electronic device 100 according to an embodiment of this application.

FIG. 17 is a block diagram of a software structure of an electronic device 100 according to this embodiment of this application.

In the layered architecture, software is divided into several layers, and each layer has a clear role and task. The layers communicate with each other through a software interface. In some embodiments, the Android system is divided into four layers: an application layer, an application framework layer, a runtime (runtime) and system library, and a kernel layer from top to bottom.

The application layer may include a series of application packages.

As shown in FIG. 17, the application packages may include applications (which may also be referred to as applications) such as Control Moving Module, Camera, Gallery, Calendar, Phone, Map, Navigation, WLAN, Bluetooth, Music, Videos, and Messages.

The control moving module is configured to: determine an eyeball gaze location of a user, and perform a control moving method in embodiments of this application based on the eyeball gaze location of the user.

The application framework layer provides an application programming interface (application programming interface, API) and a programming framework for an application at the application layer. The application framework layer includes some predefined functions.

As shown in FIG. 17, the application framework layer may include a window manager, a content provider, a view system, a phone manager, a resource manager, a notification manager, an eyeball gaze location calculation module, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, an audio, calls that are made and answered, a browsing history and bookmarks, an address book, and the like.

The view system includes visualized controls such as a control for displaying text and a control for displaying an image. The view system may be configured to construct an application. A display interface may include one or more views. For example, a display interface including a Messages notification icon may include a text display view and an image display view.

The phone manager is configured to provide a communication function of the electronic device 100, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without user interaction. For example, the notification manager is configured to notify download completion, give a message notification, and the like. The notification manager may alternatively be a notification that appears in a top status bar of the system in a form of a graph or a scroll bar text, for example, a notification of an application running on the background, or may be a notification that appears on the display in a form of a dialog interface. For example, text information is displayed in the status bar, an alert sound is played, the electronic device vibrates, or an indicator lamp blinks.

The eyeball gaze location calculation module is configured to: obtain a real-time video of an eyeball movement of a user from a camera driver at the kernel layer, and calculate an eyeball gaze location of the user on the display in real time based on an eyeball tracking technology.

The eyeball gaze location calculation module may provide an eyeball gaze location interface. The control moving module at the application layer may obtain the eyeball gaze location of the user on the display in real time by invoking the eyeball gaze location interface.

The runtime (runtime) includes a core library and a virtual machine. The runtime is responsible for scheduling and management of the system.

The core library includes two parts: a performance function that needs to be invoked by a programming language (for example, Java language), and a system core library.

The application layer and the application framework layer run on the virtual machine. The virtual machine executes programming files (for example, Java files) of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Library), a three-dimensional graphics processing library (for example, OpenGL ES), and a two-dimensional graphics engine (for example, SGL).

The surface manager is configured to: manage a display subsystem and provide fusion of two-dimensional (2-Dimensional, 2D) and three-dimensional (3-Dimensional, 3D) layers for a plurality of applications.

The media library supports playback and recording of audio and videos in a plurality of commonly used formats, static image files, and the like. The media library may support a plurality of audio and video coding formats, for example, MPEG-4, H.264, MP3, AAC, AMR, JPG, and PNG.

The three-dimensional graphics processing library is configured to implement 3D graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, a sensor driver, and a virtual card driver. In some embodiments, the kernel layer may further include an infrared light emitter driver.

The following describes an example of a working process of software and hardware of the electronic device 100 with reference to a capture photographing scenario.

When the touch sensor 180K receives a touch operation, a corresponding hardware interruption is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a single-tap touch operation, and a control corresponding to the single-tap operation is a control of a camera application icon. A camera application invokes an interface of the application framework layer to open the camera application, then enables the camera driver by invoking the kernel layer, and captures a static image or a video by using the camera 193.

In some embodiments, the eyeball gaze location calculation module may also be located at another layer of the software structure. For example, the eyeball gaze location calculation module may belong to the kernel layer, may belong to the system library, or may belong to the application layer. This is not limited herein. When the eyeball gaze location calculation module is located at the application layer, the eyeball gaze location calculation module may be a module independent of the control moving module, or may be a submodule in the control moving module. This is not limited herein.

With reference to the accompanying drawings and the foregoing example software and hardware structures of the electronic device 100, the following describes an example of the control moving method in embodiments of this application.

The following first describes examples of user interfaces for setting related parameters in embodiments of this application.

Figure 18:
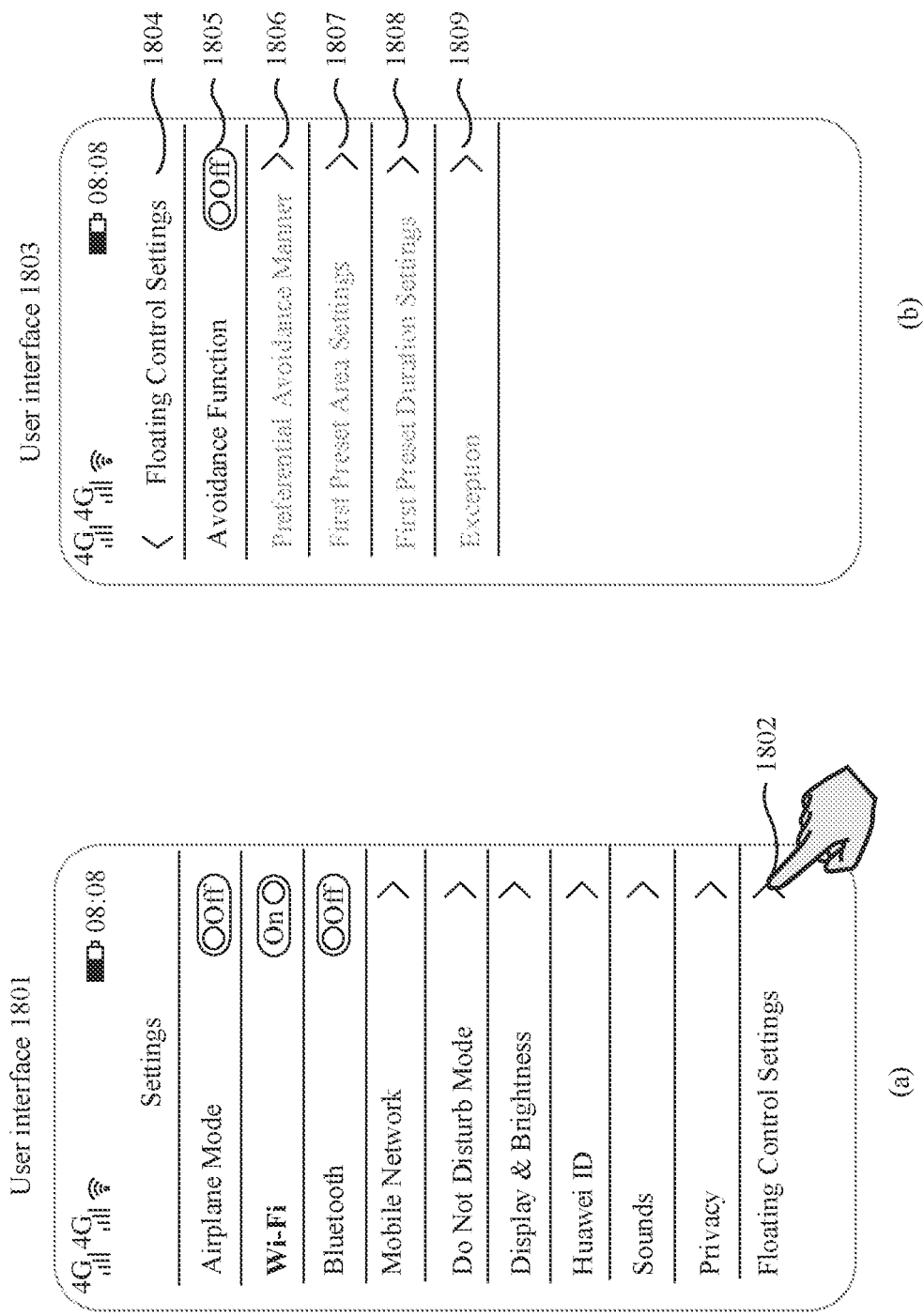
FIG. 18 is a group of schematic diagrams of user interfaces according to an embodiment of this application.

FIG. 18 is a group of schematic diagrams of a user interface according to an embodiment of this application. (a) in FIG. 18 shows a user interface 1801. The user interface 1801 is a system setting interface of the electronic device 100, and is configured to set a system-related function. In addition to some common setting items, the user interface 1801 may further include a floating control setting control 1802. The floating control setting control 1802 is configured to provide a setting option related to the floating control.

It may be understood that (a) in FIG. 18 is an example schematic diagram. In actual application, the floating control setting control 1802 may be on or not on the system setting interface of the electronic device, or the floating control setting control 1802 may be on a setting interface of an application. This is not limited herein.

For example, in response to an operation of tapping the floating control setting control 1802 by a user, the electronic device 100 may display a user interface 1803 shown in (b) in FIG. 18. The user interface 1803 is a floating control setting interface.

The user interface 1803 may include: a title bar 1804, an avoidance function on/off control 1805, a preferential avoidance manner selection control 1806, a first preset area setting control 1807, a first preset duration setting control 1808, and an exception setting control 1809.

The title bar 1804 may include a back key and a current page indicator. The back key can be used to back to an upper-level menu. An upper-level page of the user interface 1803 may be the user interface 1801 shown in (a) in FIG. 18. The current page indicator may be used to indicate a current page. For example, text information "floating control setting" may be used to indicate that the current page is used to display related content of the floating control setting. The current page indicator is not limited to the text information, or may be an icon. This is not limited herein.

The avoidance function on/off control 1805 is configured to: accept an operation (tap, touch, or the like) of the user, and change an on or an off state of an automatic avoidance function of the floating control. When the on/off status of the avoidance function on/off control 1805 is off, it may indicate that the automatic avoidance function of the floating control is in an off state. When the on/off status of the avoidance function on/off control 1805 is on, it may indicate that the automatic avoidance function of the floating control is in an on state. When the automatic avoidance function of the floating control is in the on state, the electronic device may automatically perform the control moving method in this embodiment of this application. When the automatic avoidance function of the floating control is in the off state, the electronic device may not perform the control moving method in this embodiment of this application.

It may be understood that, in addition to receiving an operation directly performed by the user on the avoidance function on/off control 1805 to change the status of the avoidance function on/off control 1805, the electronic device 100 may further receive another preset shortcut instruction, to change the status of the avoidance function on/off control 1805. For example, the electronic device may preset that when it is detected that the user draws a letter "B" on the display 194 of the electronic device 100, the status of the avoidance function on/off control 1805 is modified to on. For another example, the electronic device may further preset that when it is detected that the user taps the display 194 of the electronic device 100 three times, the status of the function on/off control 1805 is modified to on, or the like. This is not limited herein.

It should be noted that this is an example. In some embodiments, the electronic device 100 may not have the avoidance function on/off control 1805, but enables the automatic avoidance function of the floating control by default, and may perform the control moving method in this embodiment of this application. This is not limited herein.

The preferential avoidance manner selection control 1806 is configured to provide a selection option for the preferential avoidance manner of the floating control.

The first preset area setting control 1807 is configured to provide a setting option for the first preset area.

The first preset duration setting control 1808 is configured to provide a setting option for the first preset duration.

The exception setting control 1809 is configured to provide an option for an exception of the automatic avoidance of the floating control.

As shown in (b) in FIG. 18, when the on/off status of the avoidance function on/off control 1805 is off, it may indicate that the automatic avoidance function of the floating control in the electronic device 100 is in an off state. In this case, other controls on the floating control setting page, for example, the preferential avoidance manner selection control 1806, the first preset area setting control 1807, the first preset duration setting control 1808, and the exception setting control 1809 may all be displayed in an unavailable state.

Figure 19:
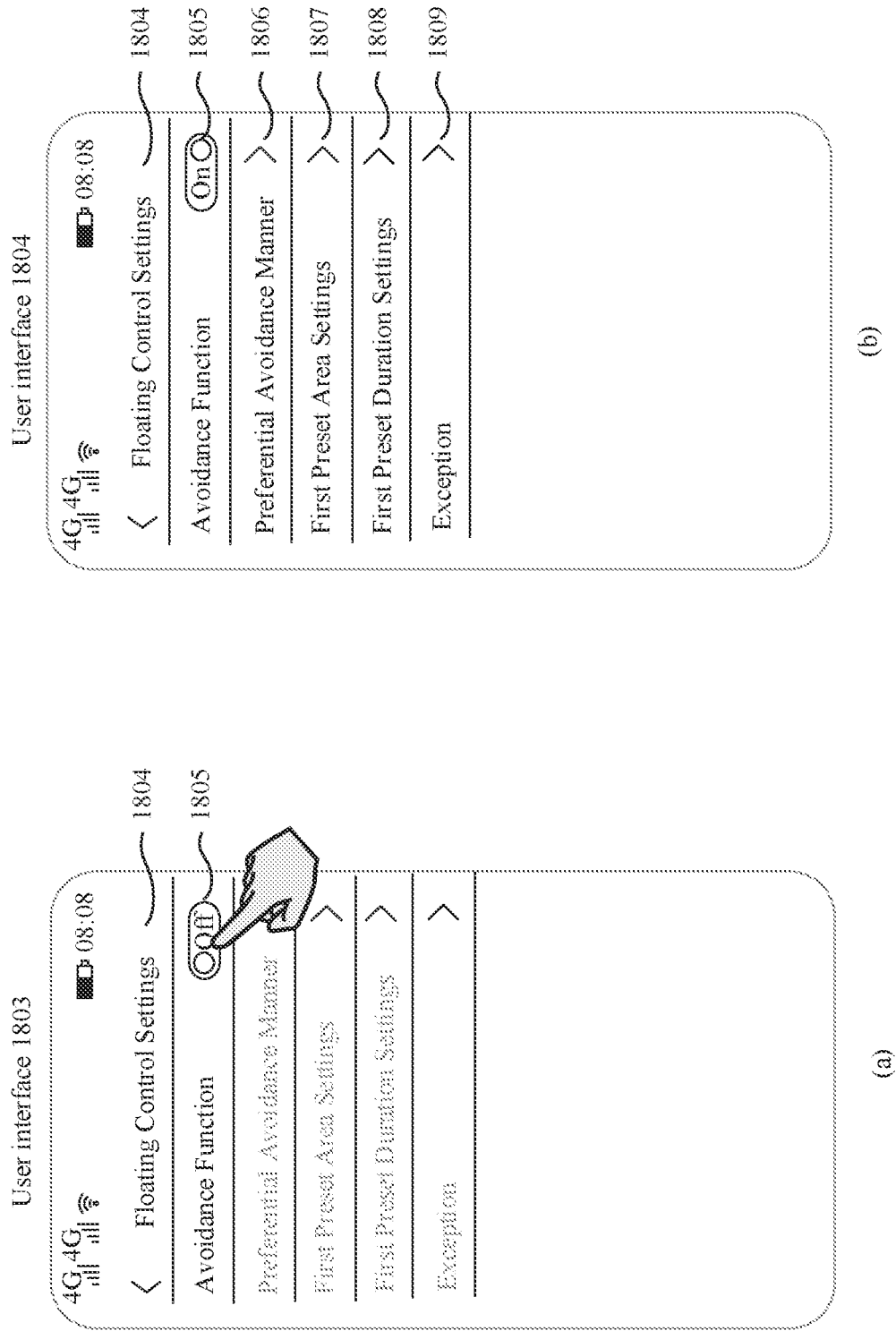
FIG. 19 is another group of schematic diagrams of user interfaces according to an embodiment of this application.

As shown in (a) in FIG. 19, in a possible implementation, in response to a tap operation performed by a user on the avoidance function on/off control 1805 in the user interface 1803, the electronic device 100 may display a user interface 1804 shown in (b) in FIG. 19. In the user interface 1804, the on/off status of the avoidance function on/off control 1805 is changed to on. The automatic avoidance function of a floating control of the electronic device 100 is enabled. The preferential avoidance manner selection control 1806, the first preset area setting control 1807, the first preset duration setting control 1808, and the exception setting control 1809 in the user interface 1804 may all be displayed in an available state.

Figure 20:
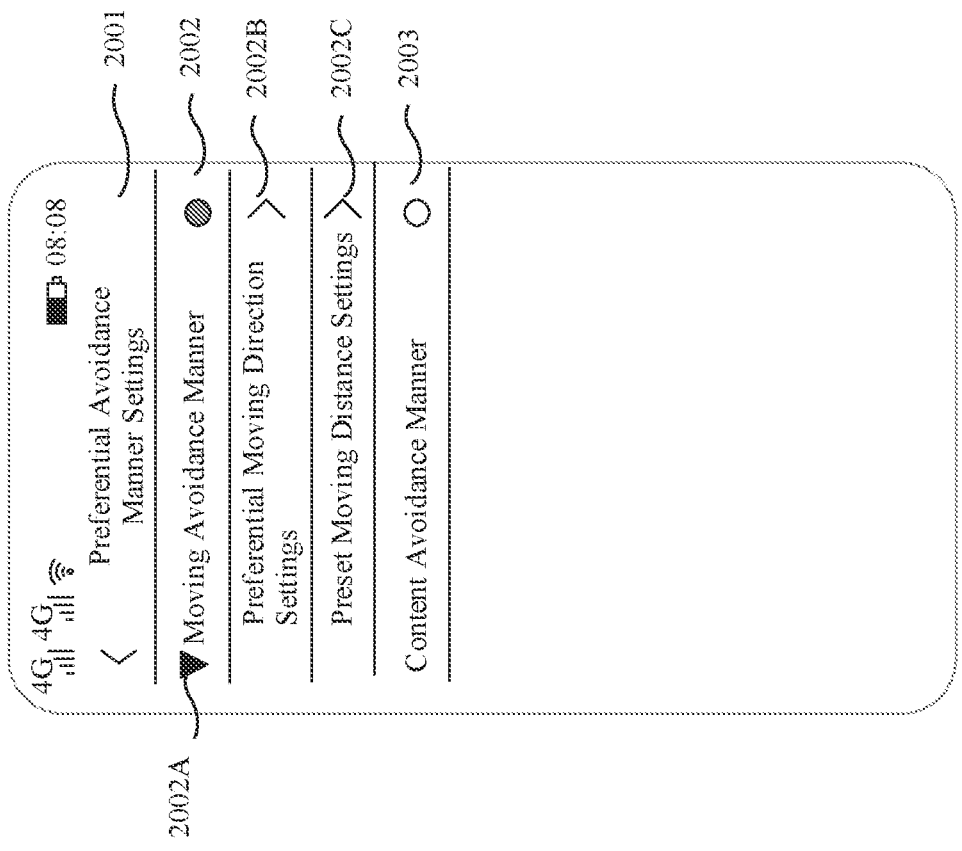
FIG. 20 is another group of schematic diagrams of user interfaces according to an embodiment of this application.
Figure 20:
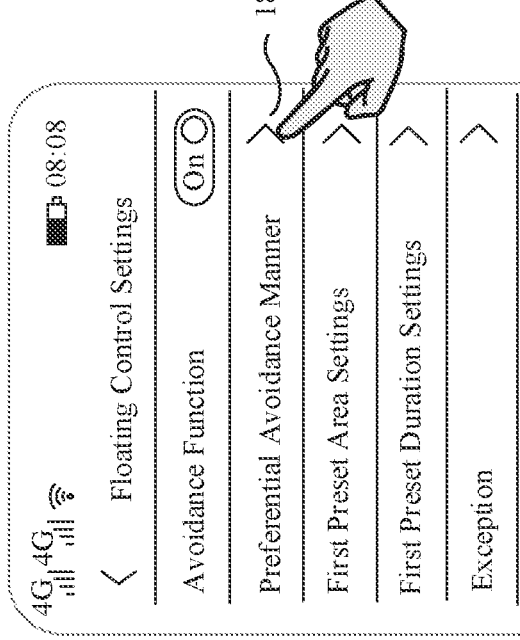

As shown in (a) in FIG. 20, in a possible implementation, in response to a tap operation performed by a user on the preferential avoidance manner control 1806 in the user interface 1804, the electronic device 100 may display a user interface 2000 shown in (b) in FIG. 20. The user interface 2000 is a preferential avoidance manner setting interface.

The user interface 2000 may include a title bar 2001, a moving avoidance manner selection control 2002, and a content avoidance manner selection control 2003.

The title bar 2001 may include a back key and a current page indicator. The back key can be used to back to an upper-level menu. An upper-level page of the user interface 2000 may be the user interface 1804. The current page indicator may be used to indicate a current page. For example, text information "preferential avoidance manner setting" may be used to indicate that the current page is used to display related content of the preferential avoidance manner setting. The current page indicator is not limited to the text information, or may be an icon. This is not limited herein.

The moving avoidance manner selection control 2002 is configured to: receive an operation of the user, and determine that a moving avoidance manner is used as a preferential avoidance manner for automatic avoidance of a floating control of the electronic device 100. The moving avoidance manner indicates that each time the electronic device 100 determines that an automatic avoidance condition of the floating control is currently met, the electronic device 100 moves the floating control based on a preset moving direction and the preset moving distance, to prevent the floating control from blocking content to be read by the user.

In this embodiment of this application, when the electronic device 100 obtains an eyeball gaze location of the user in real time by using the eyeball gaze location calculation module, and determines, by using the control moving module, that the eyeball gaze location of the user on the display 194 is in a first preset area and exceeds first preset duration, the electronic device 100 may determine that the automatic avoidance condition of the floating control is currently met.

The moving avoidance manner selection control 2002 may further include: an expand child control 2002A, a preferential moving direction setting control 2002B, and a preset moving distance setting control 2002C.

The expand child control 2002A is configured to expand or collapse a drop-down menu after an operation of the user is received. The drop-down menu may include a preferential moving direction setting control 2002B and a preset moving distance setting control 2002C.

The preferential moving direction setting control 2002B is configured to provide a setting option for the preferential moving direction of the floating control.

The preset moving distance setting control 2002C is configured to provide a setting option for the preset moving distance of the floating control.

The content avoidance manner selection control 2003 is configured to: receive an operation of the user, and determine that a content avoidance manner is used as the preferential avoidance manner for the automatic avoidance of the floating control of the electronic device 100. The content avoidance manner indicates that when the electronic device 100 determines that the automatic avoidance condition of the floating control is currently met, the electronic device 100 rearranges and displays display content on the display 194 of the electronic device 100 on the display 194, so that the display content is no longer blocked by the floating control.

It should be understood that this is an example. In some embodiments, the electronic device 100 may not have the preferential avoidance manner control 1806, but directly uses a default floating control avoidance manner, to perform the control moving method in this embodiment of this application. This is not limited herein.

Figure 21:
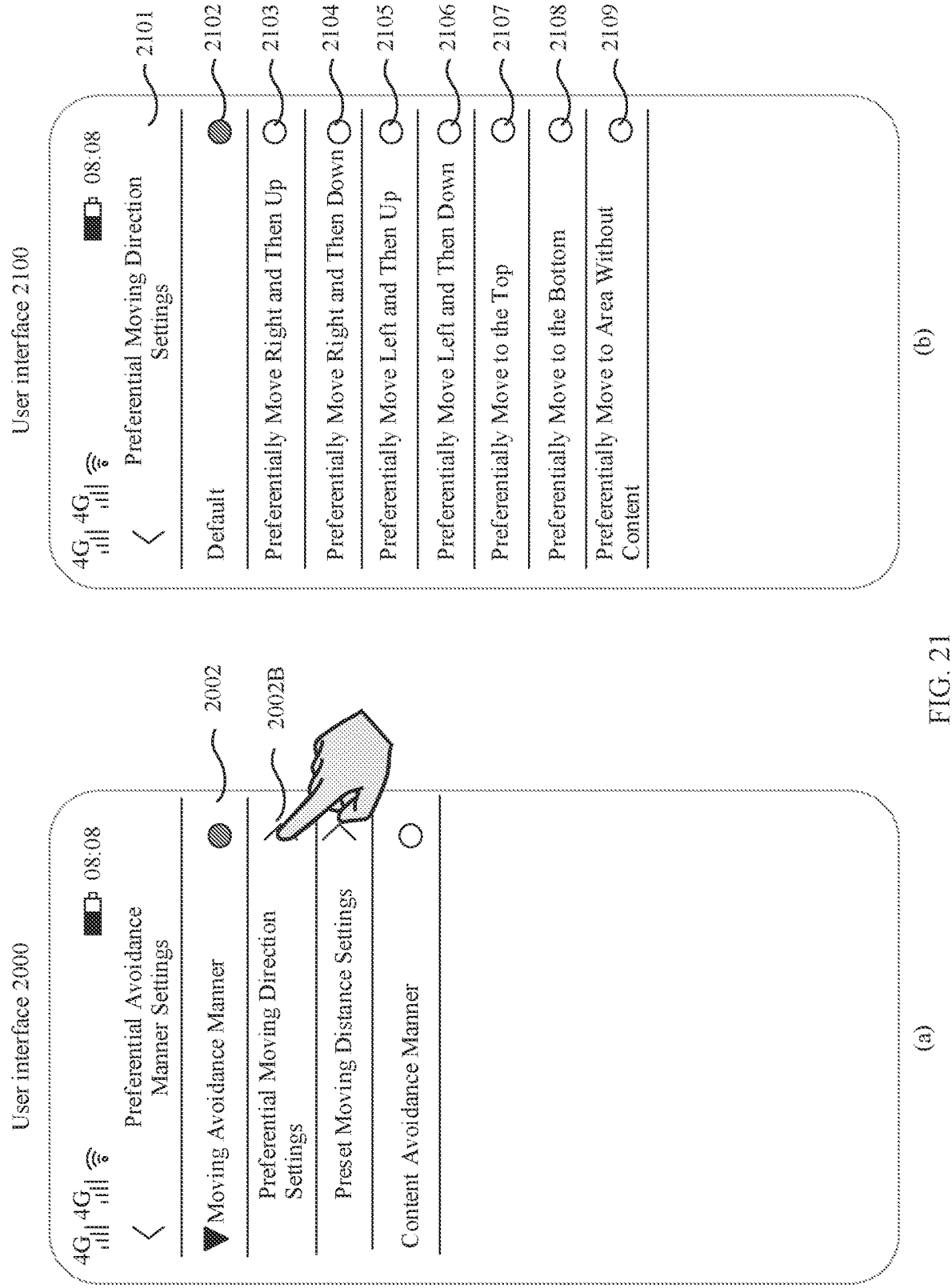
FIG. 21 is another group of schematic diagrams of user interfaces according to an embodiment of this application.

As shown in (a) in FIG. 21, in a possible implementation, in response to a tap operation performed by a user on the preferential moving direction setting control 2002B in the user interface 2000, the electronic device 100 may display a user interface 2100 shown in (b) in FIG. 21. The user interface 2100 is a preferential moving direction setting interface.

The user interface 2100 may include: a title bar 2101, a default moving direction selection control 2102, a selection control 2103 for preferentially moving right, and then up, a selection control 2104 for preferentially moving right, and then down, a selection control 2105 for preferentially moving left, and then up, a selection control 2106 for preferentially moving left, and then down, and a selection control 2107 for preferentially moving to the top, a selection control 2108 for preferentially moving to the bottom, and a selection control 2109 for preferentially moving to an area without content.

The title bar 2101 may include a back key and a current page indicator. The back key can be used to back to an upper-level menu. An upper-level page of the user interface 2100 may be the user interface 2000. The current page indicator may be used to indicate a current page. For example, text information "preferential moving direction setting" may be used to indicate that the current page is used to display related content of the preferential moving direction setting. The current page indicator is not limited to the text information, or may be an icon. This is not limited herein.

The default moving direction selection control 2102 is configured to: receive an operation of the user, and determine, when performing automatic avoidance in a moving avoidance manner, that a floating control of the electronic device 100 preferentially uses a moving direction set by the electronic device 100 by default.

The moving direction that is set by the electronic device 100 by default may be a moving direction preset before delivery, may be a single moving direction, may be a composite moving direction, or may be any one or a combination of other optional moving directions. The moving direction may alternatively be a moving direction determined in real time based on a scenario currently displayed on the display 194 of the electronic device 100 with reference to an artificial intelligence algorithm. This is not limited herein.

The selection control 2103 for preferentially moving right, and then up is configured to: receive an operation of the user, and determine, when performing automatic avoidance in a moving avoidance manner, that the floating control of the electronic device 100 preferentially moves right. When moving to a rightmost side of the display 194 of the electronic device 1X), the floating control of the electronic device 100 preferentially moves up.

The selection control 2104 for preferentially moving right, and then down is configured to: receive an operation of the user, and determine, when performing automatic avoidance in a moving avoidance manner, that the floating control of the electronic device 100 preferentially moves right. When moving to a rightmost side of the display 194 of the electronic device 100, the floating control of the electronic device 100 preferentially moves down.

The selection control 2105 for preferentially moving left, and then up is configured to: receive an operation of the user, and determine, when performing automatic avoidance in a moving avoidance manner, that the floating control of the electronic device 100 preferentially moves left. When moving to a leftmost side of the display 194 of the electronic device 100, the floating control of the electronic device 100 preferentially moves up.

The selection control 2106 for preferentially moving left, and then down is configured to: receive an operation of the user, and determine, when performing automatic avoidance in a moving avoidance manner, that the floating control of the electronic device 100 preferentially moves left. When moving to a leftmost side of the display 194 of the electronic device 100, the floating control of the electronic device 100 preferentially moves down.

The selection control 2107 for preferentially moving to the top is configured to: receive an operation of the user, and determine, when performing automatic avoidance in a moving avoidance manner, that the floating control of the electronic device 100 preferentially directly moves to the top of the display 194.

The selection control 2108 for preferentially moving to the bottom is configured to: receive an operation of the user, and determine, when performing automatic avoidance in a moving avoidance manner, that the floating control of the electronic device 100 preferentially directly moves to the bottom of the display 194.

The selection control 2109 for preferentially moving to an area without content is configured to: receive an operation of the user, and determine, when performing automatic avoidance in a moving avoidance manner, that the floating control of the electronic device 100 preferentially directly moves to an area without display content on the display 194. When there is no area without display content on the display 194, the floating control moves in the default moving direction.

It should be understood that this is an example. In some embodiments, there may be more or fewer optional preferential moving direction options in the user interface 2100 than those shown in (b) in FIG. 21. This is not limited herein. In some embodiments, the electronic device 100 may not have the preferential moving direction setting control 2002B, but directly uses the default moving direction of the floating control, to perform the control moving method in this embodiment of this application. This is not limited herein.

Figure 22:
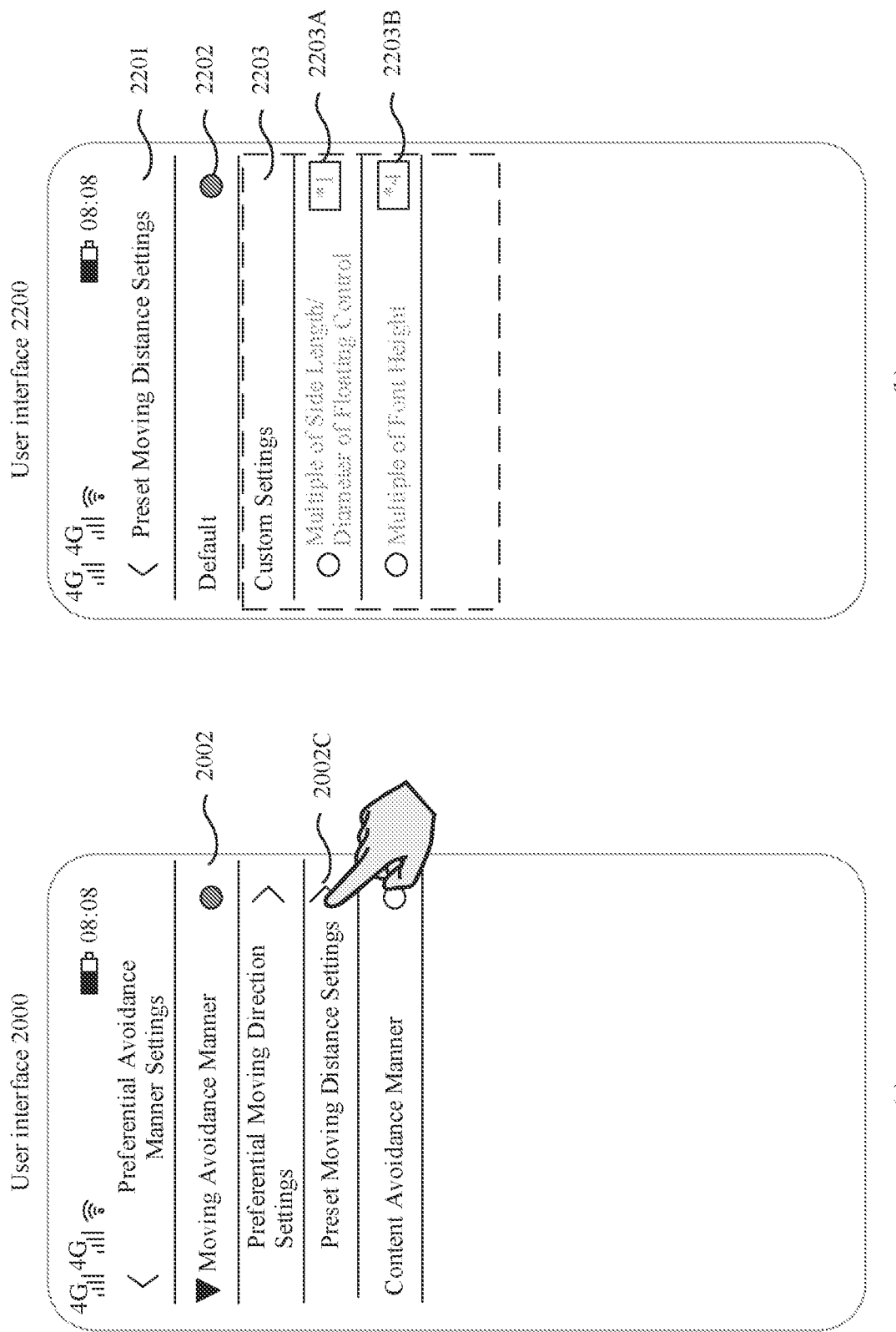
FIG. 22 is another group of schematic diagrams of user interfaces according to an embodiment of this application.

As shown in (a) in FIG. 22, in a possible implementation, in response to a tap operation performed by a user on the preset moving distance setting control 2002C in the user interface 2000, the electronic device 100 may display a user interface 2200 shown in (b) in FIG. 22. The user interface 2200 is a preset moving distance setting interface.

The user interface 2200 may include a title bar 2201, a default moving distance selection control 2202, and a customized setting area 2203.

The title bar 2201 may include a back key and a current page indicator. The back key can be used to back to an upper-level menu. An upper-level page of the user interface 2200 may be the user interface 2000. The current page indicator may be used to indicate a current page. For example, text information "preset moving distance setting" may be used to indicate that the current page is used to display related content of the preset moving distance setting. The current page indicator is not limited to the text information, or may be an icon. This is not limited herein.

The default moving distance selection control 2202 is configured to: receive an operation of the user, and determine, when performing automatic avoidance in a moving avoidance manner, that a floating control of the electronic device 100 moves by using a default moving distance each time.

The customized setting area 2203 is used to customize a moving distance when the floating control performs the automatic avoidance.

The customized setting area 2203 may include a control side length multiple setting control 2203A and a font height multiple setting control 2203B.

The control side length multiple setting control 2203A is configured to: receive an operation of the user, and set, when the floating control of the electronic device 100 performs automatic avoidance in a moving avoidance manner, that a moving distance each time is a multiple of a side length/diameter of the floating control.

The font height multiple setting control 2203B is configured to: receive an operation of the user, and set, when the floating control of the electronic device 100 performs automatic avoidance in a moving avoidance manner, that a moving distance each time is a multiple of a font height.

It should be understood that this is an example. In some embodiments, there may be more or fewer optional preset moving distance setting options in the user interface 2200 than those shown in (b) in FIG. 22. This is not limited herein. In some embodiments, the electronic device 100 may not have the preset moving distance setting control 2002C, but directly uses the default moving distance of the floating control, to perform the control moving method in this embodiment of this application. This is not limited herein.

Figure 23:
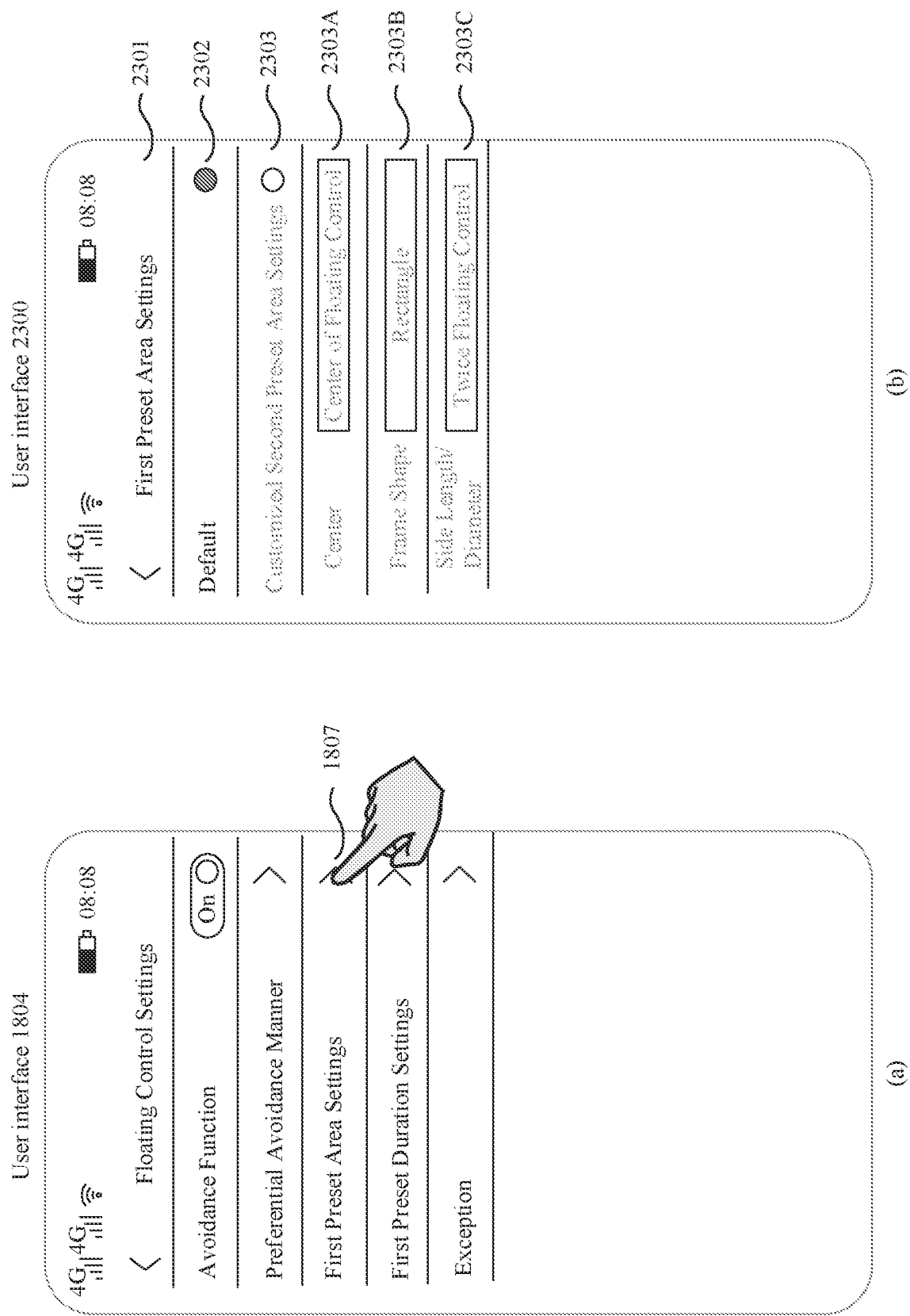
FIG. 23 is another group of schematic diagrams of user interfaces according to an embodiment of this application.

As shown in (a) in FIG. 23, in a possible implementation, in response to a tap operation performed by a user on the first preset area setting control 1807 in the user interface 1804, the electronic device 100 may display a user interface 2300 shown in (b) in FIG. 23. The user interface 2300 is a first preset area setting interface.

The user interface 2300 may include a title bar 2301, a default preset area selection control 2302, and a customized second preset area setting control 2303.

The title bar 2201 may include a back key and a current page indicator. The back key can be used to back to an upper-level menu. An upper-level page of the user interface 2300 may be the user interface 1804. The current page indicator may be used to indicate a current page. For example, text information "first preset area setting" may be used to indicate that the current page is used to display related content of the first preset area setting. The current page indicator is not limited to the text information, or may be an icon. This is not limited herein.

The default preset area selection control 2302 is configured to: receive an operation of the user, and determine that the electronic device 100 uses a default first preset area. The first preset area is a preset size of area that surrounds a floating control but does not include the floating control on the display of the electronic device.

The customized second preset area setting control 2303 is configured to: receive an operation of the user and customize a second preset area. In this case, the first preset area may be an area that is on the display of the electronic device and in which the second preset area surrounds the floating control, a center of the second preset area moves along with the floating control, and the second preset area does not include the floating control.

The customized second preset area setting control 2303 may include a center setting child control 2303A, a frame shape setting child control 2303B, and a side length/diameter setting child control 2303C.

The center setting child control 2303A is configured to set the center of the second preset area. The center of the second preset area moves along with the floating control. Preferably, the center of the second preset area is a center of the floating control.

The frame shape setting child control 2303B is configured to set a frame shape of the second preset area. For example, a shape of a side length may be set to a rectangle, a circle, or the like. This is not limited herein.

The side length/diameter setting child control 2303C is configured to set a side length/diameter of the second preset area. For example, the side length of the second preset area may be set to be twice a side length/diameter of the floating control. Alternatively, the side length/diameter may be set to a specific value. This is not limited herein. It may be understood that the side length/diameter of the second preset area is greater than the side length/diameter of the floating control.

It should be understood that this is an example. In some embodiments, there may be more or fewer optional first preset area setting options in the user interface 2300 than those shown in (b) in FIG. 23. This is not limited herein. In some embodiments, the electronic device 100 may not have the first preset area setting control 1807, but directly uses the default first preset area, to perform the control moving method in this embodiment of this application. This is not limited herein.

Figure 24:
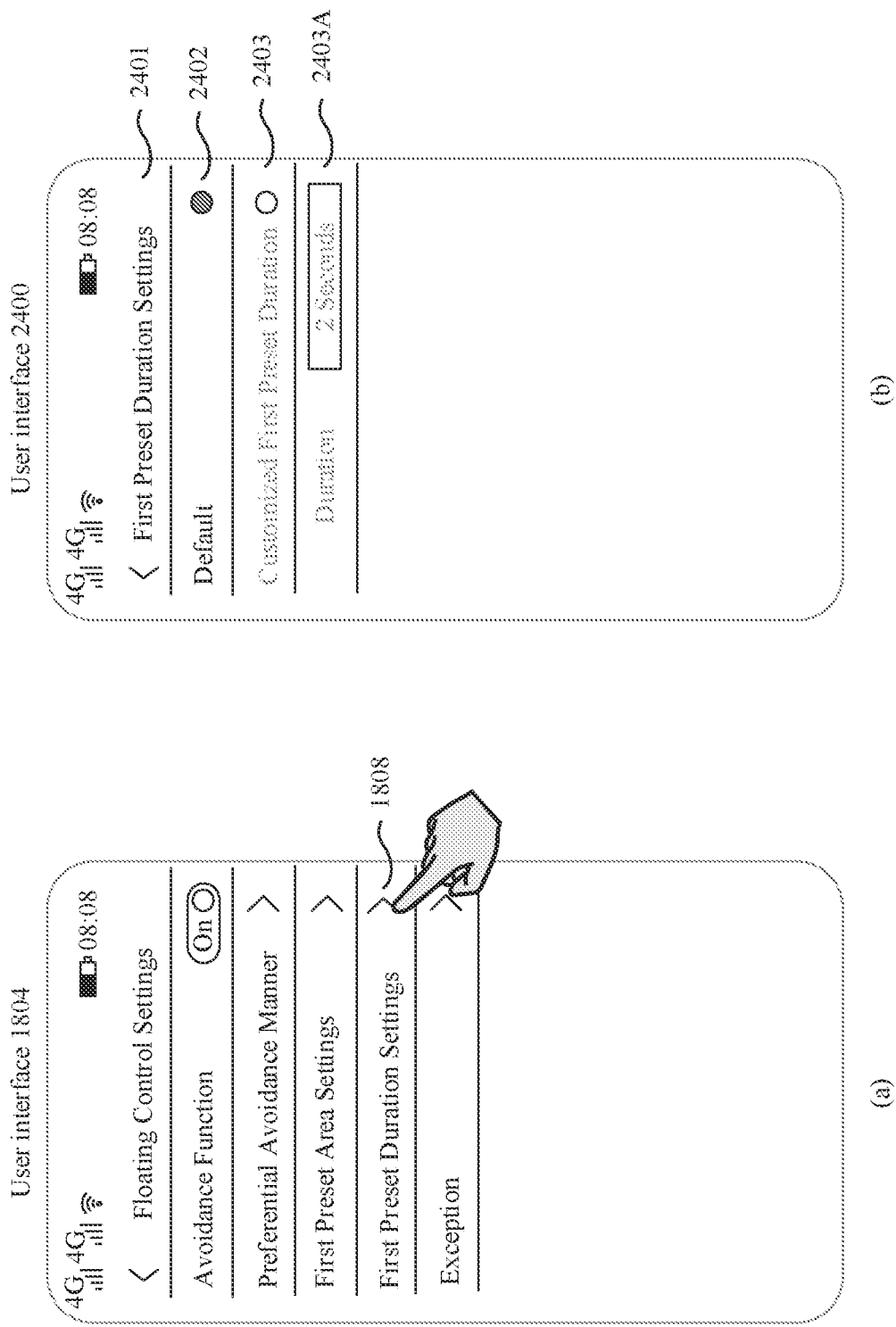
FIG. 24 is another group of schematic diagrams of user interfaces according to an embodiment of this application.

As shown in (a) in FIG. 24, in a possible implementation, in response to a tap operation performed by a user on the first preset duration setting control 1808 in the user interface 1804, the electronic device 100 may display a user interface 2400 shown in (b) in FIG. 24. The user interface 2400 is a first preset duration setting interface.

The user interface 2400 may include a title bar 2401, a default preset duration selection control 2402, and a customized first preset duration setting control 2403.

The title bar 2401 may include a back key and a current page indicator. The back key can be used to back to an upper-level menu. An upper-level page of the user interface 2400 may be the user interface 1804. The current page indicator may be used to indicate a current page. For example, text information "first preset duration setting" may be used to indicate that the current page is used to display related content of the first preset duration setting. The current page indicator is not limited to the text information, or may be an icon. This is not limited herein.

The default preset duration selection control 2402 is configured to: receive an operation of the user, and determine that the electronic device 100 uses a default first preset duration.

The customized first preset duration setting control 2403 is configured to: receive an operation of the user and determine to customize the first preset duration.

The customized first preset duration setting control 2403 may further include a duration setting child control 2403A. The duration setting child control 2403A is configured to receive first preset duration that is entered by the user and that is customized, for example, 2 seconds or 3 seconds. This is not limited herein.

It should be understood that this is an example. In some embodiments, there may be more or fewer optional first preset duration setting options in the user interface 2400 than those shown in (b) in FIG. 24. This is not limited herein. In some embodiments, the electronic device 100 may not have the first preset duration setting control 1808, but directly uses the default first preset duration, to perform the control moving method in this embodiment of this application. This is not limited herein.

Figure 25:
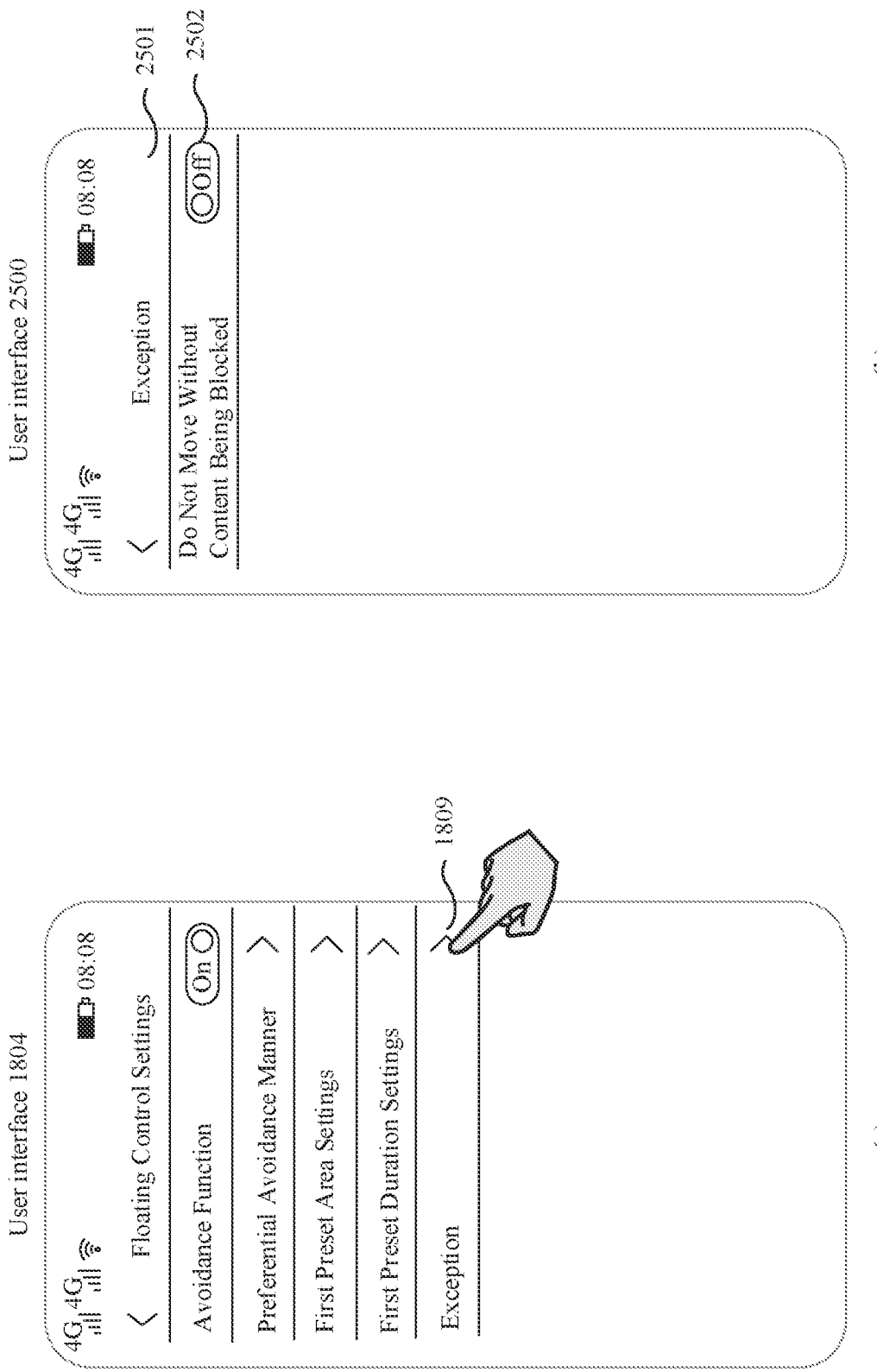
FIG. 25 is another group of schematic diagrams of user interfaces according to an embodiment of this application.

As shown in (a) in FIG. 25, in a possible implementation, in response to a tap operation performed by a user on the first exception control 1809 in the user interface 1804, the electronic device 100 may display a user interface 2500 shown in (b) in FIG. 25. The user interface 2500 is an exception setting interface.

The user interface 2500 may include a title bar 2501, and an on/off control 2502 for not moving without content being blocked.

The title bar 2501 may include a back key and a current page indicator. The back key can be used to back to an upper-level menu. An upper-level page of the user interface 2500 may be the user interface 1804. The current page indicator may be used to indicate a current page. For example, text information "exception" may be used to indicate that the current page is used to display related content of the exception setting. The current page indicator is not limited to the text information, or may be an icon. This is not limited herein.

The on/off control 2502 for not moving without content being blocked is configured to receive an operation of the user, and enable or disable a function of not moving without content being blocked.

When the function of not moving without content being blocked is disabled, and when the electronic device 100 determines that an eyeball gaze location of the user on the display 194 is in the first preset area and exceeds the first preset duration, the electronic device 100 moves a floating control, so that the first preset area no longer covers the eyeball gaze location of the user.

When the function of not moving without content being blocked is enabled, and when the electronic device 100 determines that an eyeball gaze location of the user on the display 194 is in the first preset area and exceeds the first preset duration, the electronic device further determines whether the floating control blocks content in a first window below the floating control in this case. The electronic device 100 moves the floating control only when determining that the floating control blocks the content in the first window. The electronic device may not move the floating control when determining that the floating control does not block the content in the first window.

It should be understood that this is an example. In some embodiments, there may be more or fewer optional exception options in the user interface 2500 than those shown in (b) in FIG. 25. This is not limited herein. In some embodiments, the electronic device 100 may not have the exception control 1809, but directly enables or disables functions in some exceptions by default, to perform the control moving method in this embodiment of this application. This is not limited herein.

With reference to the foregoing examples of the user interfaces for parameter setting, the following describes examples of user interfaces in control moving scenarios in embodiments of this application in several cases.

Case 1: A Moving Avoidance Manner is Used, and the Exception Setting Control 1809 is not Enabled.

For example, in a possible implementation, in this case, the following operations may be performed in a setting 1.

As shown in (b) in FIG. 19, when the avoidance function on/off control 1805 in the user interface 1804 is in an on state, an automatic avoidance function of a floating control of the electronic device 100 is enabled.

As shown in (b) in FIG. 20, the moving avoidance manner selection control 2002 in the user interface 2000 is in a selected state, and the moving avoidance manner is used as a preferential avoidance manner for automatic avoidance of the floating control.

Figure 26A:
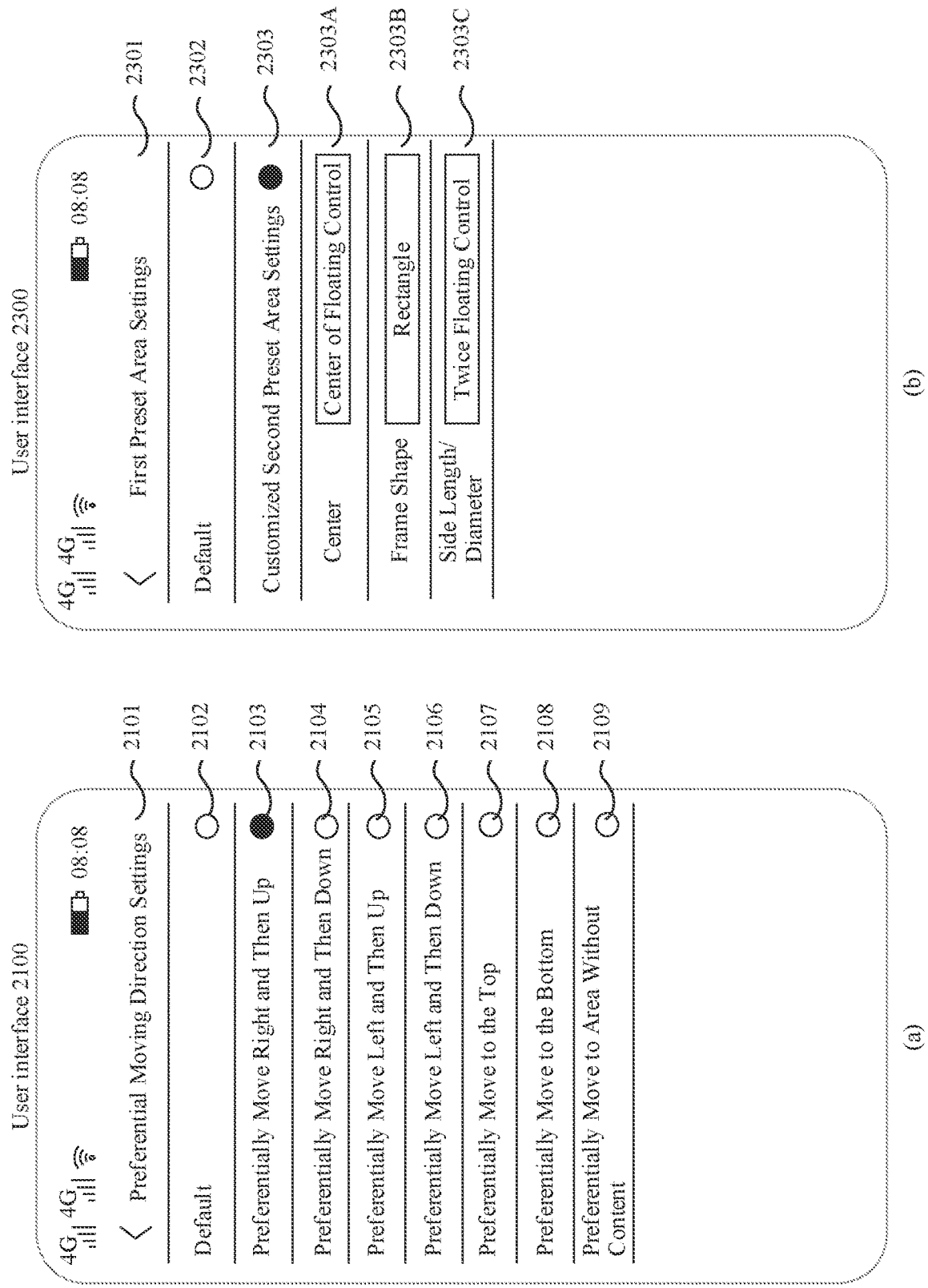

As shown in (a) in FIG. 26A, the selection control 2103 for preferentially moving right, and then up in the user interface 2100 is in a selected state, and when performing the automatic avoidance in the moving avoidance manner, the floating control preferentially moves right. When moving to a rightmost side of the display 194 of the electronic device 100, the floating control preferentially moves up.

As shown in (b) in FIG. 22, the default moving distance selection control 2202 in the user interface 2200 is in a selected state, and when performing the automatic avoidance in the moving avoidance manner, the floating control moves by using a default moving distance.

As shown in (b) in FIG. 26A, the customized second preset area setting control 2303 in the user interface 2300 is in a selected state. In addition, the center setting child control 2303A sets that the second preset area uses a center of the floating control as a center of the second preset area, the frame shape setting child control 2303B sets that a frame shape of the second preset area is a rectangle, and the side length/diameter setting child control 2303C sets that a side length/diameter of the second preset area is twice a side length/diameter of the floating control.

As shown in (c) in FIG. 26B, the customized first preset duration setting control 2403 in the user interface 2400 is in a selected state, and a value of the duration setting child control 2403A is 2 seconds.

As shown in (b) in FIG. 25, the on/off control 2502 for not moving without content being blocked in the user interface 2500 is in an off state, and a function of not moving without content being blocked is not enabled.

In the setting 1, the electronic device 100 may detect that duration of an eyeball gaze location of a user in a first preset area reaches first preset duration, and a floating control automatically moves right. For example, FIG. 27A and FIG. 27B are a schematic diagram of another scenario of a control moving method according to an embodiment of this application.

Figure 27A:
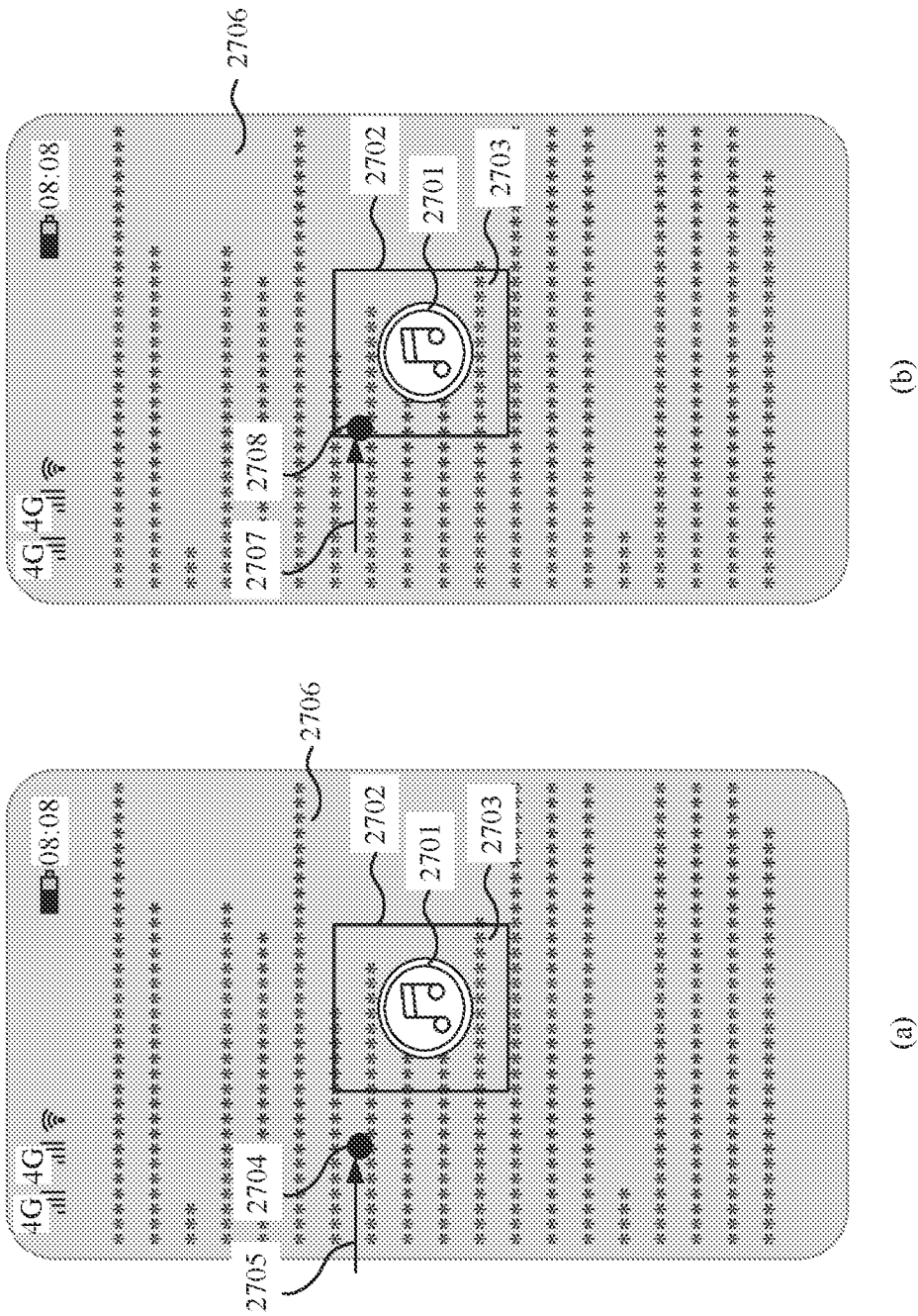
FIG. 27A and FIG. 27B are another group of schematic diagrams of user interfaces according to an embodiment of this application.
Figure 27B:
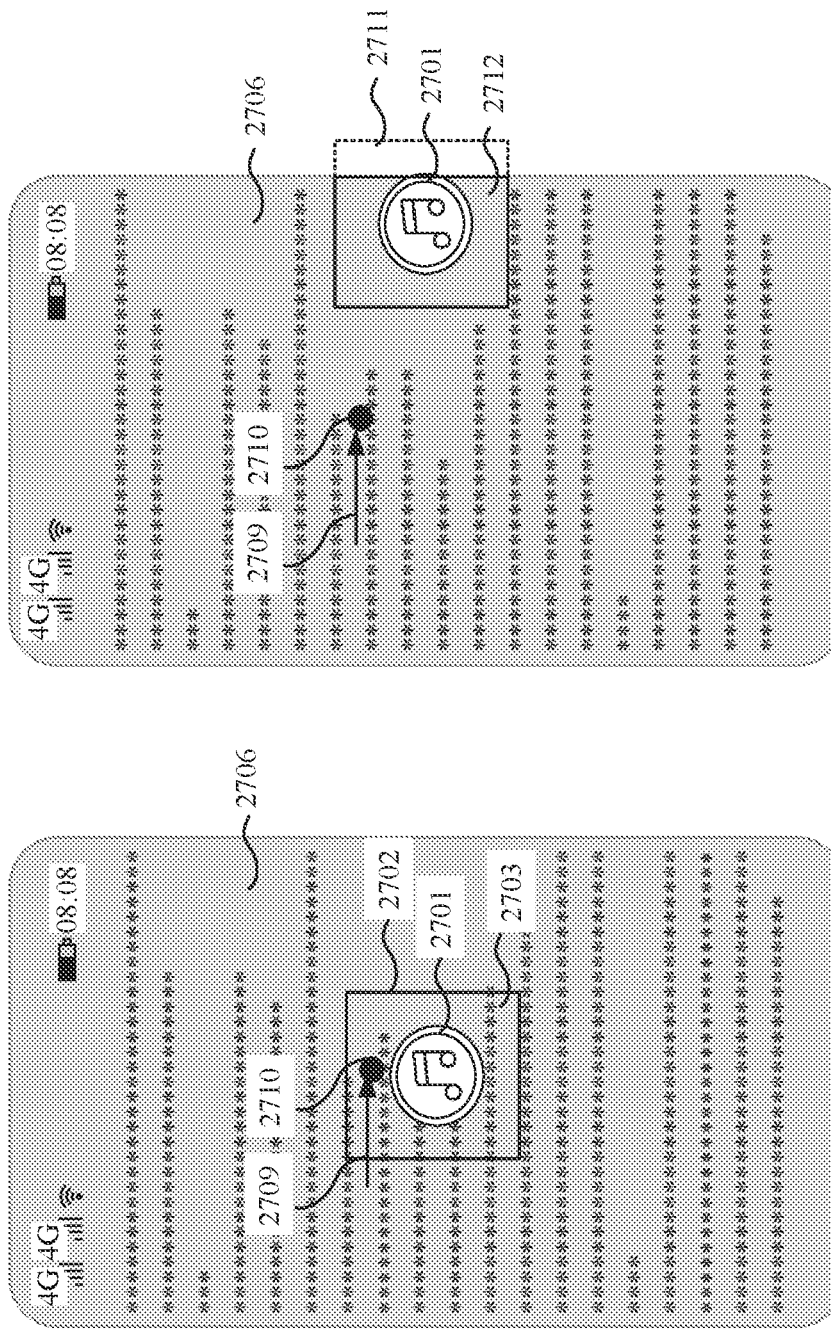

As shown in (a) in FIG. 27A, a first window 2706 is currently displayed on the display 194 of the electronic device 100. The first window 2706 is a window of an application. A floating control 2701 is displayed above the first window 2706. A frame shape of a second preset area 2702 is a rectangle, a center of the floating control 2701 is used as a center of the second preset area 2702, and a side length that is twice a diameter of the floating control 2701 is used as a side length of the second preset area 2702. In this case, the second preset area is all within a display range of the display 194 of the electronic device 100. Therefore, areas that are in the second preset area 2702 and that exclude the floating control 2701 are all a first preset area 2703. Because the avoidance function on/off control 1805 in the user interface 1804 is in an on state, the electronic device 100 may detect an eyeball gaze location of a user in real time. When the user reads content in the first window 2706, a moving direction of the eyeball gaze location of the user is a direction shown by an arrow 2705. In this case, the eyeball gaze location of the user is located at a first eyeball gaze location 2704.

As shown in (b) in FIG. 27A, the user continues reading in a direction shown by an arrow 2707. In this case, the electronic device 100 may detect that the eyeball gaze location of the user on the display 194 is located at a second eyeball gaze location 2708. The electronic device 100 may determine that the second eyeball gaze location 2708 is within a range of the first preset area 2703, and start timing.

It may be understood that, the electronic device 100 uses different eyeball tracking technologies and sets different eyeball tracking intervals. In some embodiments, the electronic device 100 may continuously monitor the eyeball gaze location of the user on the display 194. In this case, the electronic device 100 may start timing when determining that the eyeball gaze location is on an edge of the first preset area and just enters the range of the first preset area. In some embodiments, the electronic device 100 may periodically detect the eyeball gaze location of the user on the display 194 based on preset interval duration. In this case, when the electronic device 100 determines the eyeball gaze location of the user sometime, the eyeball gaze location may be already in the first preset area. In this case, the electronic device 100 may start timing when determining, for the first time, that the eyeball gaze location of the user is in the first preset area. This is not limited in this embodiment of this application.

As shown in (c) in FIG. 27B, the user continues reading in a direction shown by an arrow 2709. In this case, the electronic device 100 may detect that the eyeball gaze location of the user on the display 194 is located at a third eyeball gaze location 2710. In addition, the electronic device 100 may determine that the eyeball gaze location of the user is from the second eyeball gaze location 2708 to the third eyeball gaze location 2710, and duration of the eyeball gaze location of the user has reached first preset duration of 2 seconds. In this case, the electronic device 100 may determine that the user is in a reading state and continues to read, and the floating control 2701 may block content that is to be read by the user.

As shown in (d) in FIG. 27B, because the selection control 2103 for preferentially moving right, and then up of the user in the user interface 2100 of the electronic device 100 is in a selected state, the electronic device 100 first moves the floating control 2701 right based on the preferential moving direction. In this case, the floating control 2701 is moved right to a right side edge of the display 194, and a second preset area 2711 moves along with the floating control 2701. Because the floating control 2701 is located on the right side edge of the display 194, a part of the second preset area 2711 is no longer located in a display area of the display 194. In this case, a first preset area 2712 is a part that does not include the floating control 2701 in the second preset area 2711 on the display 194. After the electronic device 100 automatically moves the floating control 2701, the first preset area 2712 in this case no longer covers the third eyeball gaze location 2710 at which the user currently gazes. Therefore, in a following period of time, the floating control 2701 does not block the content that is to be read by the user.

In the setting 1, the electronic device 100 may detect that duration of an eyeball gaze location of a user in a first preset area reaches first preset duration, and a floating control automatically moves up. For example, FIG. 28A and FIG. 28B are a schematic diagram of another scenario of a control moving method according to an embodiment of this application.

Figure 28A:
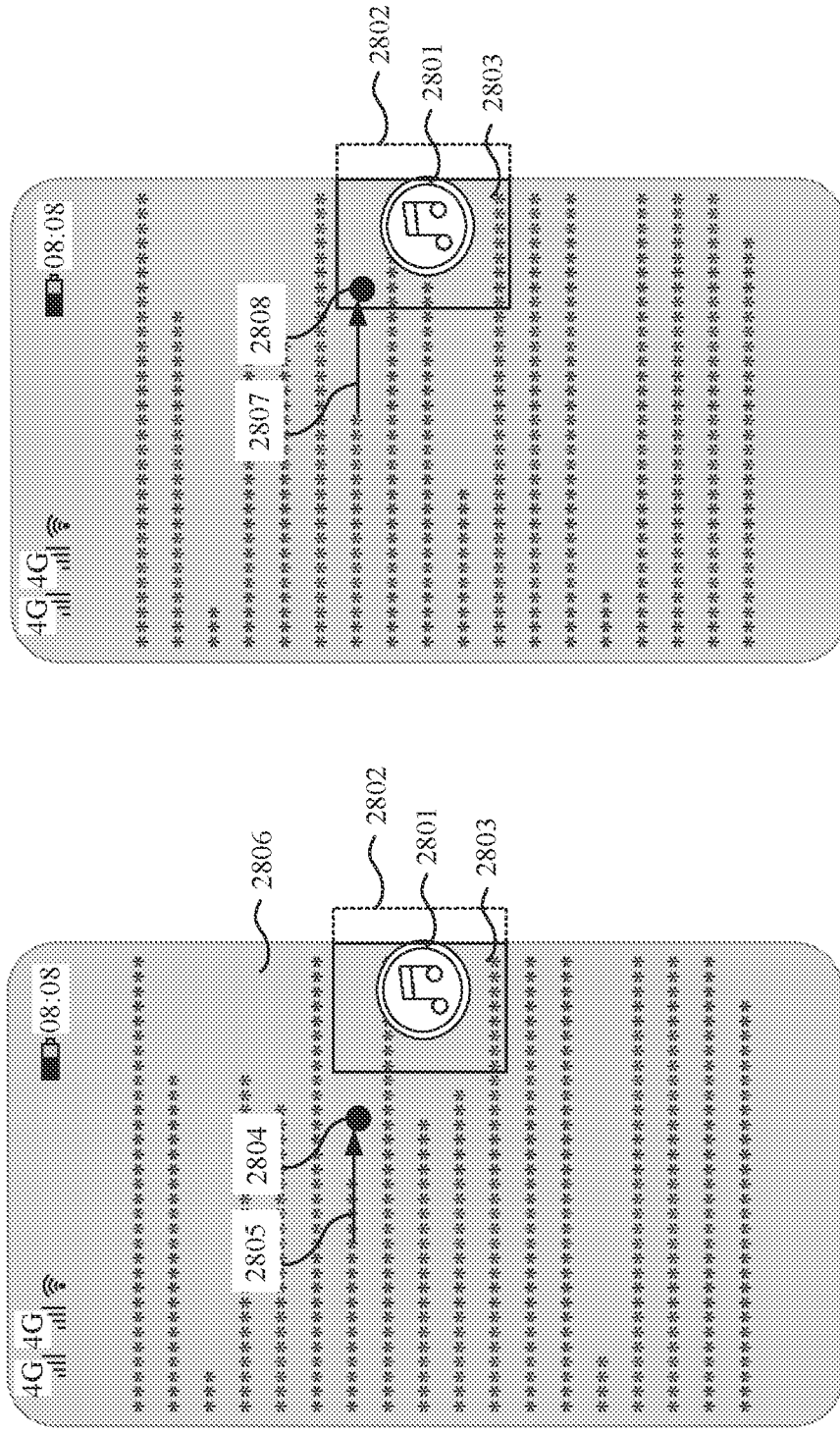
FIG. 28A and FIG. 28B are another group of schematic diagrams of user interfaces according to an embodiment of this application.

As shown in (a) in FIG. 28A, a first window 2806 is currently displayed on the display 194 of the electronic device 100. The first window 2806 is a window of an application. A floating control 2801 is displayed above the first window 2806. A frame shape of a second preset area 2802 is a rectangle, a center of the floating control 2801 is used as a center of the second preset area 2802, and a side length that is twice a diameter of the floating control 2801 is used as a side length of the second preset area 2802. In this case, because the floating control 2801 is located on a right side edge of the display 194, a part of the second preset area 2802 is not within a display range of the display 194 of the electronic device 100. Therefore, an area that does not include the floating control 2801 in the second preset area 2802 on the display 194 is a first preset area 2803. Because the avoidance function on/off control 1805 in the user interface 1804 is in an on state, the electronic device 100 may detect an eyeball gaze location of a user in real time. When the user reads content in the first window 2806, a moving direction of the eyeball gaze location of the user is a direction shown by an arrow 2805. In this case, the eyeball gaze location of the user is located at a fourth eyeball gaze location 2804.

As shown in (b) in FIG. 28A, the user continues reading in a direction shown by an arrow 2807. In this case, the electronic device 100 may detect that the eyeball gaze location of the user on the display 194 is located at a fifth eyeball gaze location 2808. The electronic device 100 may determine that the fifth eyeball gaze location 2808 is within a range of the first preset area 2803, and start timing.

Figure 28B:
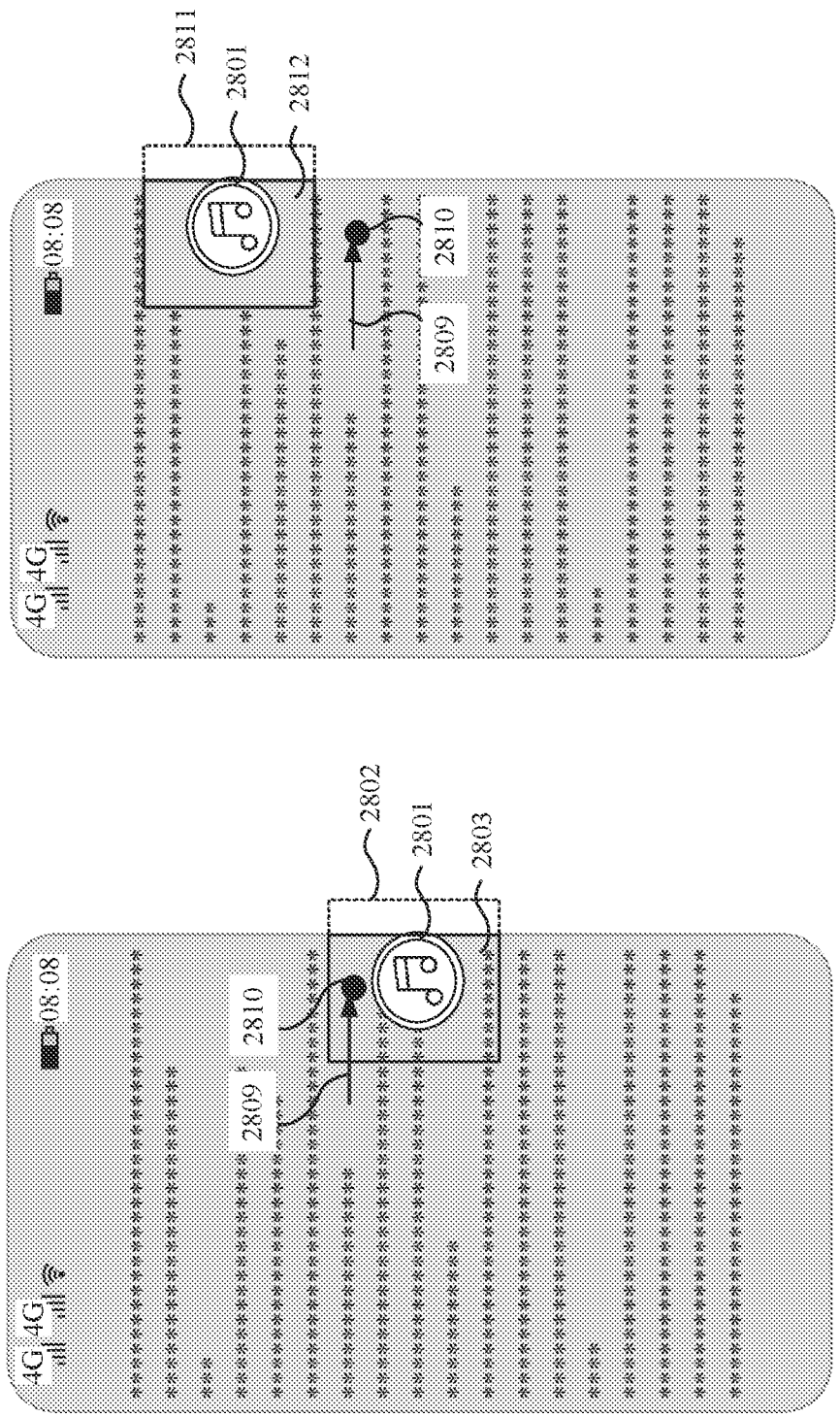

As shown in (c) in FIG. 28B, the user continues reading in a direction shown by an arrow 2809. In this case, the electronic device 100 may detect that the eyeball gaze location of the user on the display 194 is located at a sixth eyeball gaze location 2810. In addition, the electronic device 100 may determine that the eyeball gaze location of the user is from the fifth eyeball gaze location 2808 to the sixth eyeball gaze location 2810, and duration of the eyeball gaze location of the user has reached first preset duration of 2 seconds. In this case, the electronic device 100 may determine that the user is in a reading state and continues to read, and the floating control 2801 may block content that is to be read by the user.

As shown in (d) in FIG. 28B, because the selection control 2103 for preferentially moving right, and then up of the user in the user interface 2100 of the electronic device 100 is in a selected state, and the floating control 2801 is already on a rightmost side of the display 194, the floating control 2801 is moved up by the electronic device 100 based on a preset moving distance. After the electronic device 100 moves the floating control 2801 up, the second preset area that moves along with the floating control 2801 is updated to a second preset area 2811. A part that does not include the floating control 2801 in the second preset area 2811 on the display 194 is a first preset area 2812. After the electronic device 100 automatically moves the floating control 2801, the first preset area 2812 in this case no longer covers the sixth eyeball gaze location 2810 at which the user currently gazes. Therefore, in a following period of time, the floating control 2801 does not block the content that is to be read by the user.

In the setting 1, the electronic device 100 may detect that an eyeball gaze location of a user moves to a floating control before duration of the eyeball gaze location of the user in a first preset area reaches first preset duration, and the floating control does not move. For example, FIG. 29A and FIG. 29B are a schematic diagram of another scenario of a control moving method according to an embodiment of this application.

Figure 29A:
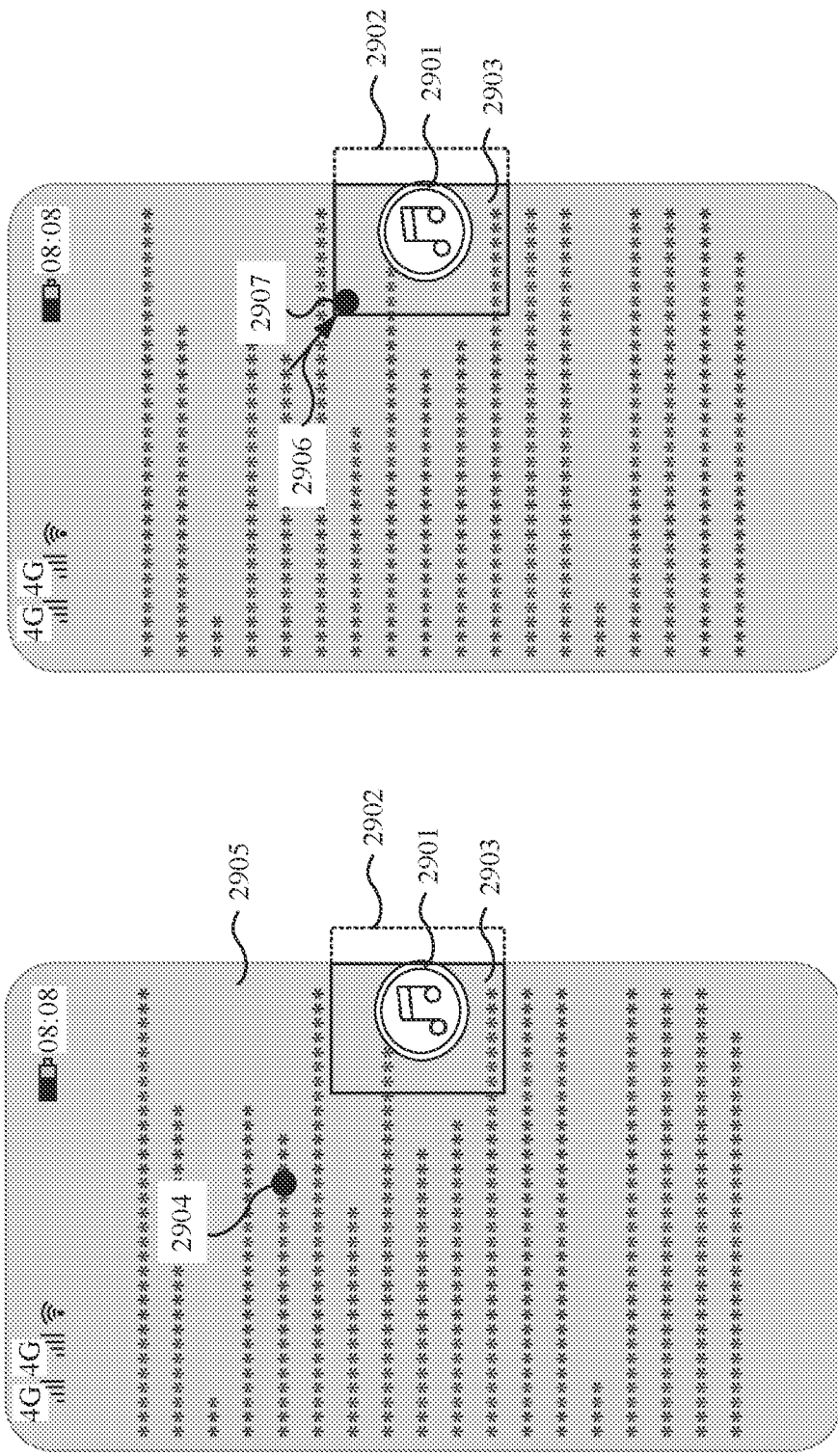
FIG. 29A and FIG. 29B are another group of schematic diagrams of user interfaces according to an embodiment of this application.

As shown in (a) in FIG. 29A, a first window 2905 is currently displayed on the display 194 of the electronic device 100. The first window 2905 is a window of an application. A floating control 2901 is displayed above the first window 2905. A frame shape of a second preset area 2902 is a rectangle, a center of the floating control 2901 is used as a center of the second preset area 2902, and a side length that is twice a diameter of the floating control 2901 is used as a side length of the second preset area 2902. In this case, because the floating control 2901 is located on a right side edge of the display 194, a part of the second preset area 2902 is not within a display range of the display 194 of the electronic device 100. Therefore, an area that does not include the floating control 2901 in the second preset area 2902 on the display 194 is a first preset area 2903. Because the avoidance function on/off control 1805 in the user interface 1804 is in an on state, the electronic device 100 may detect an eyeball gaze location of a user in real time. In this case, the eyeball gaze location of the user is located at a seventh eyeball gaze location 2904 on the display 194.

As shown in (b) in FIG. 29A, at a moment, eyes of the user move toward the lower right of the display 194 in a direction of an arrow 2906. The electronic device 100 detects that the eyeball gaze location of the user on the display 194 in this case is an eighth eyeball gaze location 2907. The electronic device 100 may determine that the eighth eyeball gaze location 2907 is within a range of the first preset area 2903, and start timing.

Figure 29B:
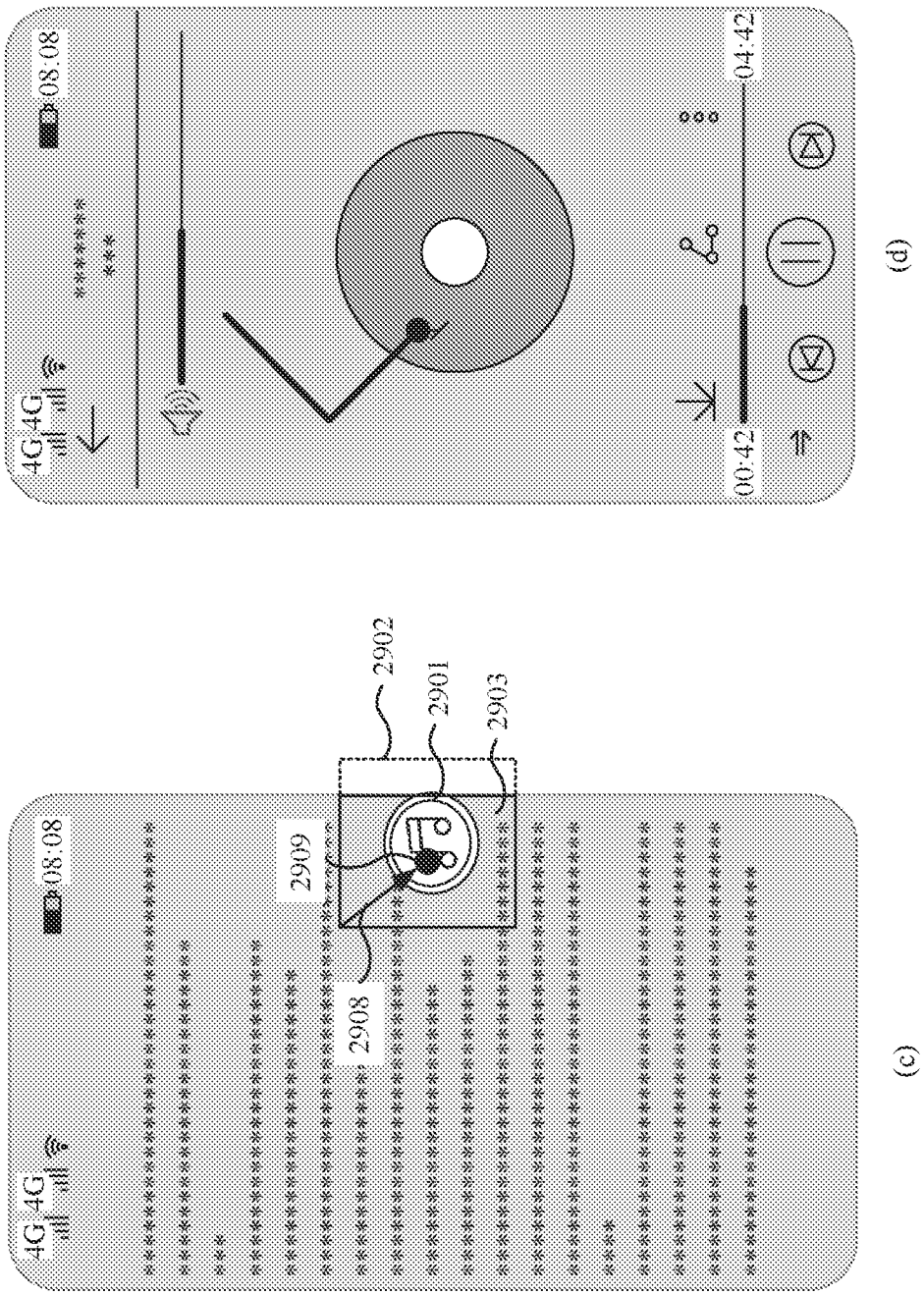

As shown in (c) in FIG. 29B, when timing does not reach first preset duration of 2 seconds, the electronic device 100 detects that the eyeball gaze location of the user on the display 194 has moved to a ninth eyeball gaze location 2909 in a direction of an arrow 2908, and left the range of the first preset area 2903. The electronic device 100 determines that duration of the eyeball gaze location of the user in the first preset area 2903 does not reach the first preset duration. Therefore, the electronic device 100 may determine that the user does not need to read content around the floating control and content below the floating control in this case. The electronic device 100 does not move the floating control 2901.

For example, in a possible implementation, when the electronic device 100 detects that the eyeball gaze location of the user on the display 194 remains on the floating control 2901 for second preset duration, the electronic device 100 may open a window corresponding to the floating control 2901, and display the window on the display 194. As shown in (d) in FIG. 29B, the electronic device 100 may display, on the display 194, a music playing window corresponding to the floating control 2901.

In the setting 1, the electronic device 100 may detect that an eyeball gaze location of a user moves from a floating control to a first preset area, and after duration of the eyeball gaze location of the user in the first preset area reaches first preset duration, the floating control automatically moves up. For example, FIG. 30A and FIG. 30B are a schematic diagram of another scenario of a control moving method according to an embodiment of this application.

Figure 30A:
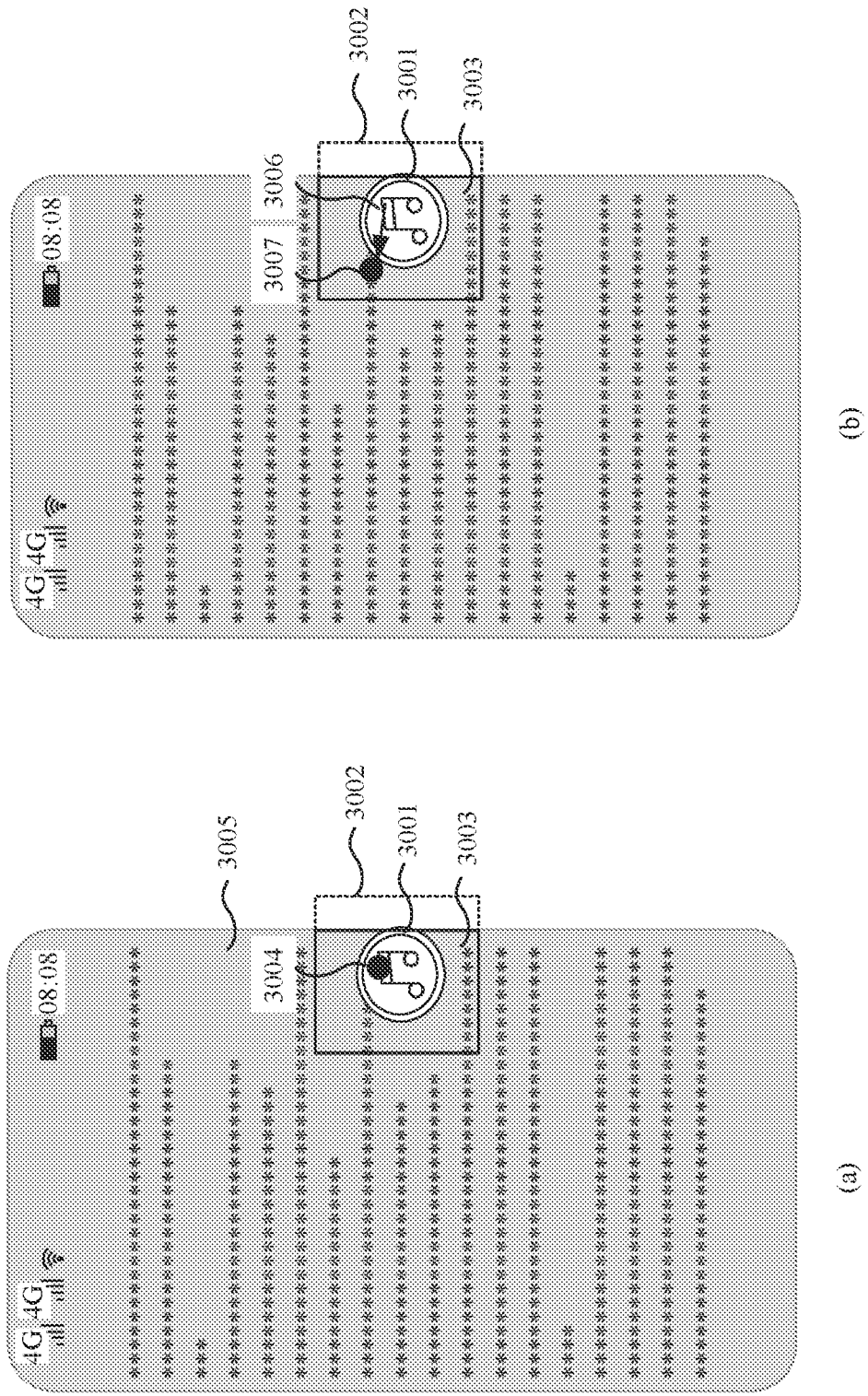
FIG. 30A and FIG. 30B are another group of schematic diagrams of user interfaces according to an embodiment of this application.

As shown in (a) in FIG. 30A, a first window 3005 is currently displayed on the display 194 of the electronic device 100. The first window 3005 is a window of an application. A floating control 3001 is displayed above the first window 3005. A frame shape of a second preset area 3002 is a rectangle, a center of the floating control 3001 is used as a center of the second preset area 3002, and a side length that is twice a diameter of the floating control 3001 is used as a side length of the second preset area 3002. In this case, because the floating control 3001 is located on a right side edge of the display 194, a part of the second preset area 3002 is not within a display range of the display 194 of the electronic device 100. Therefore, an area that does not include the floating control 3001 in the second preset area 3002 on the display 194 is a first preset area 3003. Because the avoidance function on/off control 1805 in the user interface 1804 is in an on state, the electronic device 100 may detect an eyeball gaze location of a user in real time. In this case, the eyeball gaze location of the user is located at a tenth eyeball gaze location 3004 on the display 194. The tenth eyeball gaze location 3004 is on the floating control 3001.

As shown in (b) in FIG. 30A, at a moment, eyes of the user move in a direction of an arrow 3006. The electronic device 100 detects that the eyeball gaze location of the user on the display 194 in this case is an eleventh eyeball gaze location 3007, and the eleventh eyeball gaze location 3007 is on an edge of the floating control 3001. The electronic device 100 may determine that the eleventh eyeball gaze location 3007 is within a range of the first preset area 3003, and start timing.

Figure 30B:
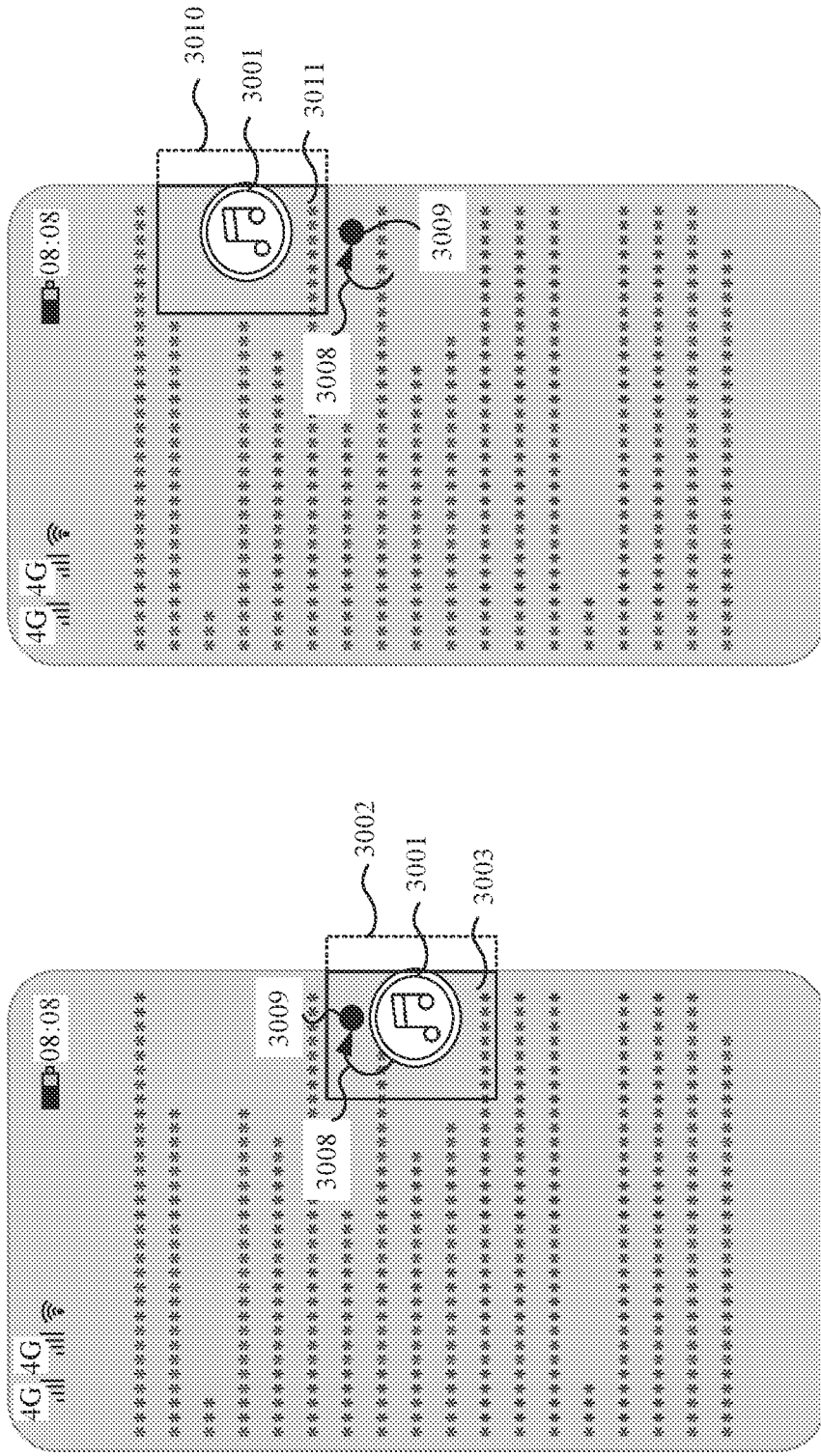

As shown in (c) in FIG. 30B, the user reads content in the first window 3005 in a direction shown by an arrow 3008.

In this case, the electronic device 100 may detect that the eyeball gaze location of the user on the display 194 is located at a twelfth eyeball gaze location 3009. In addition, the electronic device 100 may determine that the eyeball gaze location of the user is from the eleventh eyeball gaze location 3007 to the twelfth eyeball gaze location 3009, and duration of the eyeball gaze location of the user has reached first preset duration of 2 seconds. In this case, the electronic device 100 may determine that the user is in a reading state and continues to read, and the floating control 3001 may block content that is to be read by the user.

As shown in (d) in FIG. 30B, because the selection control 2103 for preferentially moving right, and then up of the user in the user interface 2100 of the electronic device 100 is in a selected state, and the floating control 3001 is already on a rightmost side of the display 194, the floating control 3001 is moved up by the electronic device 100 based on a preset moving distance. After the electronic device 100 moves the floating control 3001 up, the second preset area 3002 that moves along with the floating control 3001 is updated to a second preset area 3010. A part that does not include the floating control 3001 in the second preset area 3010 on the display 194 is a first preset area 3011. After the electronic device 100 automatically moves the floating control 3001, the first preset area 3011 in this case no longer covers the twelfth eyeball gaze location 3009 at which the user currently gazes. Therefore, in a following period of time, the floating control 3001 does not block the content that is to be read by the user.

In the setting 1, the electronic device 100 may detect that an eyeball gaze location of a user moves from a floating control to a first preset area, and leaves the first preset area before duration of the eyeball gaze location of the user in the first preset area reaches first preset duration, and the floating control does not move. For example, FIG. 31A and FIG. 31B are a schematic diagram of another scenario of a control moving method according to an embodiment of this application.

Figure 31A:
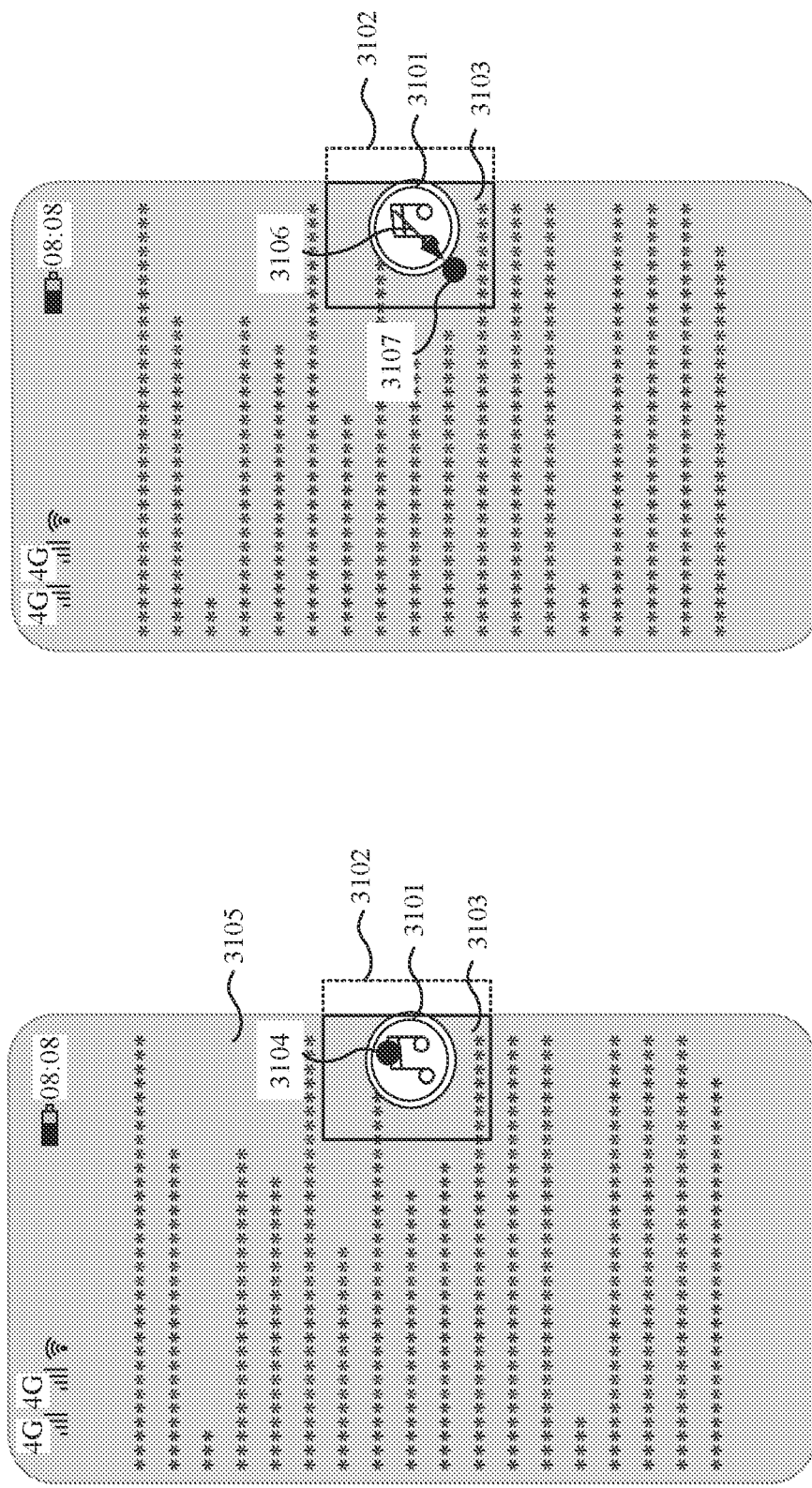
FIG. 31A and FIG. 31B are another group of schematic diagrams of user interfaces according to an embodiment of this application.

As shown in (a) in FIG. 31A, a first window 3105 is currently displayed on the display 194 of the electronic device 100. The first window 3105 is a window of an application. A floating control 3101 is displayed above the first window 3105. A frame shape of a second preset area 3102 is a rectangle, a center of the floating control 3101 is used as a center of the second preset area 3102, and a side length that is twice a diameter of the floating control 3101 is used as a side length of the second preset area 3102. In this case, because the floating control 3101 is located on a right side edge of the display 194, a part of the second preset area 3102 is not within a display range of the display 194 of the electronic device 100. Therefore, an area that does not include the floating control 3101 in the second preset area 3102 on the display 194 is a first preset area 3103. Because the avoidance function on/off control 1805 in the user interface 1804 is in an on state, the electronic device 100 may detect an eyeball gaze location of a user in real time. In this case, the eyeball gaze location of the user is located at a thirteenth eyeball gaze location 3104 on the display 194. The thirteenth eyeball gaze location 3104 is on the floating control 3101.

As shown in (b) in FIG. 31A, eyes of the user move in a direction of an arrow 3106. The electronic device 100 detects that the eyeball gaze location of the user on the display 194 in this case is a fourteenth eyeball gaze location 3107, and the fourteenth eyeball gaze location 3107 is on an edge of the floating control 3101. The electronic device 100 may determine that the fourteenth eyeball gaze location 3107 is within a range of the first preset area 3103, and start timing.

Figure 31B:
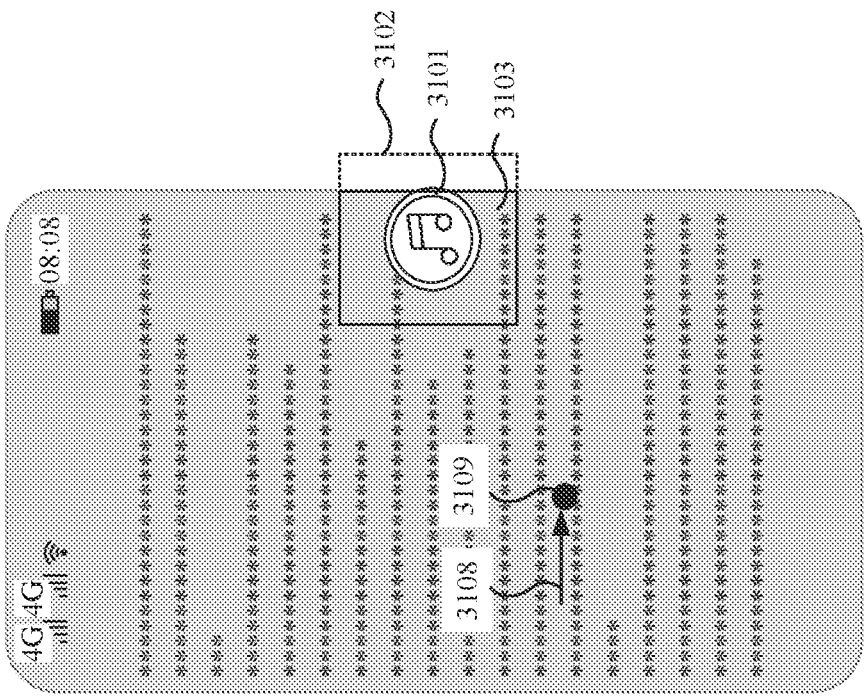
Figure 31B:
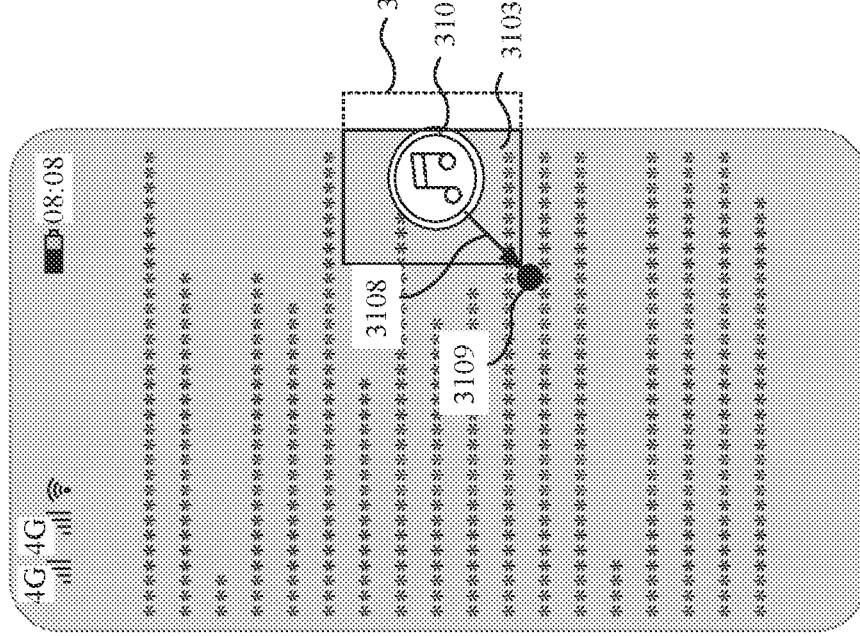

As shown in (c) in FIG. 31B, the eyes of the user move in a direction of an arrow 3108. The electronic device 100 detects that the eyeball gaze location of the user on the display 194 in this case is a fifteenth eyeball gaze location 3109. The electronic device 100 may determine that the fifteenth eyeball gaze location 3109 is outside the range of the first preset area 3103, and the electronic device 100 may determine that the eyeball gaze location of the user is from the fourteenth eyeball gaze location 3107 to the fifteenth eyeball gaze location 3109, and duration of the eyeball gaze location of the user does not reach first preset duration 2 seconds. The electronic device 100 determines that the user may not need to read content around the floating control and content below the floating control in this case, and does not move the floating control 3101.

As shown in (d) in FIG. 31B, the eyes of the user move in the direction of the arrow 3108. The electronic device 100 detects that the eyeball gaze location of the user in this case is a sixteenth eyeball gaze location 3109. The floating control 3101 does not block content that is to be read by the user.

The foregoing describes examples of some scenarios in the setting 1. In actual application, there may be more control moving scenarios. This is not limited herein.

It may be understood that the setting 1 is an example setting in Case 1. In actual application, there may be many other setting manners. For example, the selection control 2107 for preferentially moving to the top, or another control in the user interface 2100 shown in (a) in FIG. 26A is selected. For another example, after the customized second preset area setting control 2303 in the user interface 2300 shown in (b) in FIG. 26A is selected, different parameters may be selected from child controls of the customized second preset area setting control 2303, so that the second preset area is different. For another example, the default preset duration selection control 2402 in the user interface 2400 shown in (c) in FIG. 26B is selected. This is not limited herein. Different setting cases in Case 1 may correspond to different control moving scenarios. However, reference may be made to the schematic diagrams of the scenarios in Case 1, and details are not described herein again.

It should be noted that after the floating control automatically moves, if the eyeball gaze location enters the moved first preset area again after a period of time and duration of the eyeball gaze location in the moved first preset area reaches the first preset duration, the electronic device may move the floating control again according to the control moving method in this embodiment of this application. This is not limited herein.

Case 2: A Moving Avoidance Manner is Used, and the Exception Setting Control 1809 is Enabled.

For example, in a possible implementation, in this case, the following operations may be performed in a setting 2.

As shown in (b) in FIG. 19, when the avoidance function on/off control 1805 in the user interface 1804 is in an on state, an automatic avoidance function of a floating control of the electronic device 100 is enabled.

As shown in (b) in FIG. 20, the moving avoidance manner selection control 2002 in the user interface 2000 is in a selected state, and the moving avoidance manner is used as a preferential avoidance manner for automatic avoidance of the floating control.

As shown in (a) in FIG. 26A, the selection control 2103 for preferentially moving right, and then up in the user interface 2100 is in a selected state, and when performing the automatic avoidance in the moving avoidance manner, the floating control preferentially moves right. When moving to a rightmost side of the display 194 of the electronic device 100, the floating control preferentially moves up.

As shown in (b) in FIG. 22, the default moving distance selection control 2202 in the user interface 2200 is in a selected state, and when performing the automatic avoidance in the moving avoidance manner, the floating control moves by using a default moving distance.

As shown in (b) in FIG. 26A, the customized second preset area setting control 2303 in the user interface 2300 is in a selected state. In addition, the center setting child control 2303A sets that the second preset area uses a center of the floating control as a center of the second preset area, the frame shape setting child control 2303B sets that a frame shape of the second preset area is a rectangle, and the side length/diameter setting child control 2303C sets that a side length/diameter of the second preset area is twice a side length/diameter of the floating control.

As shown in (c) in FIG. 26B, the customized first preset duration setting control 2403 in the user interface 2400 is in a selected state, and a value of the duration setting child control 2403A is 2 seconds.

Figure 32:
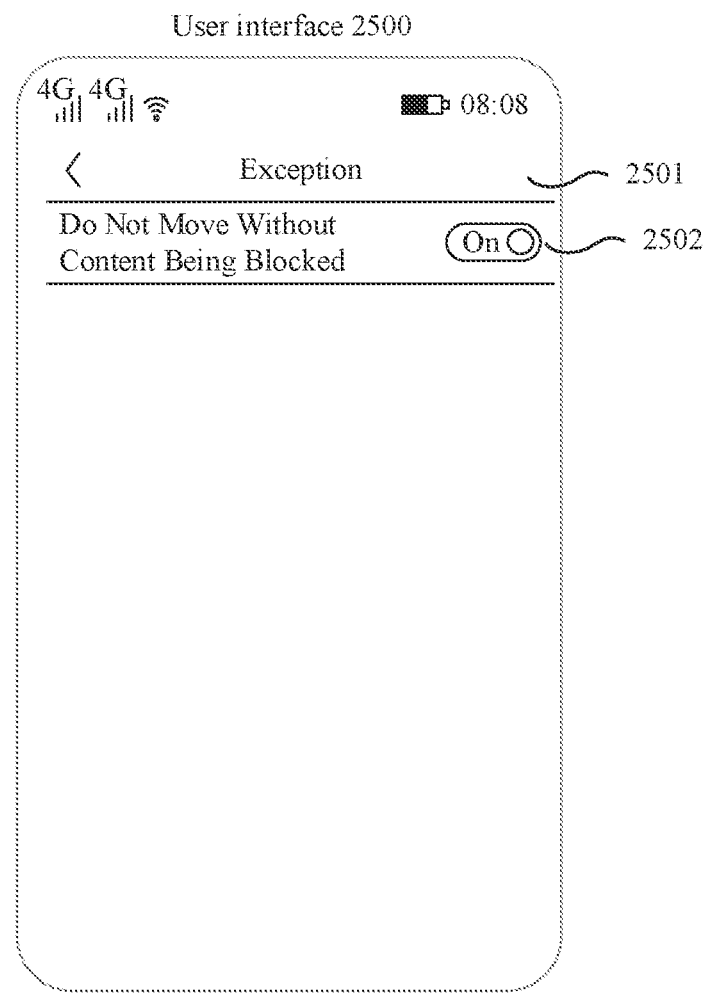
FIG. 32 is another group of schematic diagrams of user interfaces according to an embodiment of this application.

As shown in FIG. 32, the on/off control 2502 for not moving without content being blocked in the user interface 2500 is in an on state, and a function of not moving without content being blocked is enabled.

Compared with the setting 1, in the setting 2, the on/off control 2502 for not moving without content being blocked is changed from the off state to the on state, and the function of not moving without content being blocked is enabled.

In the setting 2, when detecting that duration of an eyeball gaze location of a user in a first preset area reaches first preset duration, the electronic device 100 may determine whether a floating control blocks content in a first window. When the floating control does not block the content in the first window, the floating control may not move. For example, FIG. 33A and FIG. 33B are a schematic diagram of another scenario of a control moving method according to an embodiment of this application.

Figure 33A:
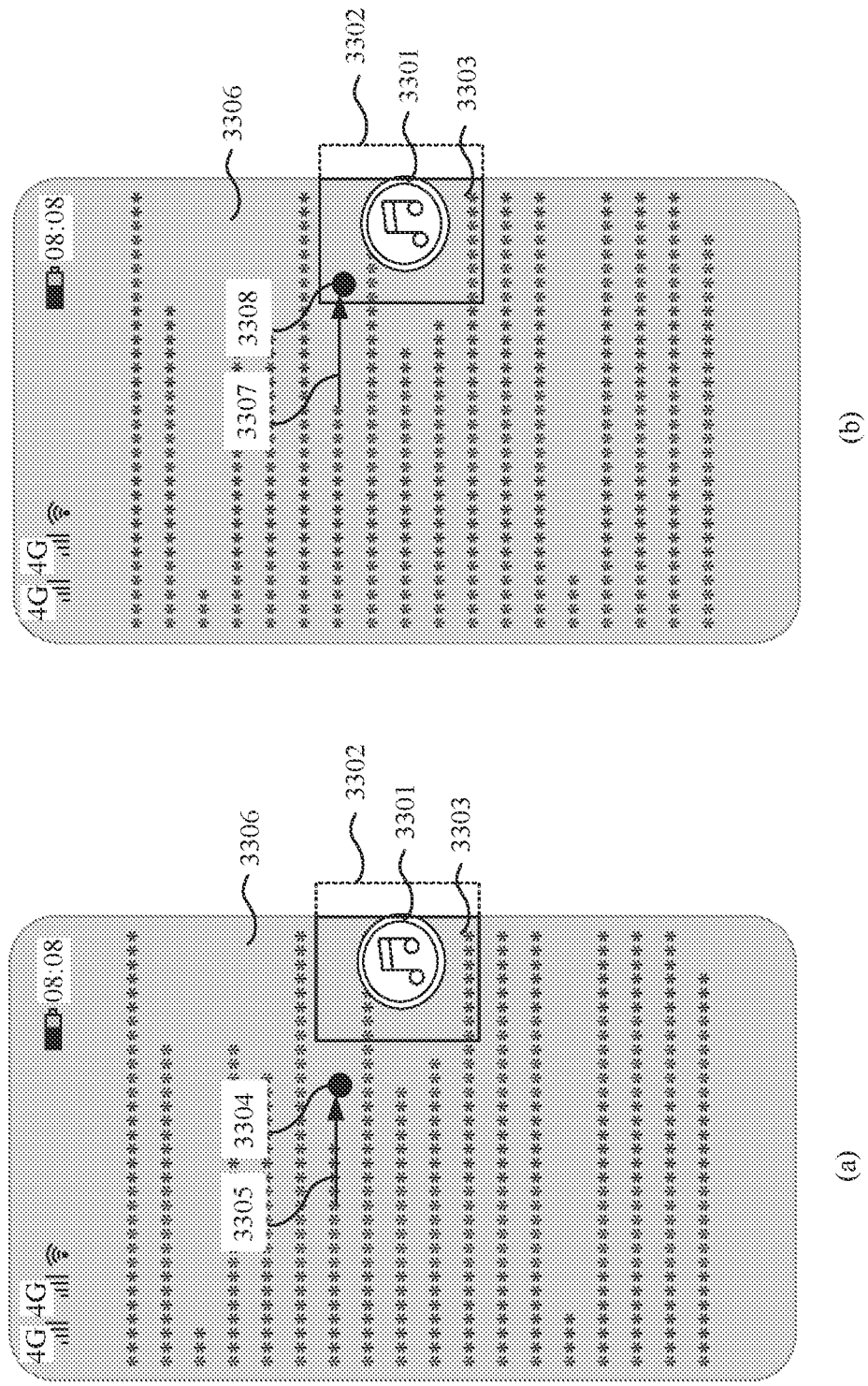
FIG. 33A and FIG. 33B are another group of schematic diagrams of user interfaces according to an embodiment of this application.

As shown in (a) in FIG. 33A, a first window 3306 is currently displayed on the display 194 of the electronic device 100. The first window 3306 is a window of an application. A floating control 3301 is displayed above the first window 3306. A frame shape of a second preset area 3302 is a rectangle, a center of the floating control 3301 is used as a center of the second preset area 3302, and a side length that is twice a diameter of the floating control 3301 is used as a side length of the second preset area 3302. In this case, because the floating control 3301 is located on a right side edge of the display 194, a part of the second preset area 3302 is not within a display range of the display 194 of the electronic device 100. Therefore, an area that does not include the floating control 3301 in the second preset area 3302 on the display 194 is a first preset area 3303. Because the avoidance function on/off control 1805 in the user interface 1804 is in an on state, the electronic device 100 may detect an eyeball gaze location of a user in real time. When the user reads content in the first window 3306, a moving direction of the eyeball gaze location of the user is a direction shown by an arrow 3305. In this case, the eyeball gaze location of the user is located at a seventeenth eyeball gaze location 3304.

As shown in (b) in FIG. 33A, the user continues reading in a direction shown by an arrow 3307. In this case, the electronic device 100 may detect that the eyeball gaze location of the user on the display 194 is located at an eighteenth eyeball gaze location 3308, and the eighteenth eyeball gaze location 3308 is on an edge of the first preset area 3303. The electronic device 100 may determine that the eighteenth eyeball gaze location 3308 is within a range of the first preset area 3303, and start timing.

Figure 33B:
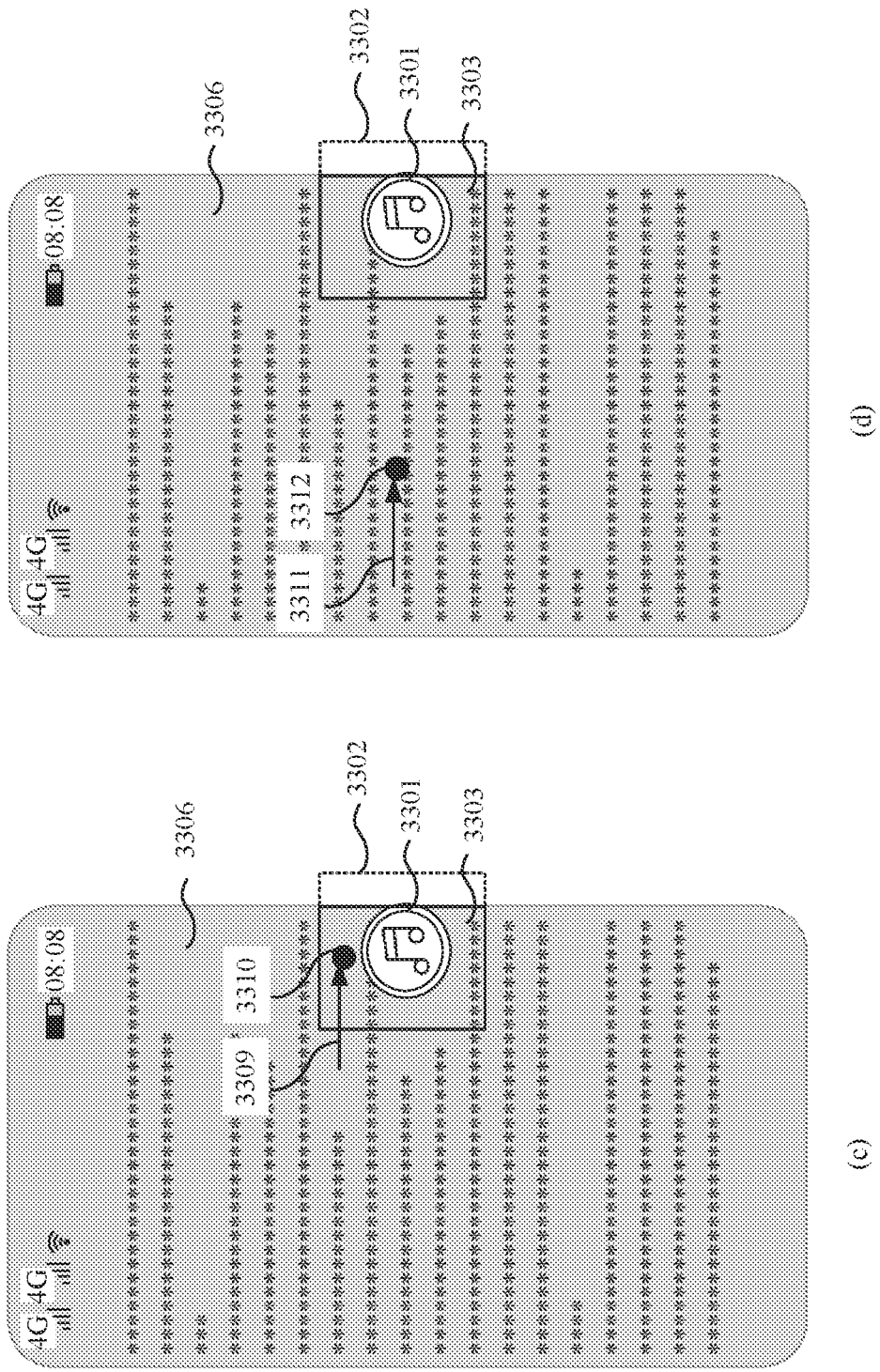

As shown in (c) in FIG. 33B, the user continues reading in a direction shown by an arrow 3309. In this case, the electronic device 100 may detect that the eyeball gaze location of the user on the display 194 is located at a nineteenth eyeball gaze location 3310. In addition, the electronic device 100 may determine that the eyeball gaze location of the user is from the eighteenth eyeball gaze location 3308 to the nineteenth eyeball gaze location 3310, and duration of the eyeball gaze location of the user has reached first preset duration of 2 seconds. Because the on/off control 2502 for not moving without content being blocked in the user interface 2500 is in an on state, the electronic device 100 may detect and determine that no content is displayed at a location of the floating control 3301 in the first window 3306. Therefore, the electronic device may determine that the floating control 3301 does not block content that is to be read by the user, and the electronic device 100 does not need to move the floating control 3301.

As shown in (d) in FIG. 33B, the floating control 3301 does not move, and the user continues reading in a direction of an arrow 3311. In this case, the electronic device may detect that the eyeball gaze location of the user on the display 194 is located at a twentieth eyeball gaze location 3312. Because the floating control 3301 does not block the content in the first window, the user continues to read, and reading of the user is not affected.

For example, in a possible implementation, in this case, the following operations may be performed in a setting 3.

As shown in (b) in FIG. 19, when the avoidance function on/off control 1805 in the user interface 1804 is in an on state, an automatic avoidance function of a floating control of the electronic device 100 is enabled.

As shown in (b) in FIG. 20, the moving avoidance manner selection control 2002 in the user interface 2000 is in a selected state, and the moving avoidance manner is used as a preferential avoidance manner for automatic avoidance of the floating control.

Figure 34:
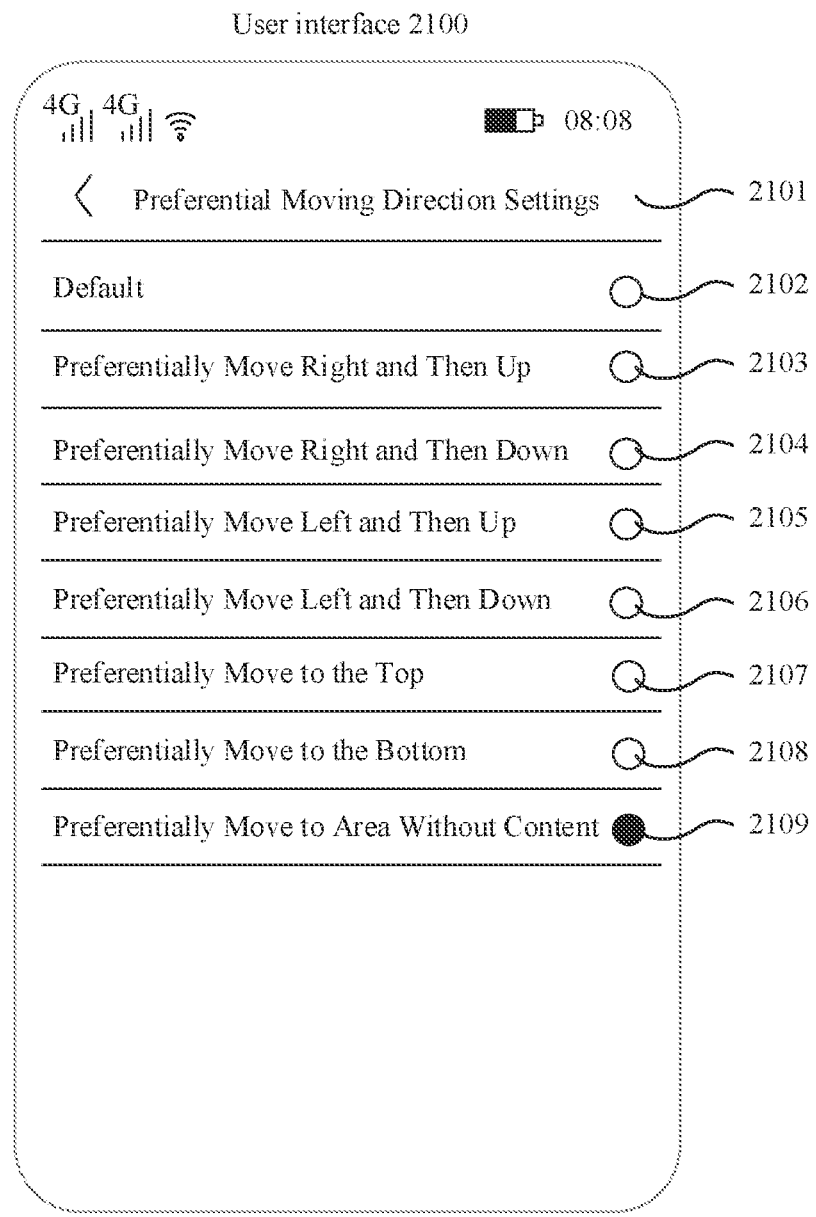
FIG. 34 is another group of schematic diagrams of user interfaces according to an embodiment of this application.

As shown in FIG. 34, the selection control 2109 for preferentially moving to an area without content in the user interface 2100 is in a selected state, and when performing the automatic avoidance in the moving avoidance manner, the floating control preferentially moves to an area without display content on the display 194. When there is no area without display content on the display 194, the floating control moves in a default moving direction.

As shown in (b) in FIG. 22, the default moving distance selection control 2202 in the user interface 2200 is in a selected state, and when performing the automatic avoidance in the moving avoidance manner, the floating control moves by using a default moving distance.

As shown in (b) in FIG. 26A, the customized second preset area setting control 2303 in the user interface 2300 is in a selected state. In addition, the center setting child control 2303A sets that the second preset area uses a center of the floating control as a center of the second preset area, the frame shape setting child control 2303B sets that a frame shape of the second preset area is a rectangle, and the side length/diameter setting child control 2303C sets that a side length/diameter of the second preset area is twice a side length/diameter of the floating control.

As shown in (c) in FIG. 26B, the customized first preset duration setting control 2403 in the user interface 2400 is in a selected state, and a value of the duration setting child control 2403A is 2 seconds.

As shown in FIG. 32, the on/off control 2502 for not moving without content being blocked in the user interface 2500 is in an on state, and a function of not moving without content being blocked is enabled.

Compared with the setting 2, in the setting 3, the selection control 2109 for preferentially moving to an area without content is selected in the user interface 2100 shown in FIG. 34.

In the setting 3, when detecting that duration of an eyeball gaze location of a user in a first preset area reaches first preset duration, the electronic device 100 may determine whether a floating control blocks content in a first window. If the floating control blocks the content in the first window, the electronic device 100 may move the floating control to an area in which no content is displayed on the display 194. For example, FIG. 35A and FIG. 35B are a schematic diagram of another scenario of a control moving method according to an embodiment of this application.

Figure 35A:
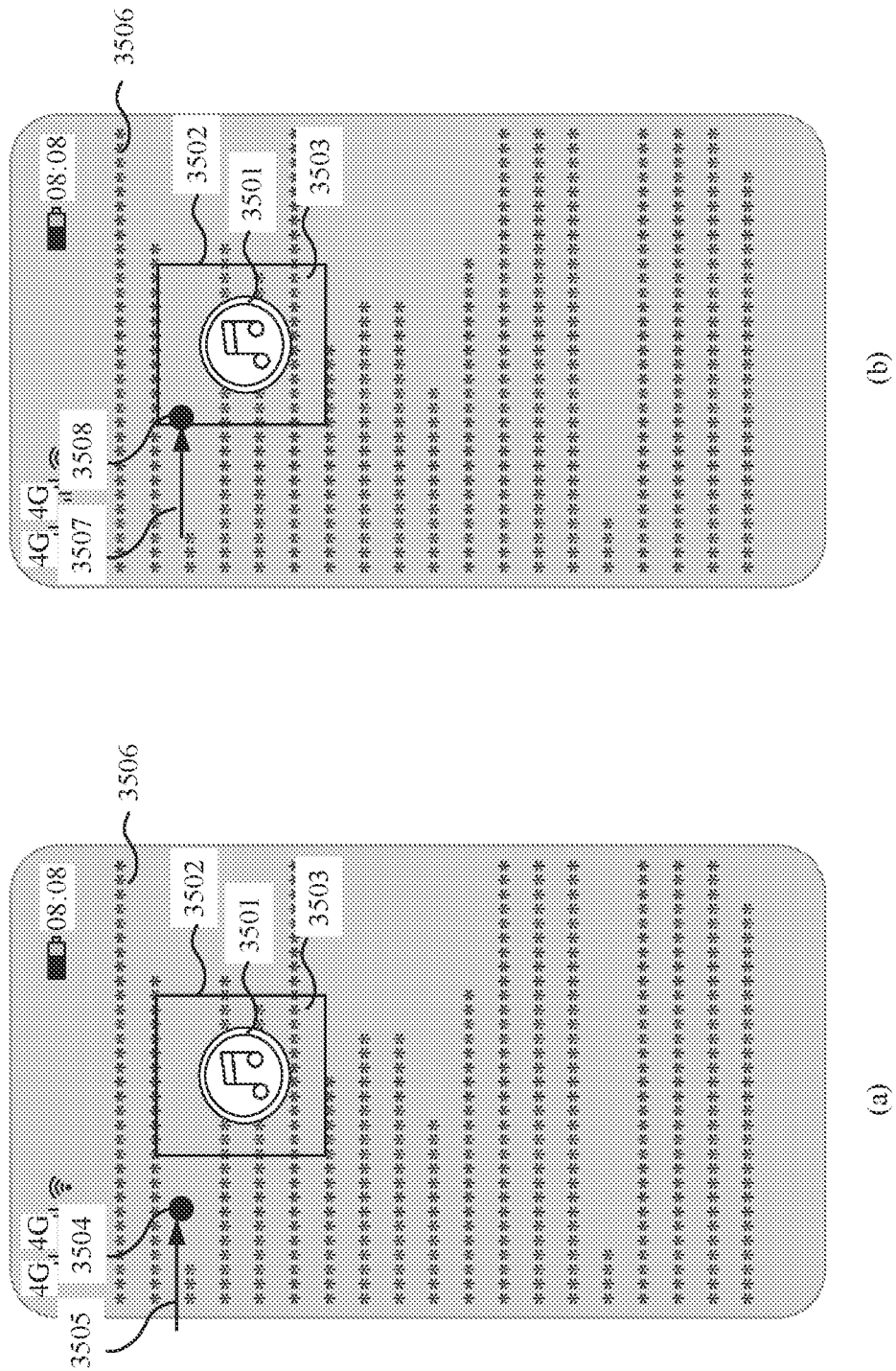
FIG. 35A and FIG. 35B are another group of schematic diagrams of user interfaces according to an embodiment of this application.

As shown in (a) in FIG. 35A, a first window 3506 is currently displayed on the display 194 of the electronic device 100. The first window 3506 is a window of an application. A floating control 3501 is displayed above the first window 3506. A frame shape of a second preset area 3502 is a rectangle, a center of the floating control 3501 is used as a center of the second preset area 3502, and a side length that is twice a diameter of the floating control 3501 is used as a side length of the second preset area 3502. In this case, the second preset area is all within a display range of the display 194 of the electronic device 100. Therefore, areas that are in the second preset area 3502 and that exclude the floating control 3501 are all a first preset area 3503. Because the avoidance function on/off control 1805 in the user interface 1804 is in an on state, the electronic device 100 may detect an eyeball gaze location of a user in real time. When the user reads content in the first window 3506, a moving direction of the eyeball gaze location of the user is a direction shown by an arrow 3505. In this case, the eyeball gaze location of the user is located at a twenty-first eyeball gaze location 3504.

As shown in (b) in FIG. 35A, the user continues reading in a direction shown by an arrow 3507. In this case, the electronic device 100 may detect that the eyeball gaze location of the user on the display 194 is located at a twenty-second eyeball gaze location 3508, and the twenty-second eyeball gaze location 3308 is on an edge of the first preset area 3503. The electronic device 100 may determine that the twenty-second eyeball gaze location 3508 is within a range of the first preset area 3503, and start timing.

Figure 35B:
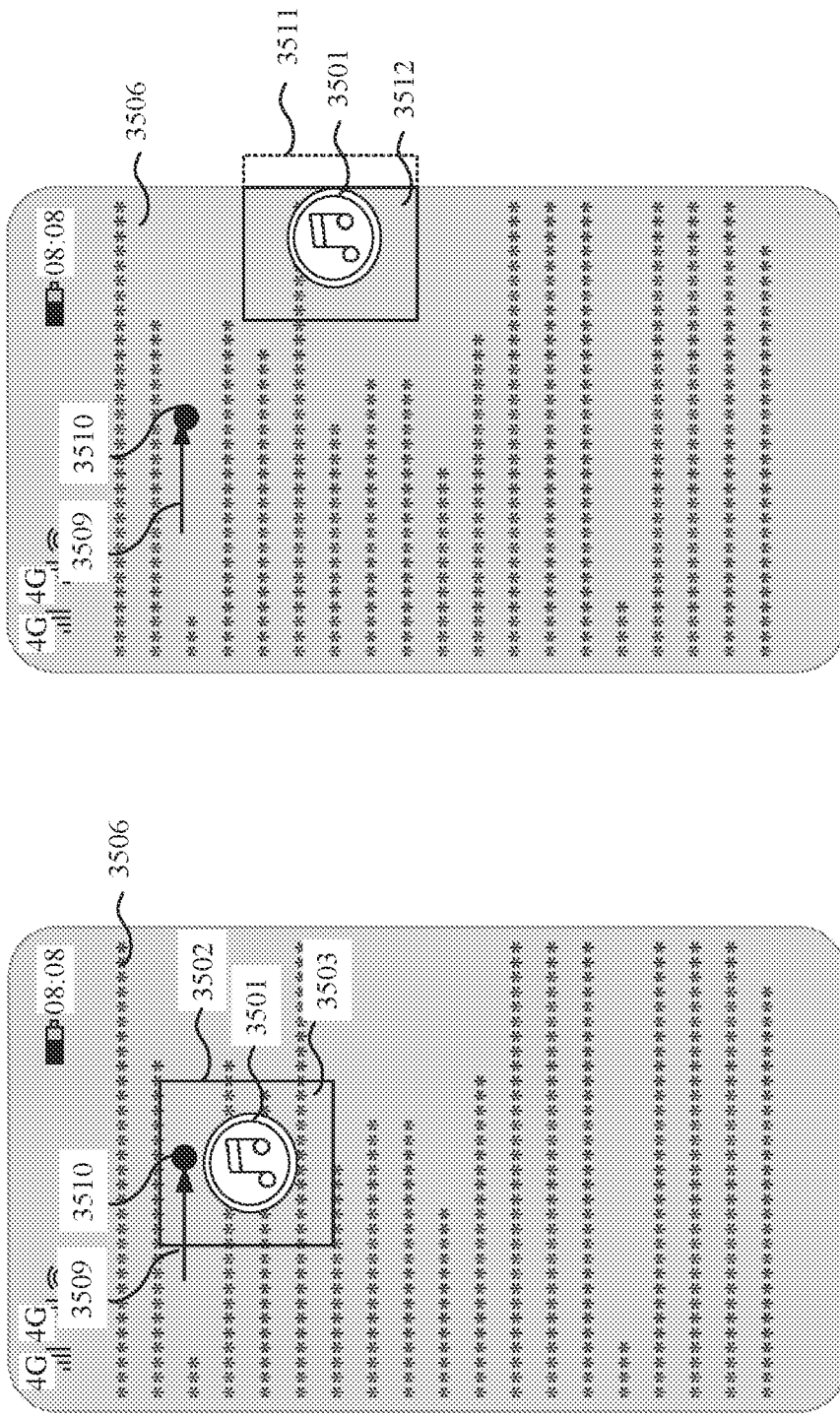

As shown in (c) in FIG. 35B, the user continues reading in a direction shown by an arrow 3509. In this case, the electronic device 100 may detect that the eyeball gaze location of the user on the display 194 is located at a twenty-third eyeball gaze location 3510. In addition, the electronic device 100 may determine that the eyeball gaze location of the user is from the twenty-second eyeball gaze location 3508 to the twenty-third eyeball gaze location 3510, and duration of the eyeball gaze location of the user has reached first preset duration of 2 seconds. In this case, the electronic device 100 may determine, through detection, that the first window 3506 displays content at a location of the floating control 3501, that is, the floating control 3501 blocks the content displayed on the display 194. The electronic device 100 determines that the user is in a reading state and continues to read, and the floating control 3501 may block content that is to be read by the user.

As shown in (d) in FIG. 35B, because the selection control 2109 for preferentially moving to an area without content of the user in the user interface 2100 of the electronic device 100 is in a selected state, the electronic device 100 moves the floating control 3501 to an area without display content on the display 194 based on the preferential moving direction. Because the moved floating control 3501 is displayed on a right side edge of the display 194, a part of a second preset area 3511 is no longer located in a display area of the display 194. In this case, a first preset area 3512 is a part that does not include the floating control 3501 in the second preset area 3511 on the display 194. After the electronic device 100 automatically moves the floating control 3501, the floating control 3501 no longer blocks the content displayed in the first window 3506. Therefore, in a following period of time, the user continues to read, and the floating control 2701 does not block the content that is to be read by the user.

It may be understood that the setting 2 or the setting 3 is an example setting in Case 2. In actual application, there may be many other setting manners. For example, the selection control 2107 for preferentially moving to the top, or another control in the user interface 2100 shown in (a) in FIG. 26A is selected. For another example, after the customized second preset area setting control 2303 in the user interface 2300 shown in (b) in FIG. 26A is selected, different parameters may be selected from child controls of the customized second preset area setting control 2303, so that the second preset area is different. For another example, the default preset duration selection control 2402 in the user interface 2400 shown in (c) in FIG. 26B is selected. This is not limited herein. Different setting cases in Case 2 may correspond to different control moving scenarios. However, refer to the schematic diagrams of the scenarios in Case 2, and details are not described herein again.

Case 3: A Content Avoidance Manner is Used.

For example, in a possible implementation, in this case, the following operations may be performed in a setting 4.

As shown in (b) in FIG. 19, when the avoidance function on/off control 1805 in the user interface 1804 is in an on state, an automatic avoidance function of a floating control of the electronic device 100 is enabled.

Figure 36:
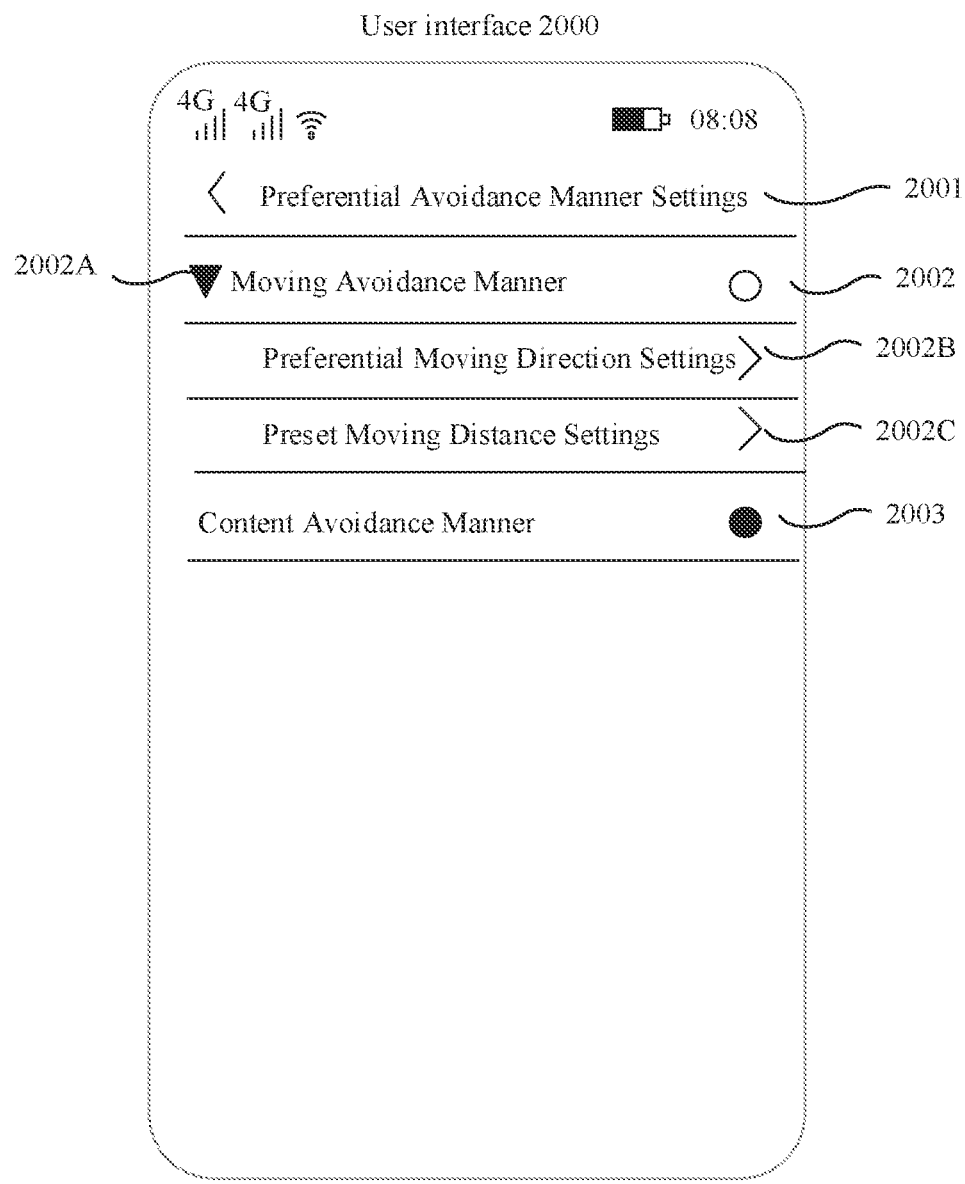
FIG. 36 is another group of schematic diagrams of user interfaces according to an embodiment of this application.

As shown in (b) in FIG. 36, the content avoidance manner selection control 2003 in the user interface 2000 is in a selected state, and the content avoidance manner is used as a preferential avoidance manner for automatic avoidance of the floating control.

As shown in (b) in FIG. 26A, the customized second preset area setting control 2303 in the user interface 2300 is in a selected state. In addition, the center setting child control 2303A sets that the second preset area uses a center of the floating control as a center of the second preset area, the frame shape setting child control 2303B sets that a frame shape of the second preset area is a rectangle, and the side length/diameter setting child control 2303C sets that a side length/diameter of the second preset area is twice a side length/diameter of the floating control.

As shown in (c) in FIG. 26B, the customized first preset duration setting control 2403 in the user interface 2400 is in a selected state, and a value of the duration setting child control 2403A is 2 seconds.

As shown in FIG. 32, the on/off control 2502 for not moving without content being blocked in the user interface 2500 is in an on state, and a function of not moving without content being blocked is enabled.

Compared with the setting 3, in the setting 4, the moving avoidance manner selection control 2002 is no longer selected, but the content avoidance manner selection control is selected in the user interface 2000 shown in FIG. 36.

In the setting 4, when detecting that duration of an eyeball gaze location of a user in a first preset area reaches first preset duration, the electronic device 100 may determine whether a floating control blocks content in a first window. When the floating control blocks the content in the first window, the electronic device 100 rearranges and displays the display content on the display 194, so that the display content is no longer blocked by the floating control. For example, FIG. 37A and FIG. 37B are a schematic diagram of another scenario of a control moving method according to an embodiment of this application.

Figure 37A:
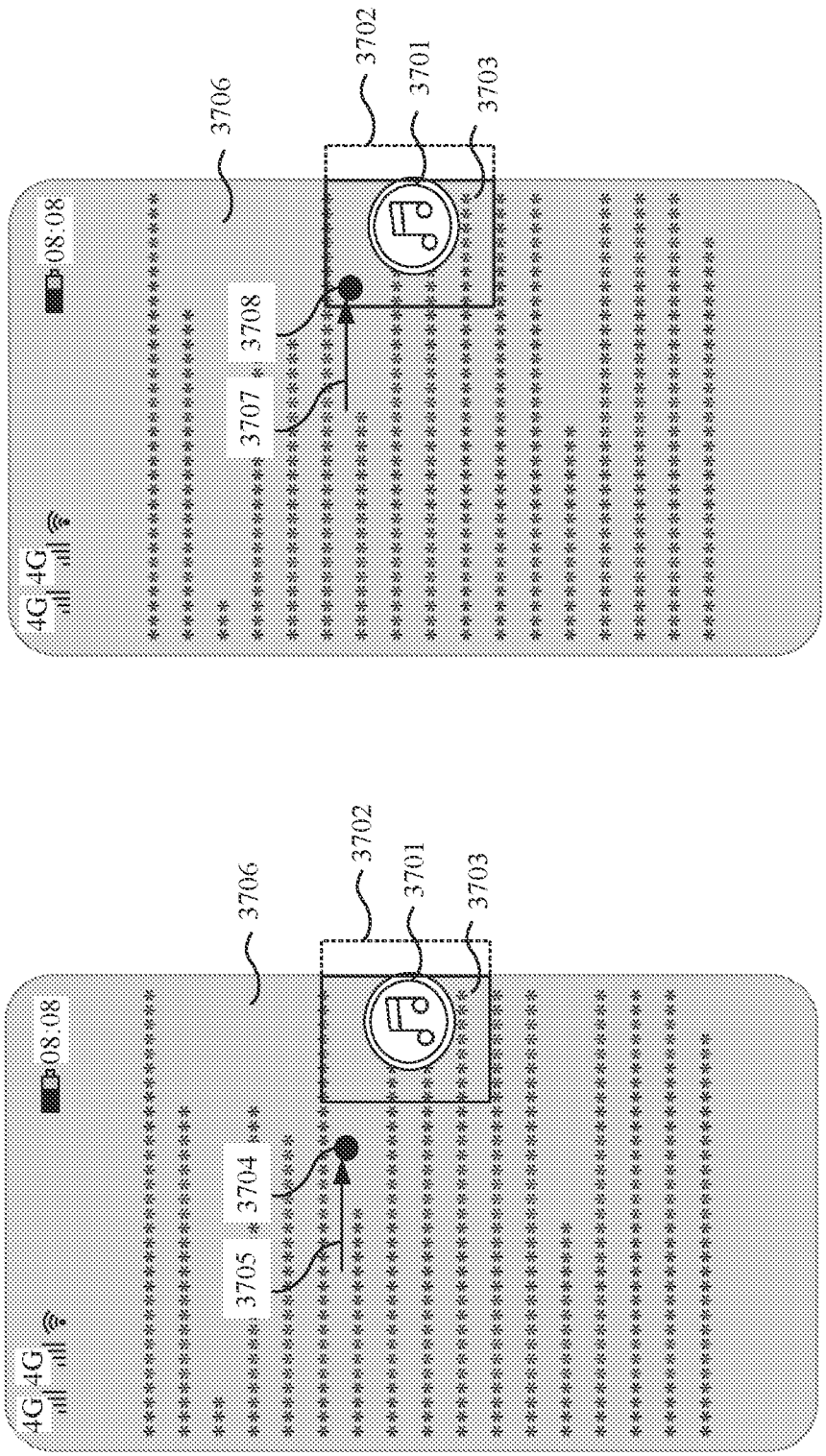
FIG. 37A and FIG. 37B are another group of schematic diagrams of user interfaces according to an embodiment of this application.

As shown in (a) in FIG. 37A, a first window 3706 is currently displayed on the display 194 of the electronic device 100. The first window 3706 is a window of an application. A floating control 3701 is displayed above the first window 3706. A frame shape of a second preset area 3702 is a rectangle, a center of the floating control 3701 is used as a center of the second preset area 3702, and a side length that is twice a diameter of the floating control 3701 is used as a side length of the second preset area 3702. In this case, because the floating control 3701 is located on a right side edge of the display 194, a part of the second preset area 3702 is not within a display range of the display 194 of the electronic device 100. Therefore, an area that does not include the floating control 3701 in the second preset area 3702 on the display 194 is a first preset area 3703. Because the avoidance function on/off control 1805 in the user interface 1804 is in an on state, the electronic device 100 may detect an eyeball gaze location of a user in real time. When the user reads content in the first window 3706, a moving direction of the eyeball gaze location of the user is a direction shown by an arrow 3705. In this case, the eyeball gaze location of the user is located at a twenty-fourth eyeball gaze location 3704.

As shown in (b) in FIG. 37A, the user continues reading in a direction shown by an arrow 3707. In this case, the electronic device 100 may detect that the eyeball gaze location of the user on the display 194 is located at a twenty-fifth eyeball gaze location 3708, and the twenty-fifth eyeball gaze location 3308 is on an edge of the first preset area 3703. The electronic device 100 may determine that the twenty-fifth eyeball gaze location 3708 is within a range of the first preset area 3703, and start timing.

Figure 37B:
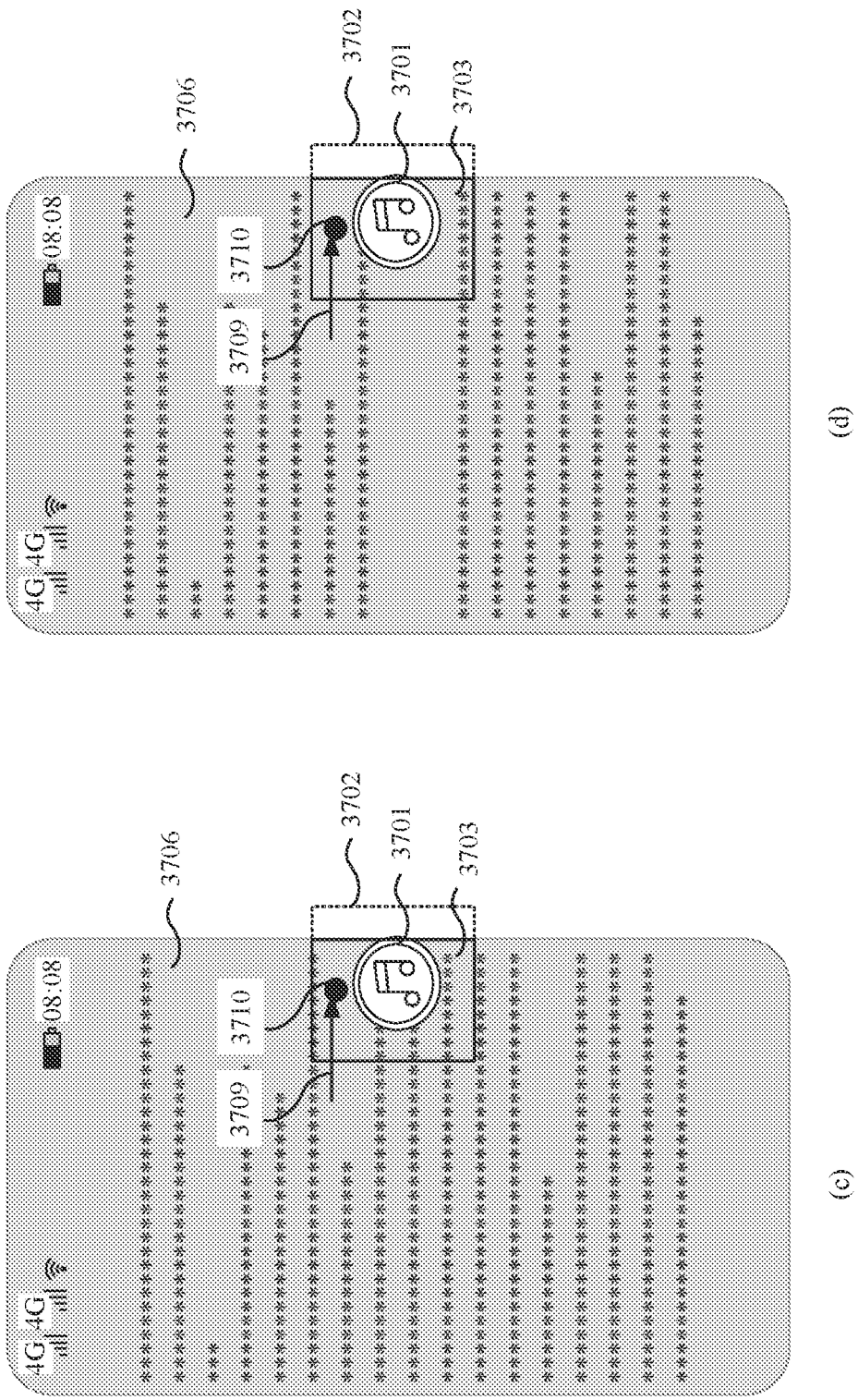

As shown in (c) in FIG. 37B, the user continues reading in a direction shown by an arrow 3709. In this case, the electronic device 100 may detect that the eyeball gaze location of the user on the display 194 is located at a twenty-sixth eyeball gaze location 3710. In addition, the electronic device 100 may determine that the eyeball gaze location of the user is from the twenty-fifth eyeball gaze location 3708 to the twenty-sixth eyeball gaze location 3710, and duration of the eyeball gaze location of the user has reached first preset duration of 2 seconds. The electronic device 100 may also detect and determine that the first window 3706 displays content at a location of the floating control 3701.

As shown in (d) in FIG. 37B, because the content avoidance manner selection control 2003 of the user in the user interface 2000 of the electronic device 100 is in a selected state, the electronic device 100 may rearrange the content displayed on the display 194, so that the displayed content is no longer blocked by the floating control 3701. For example, content in rows in which the floating control 3701 is located on the display 194 may be rearranged to other rows, so that the rows in which the floating control 3701 is located are empty.

Figure 38A:
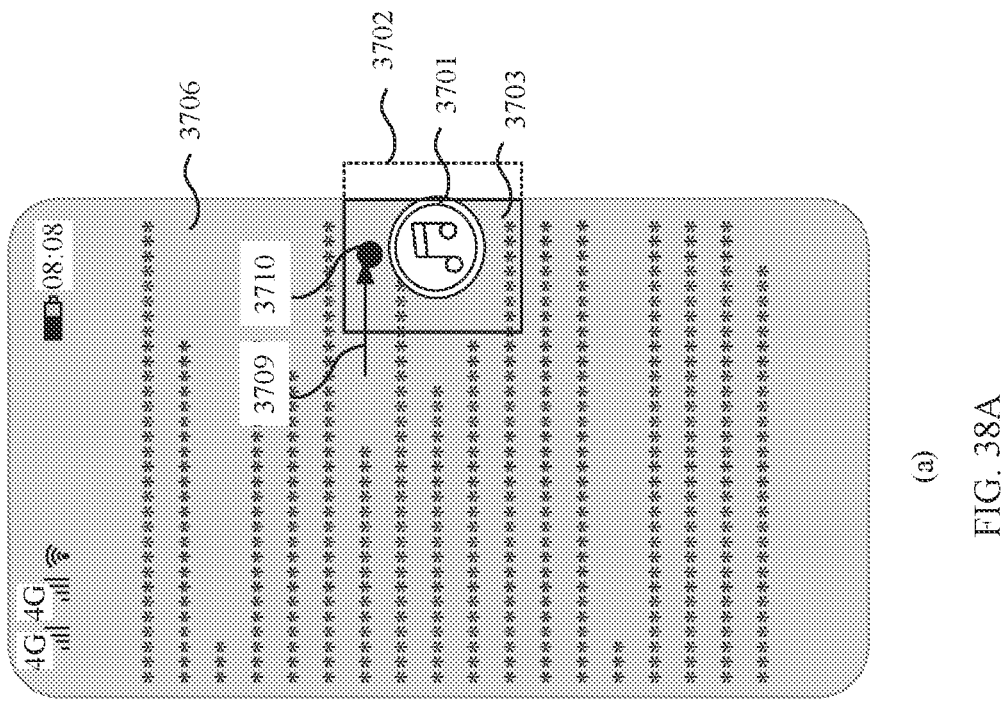
FIG. 38A and FIG. 38B are another group of schematic diagrams of user interfaces according to an embodiment of this application.

For example, as shown in (a) in FIG. 38A, the electronic device 100 may alternatively rearrange display content in a coverage area of the floating control 3701 in the first window 3706 to other rows, so that the coverage area of the floating control 3701 no longer blocks the content in the first window 3706. In this way, the user may continue reading in the direction of the arrow 3709.

Figure 38B:
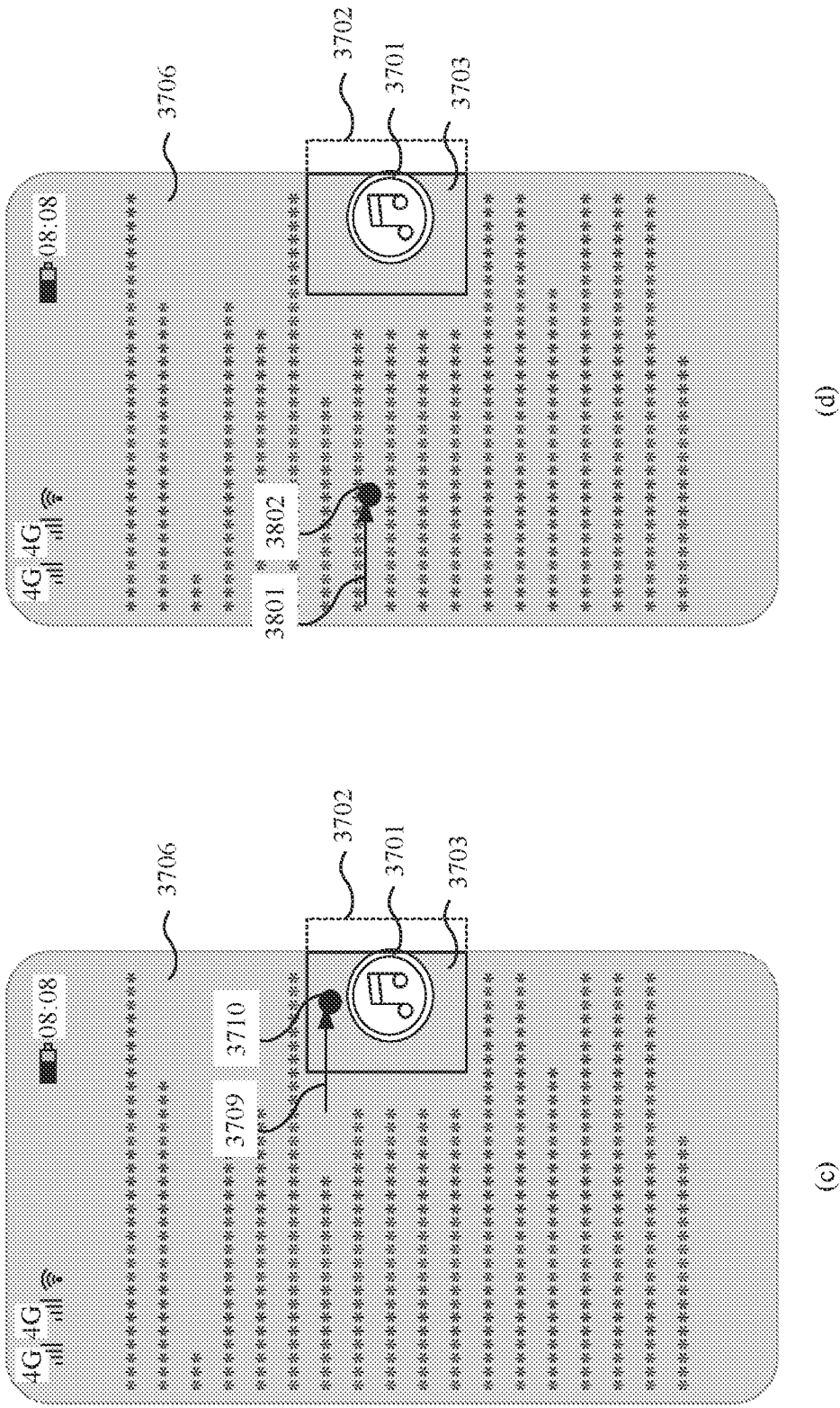

For example, as shown in (b) in FIG. 38B, the electronic device 100 may alternatively rearrange display content in the preset second area 3702 in the first window 3706 to other rows, so that the preset second area 3702 no longer has the content in the first window 3706. Therefore, the coverage area of the floating control 3701 no longer blocks the content in the first window 3706. The user may continue reading from a twenty-sixth eyeball gaze location 3802 in a direction of an arrow 3801.

It may be understood that there may be another manner of rearranging the display content on the display 194, so that the floating control 3701 no longer blocks the display content in the first window 3706. This is not limited herein.

It may be understood that the setting 4 is an example setting in Case 3. In actual application, there may be many other setting manners. For example, after the customized second preset area setting control 2303 in the user interface 2300 shown in (b) in FIG. 26A is selected, different parameters may be selected from child controls of the customized second preset area setting control 2303, so that the second preset area is different. For another example, the default preset duration selection control 2402 in the user interface 2400 shown in (c) in FIG. 26B is selected. This is not limited herein. Different setting cases in Case 3 may correspond to different control moving scenarios. However, refer to the schematic diagrams of the scenarios in Case 3, and details are not described herein again.

With reference to the foregoing example software and hardware structures of the electronic device 100, and the foregoing example user interfaces, the following describes the control moving method in embodiments of this application.

Figure 39:
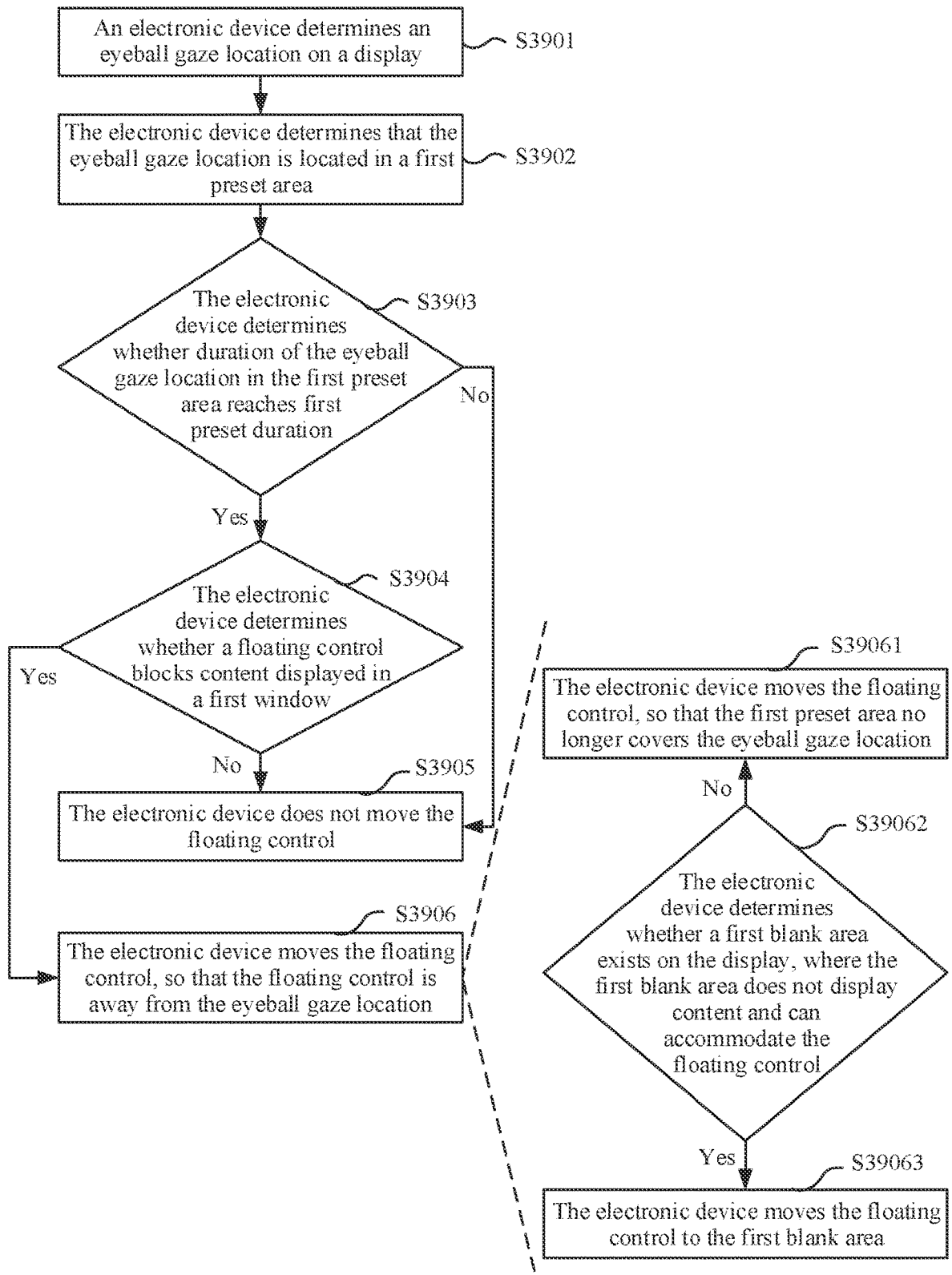
FIG. 39 is a schematic flowchart of a control moving method according to an embodiment of this application.

FIG. 39 is a schematic flowchart of a control moving method according to an embodiment of this application.

S3901: An electronic device determines an eyeball gaze location of on a display.

The electronic device 100 may determine the eyeball gaze location of a user on the display 194 by using an eyeball tracking technology.

For a specific process of determining the eyeball gaze location by using the eyeball tracking technology, refer to related descriptions in the eyeball tracking technology in (1) in the foregoing term description. Details are not described herein again.

The electronic device 100 may determine, by default, the eyeball gaze location on the display in real time after the electronic device 100 is powered on, or the electronic device starts to determine the eyeball gaze location on the display in real time only after the user enables a corresponding function in the electronic device 100. For example, the electronic device may start to determine the eyeball gaze location on the display in real time only after the user changes the avoidance function on/off control 1805 in the user interface 1803 shown in (a) in FIG. 29A to an on state. This is not limited herein.

S3902: The electronic device determines that the eyeball gaze location is located in a first preset area.

After determining the eyeball gaze location on the display 194, the electronic device 100 may determine in real time whether the eyeball gaze location is located in the first preset area. After determining that a newly calculated eyeball gaze location enters the first preset area, the electronic device 100 may determine that the eyeball gaze location is located in the first preset area.

The first preset area is a preset size of area that surrounds a floating control but does not include the floating control on the display 194 of the electronic device 100.

Preferably, the first preset area may be an area that does not include the floating control in a second preset area that surrounds the floating control and whose center moves along with the floating control on the display of the electronic device.

It may be understood that the first preset area may alternatively be another preset area of a fixed size and shape. This is not limited herein.

Specifically, for descriptions of the first preset area and the second preset area, refer to related descriptions of the first preset area in (3) in the foregoing term description. Details are not described herein again.

For examples of the first preset area and the second preset area, refer to examples in the foregoing example user interfaces, for example, the first preset area 2703 and the second preset area 2702 in (a) in FIG. 27A, and the first preset area 2712 and the second preset area 2711 in (d) in FIG. 27B. Details are not described herein again.

It may be understood that, step S3902 is met provided that the electronic device 100 determines that the eyeball gaze location is located in the first preset area, and a direction from which the eyeball gaze location moves to the first preset area is not limited. For example, the eyeball gaze location in FIG. 27A and FIG. 27B enters the first preset area from left to right, the eyeball gaze location in FIG. 29A and FIG. 29B enters the first preset area from obliquely above, and the eyeball gaze location in FIG. 30A and FIG. 30B moves from the floating control to the first preset area. Details are not described herein again.

S3903: The electronic device determines whether duration of the eyeball gaze location in the first preset area continuously reaches first preset duration.

After the electronic device 100 determines that the eyeball gaze location is in the first preset area, the electronic device 100 may determine whether the duration of the eyeball gaze location in the first preset area continuously reaches the first preset duration.

It may be understood that, within the first preset duration, the eyeball gaze location of the user may move. If an eyeball gaze location that is of the user and that is determined by the electronic device 100 in the first preset area for the first time is a first eyeball gaze location, timing starts when the electronic device 100 determines the first eyeball gaze location, and an eyeball gaze location detected by the electronic device 100 after the first preset duration is a second eyeball gaze location. There may be many eyeball gaze locations of the user between the first eyeball gaze location and the second eyeball gaze location. The electronic device 100 may determine that the duration of the eyeball gaze location in the first preset area reaches the first preset duration provided that all eyeball gaze locations between the first eyeball gaze location and the second eyeball gaze location are within the first preset area. If not all eyeball gaze locations between the first eyeball gaze location and the second eyeball gaze location are within the first preset area, the electronic device 100 may determine that the duration of the eyeball gaze location in the first preset area does not reach the first preset duration.

The first preset duration may be set by the electronic device 100 by default, or may be customized and manually set by the user. For example, the first preset duration may be set in the user interface 2400 shown in (b) in FIG. 24. This is not limited herein.

When determining that the duration of the eyeball gaze location in the first preset area does not reach the first preset duration, the electronic device 100 may perform step S3905. It may be understood that, that the electronic device performs step S905 may be that the electronic device does not perform an operation.

Optionally, in a possible implementation, when determining that the duration of the eyeball gaze location in the first preset area reaches the first preset duration, the electronic device 100 may determine that the floating control may block content that is to be read by the user. Therefore, the electronic device 100 may directly perform step S3906.

Optionally, in a possible implementation, when determining that the duration of the eyeball gaze location in the first preset area reaches the first preset duration, the electronic device 100 may first perform step S3904, and perform step S3906 only after determining that the floating control blocks content displayed in a first window.

For examples of user interfaces in which the electronic device determines whether the duration of the eyeball gaze location in the first preset area reaches the first preset duration, refer to user interfaces such as (b) and (c) in FIG. 27A and FIG. 27B, (b) and (c) in FIG. 28A and FIG. 28B, and (b) and (c) in FIG. 29A and FIG. 29B. Details are not described herein again.

S3904: The electronic device determines whether the floating control blocks content displayed in a first window.

In a possible implementation, when determining that the duration of the eyeball gaze location in the first preset area reaches the first preset duration, the electronic device 100 may determine whether the floating control blocks the content displayed in the first window.

The first window is a window below the floating control displayed on the display. Specifically, refer to related descriptions of the first window in (4) in the foregoing term description. Details are not described herein again.

Specifically, there may be two cases in which the electronic device 100 determines whether the floating control blocks the content displayed in the first window:

(1) Both the Floating Control and the First Window Belong to a First Application.

In this case, the first application may determine whether the floating control blocks the content displayed in the first window. Specifically, the first application may determine a location of the floating control of the first application, and determine whether content is displayed below the floating control.

If the first application determines that content is displayed below the floating control, the electronic device determines that the floating control blocks the content displayed in the first window.

If the first application determines that no content is displayed below the floating control, the electronic device determines that the floating control does not block the content displayed in the first window.

It may be understood that, in this case, following moving of the floating control may also be performed by the first application. This is not limited herein.

(2) The Floating Control and the First Window Belong to Different Applications.

If the floating control belongs to a second application or a system function of the electronic device, the first window belongs to a third application, the electronic device 100 may first determine a control area of the floating control, and then send the control area of the floating control to the third application. After receiving the control area, the third application may determine whether content is displayed in the control area in the first window, for example, whether content such as text, a picture, or a video is displayed.

If the third application displays content in the control area in the first window, the third application may feed back that content is displayed in the control area. The electronic device 100 may determine that the floating control blocks the content displayed in the first window.

If the third application does not display content in the control area in the first window, the third application may feed back that no content is displayed in the control area. The electronic device 100 may determine that the floating control does not block the content displayed in the first window.

There may further be another manner in which the electronic device 100 determines whether the floating control blocks the content displayed in the first window. This is not limited herein.

When the electronic device 100 determines that the floating control does not block the content displayed in the first window, the electronic device 100 may perform step S3905.

When the electronic device 100 determines that the floating control blocks the content displayed in the first window, the electronic device may perform step S3906.

It may be understood that, in some embodiments, step S3904 may not be performed. For example, the electronic device 100 does not perform step S3904 by default, or the user sets, in the user interface 2500 shown in (b) in FIG. 25, a status of the on/off control 2502 for not moving without content being blocked to be off. This is not limited herein.

For an example user interface in which the electronic device determines that the floating control does not block the content displayed in the first window, refer to user interfaces such as (c) in FIG. 33B. Details are not described herein again.

For an example user interface in which the electronic device determines that the floating control blocks the content displayed in the first window, refer to user interfaces such as (c) in FIG. 35B. Details are not described herein again.

S3905: The electronic device does not move the floating control.

When determining that the duration of the eyeball gaze location in the first preset area does not reach the first preset duration, the electronic device 100 does not move the floating control. That the electronic device 100 does not move the floating control means that the electronic device 100 does not need to perform an operation, and only needs to perform no operation.

For an example user interface in which the electronic device does not move the floating control, refer to user interfaces such as (c) and (d) in FIG. 33B. Details are not described herein again.

S3906: The electronic device moves the floating control, so that the floating control is away from the eyeball gaze location.

In a possible implementation, when the electronic device 100 determines that the duration of the eyeball gaze location in the first preset area reaches the first preset duration, or in a possible implementation, when the electronic device 100 determines that the duration of the eyeball gaze location in the first preset area reaches the first preset duration, and the electronic device 100 determines that the floating control blocks the content displayed in the first window, the electronic device 100 may move the floating control, so that the floating control is away from a newly detected eyeball gaze location.

It may be understood that the newly detected eyeball gaze location may be an eyeball gaze location determined by the electronic device 100 when the first preset duration is reached.

The electronic device 100 may move the floating control in many manners:

Specifically, in a possible implementation, the following operations are performed.

S39061: The electronic device moves the floating control, so that the first preset area no longer covers the eyeball gaze location.

In this case, the eyeball gaze location of the user on the display 194 is in the first preset area, and the electronic device may move the floating control in various directions such as left, right, up, down, top, and bottom. The first preset area is the preset size of area that surrounds the floating control, and moves along with the floating control. Therefore, the first preset area may no longer cover the eyeball gaze location.

A direction and a distance in which the electronic device moves the floating control may be set by default, or may be customized by the user. For example, the user may select a preferential moving direction in the user interface 2100 shown in (b) in FIG. 21, or may set a moving distance in the user interface 2200 shown in (b) in FIG. 22. This is not limited herein.

For an example user interface in which the electronic device moves the floating control, so that the first preset area no longer covers the eyeball gaze location, refer to user interfaces such as (c) and (d) in FIG. 27B, and (c) and (d) in FIG. 28B. Details are not described herein again.

Specifically, in a possible implementation, the electronic device 100 may move the floating control in the following manner:

S39062: The electronic device determines whether a first blank area exists on the display, where the first blank area does not display content and can accommodate the floating control.

The electronic device 100 may detect whether the first blank area exists on the display 194, where the first blank area does not display content and can accommodate the floating control.

Specifically, the electronic device 100 may first determine a size of the floating control from an application to which the floating control belongs, and then determine, from an application to which the first window belongs, whether a blank area that can accommodate the floating control and that does not display content exists in a currently displayed first window. If the electronic device 100 determines that the blank area that can accommodate the floating control and that does not display the content exists, the electronic device 100 may determine that the first blank area exists on the display 194. If the electronic device 100 determines that the blank area that can accommodate the floating control and that does not display the content does not exist, the electronic device 100 may determine that the first blank area does not exist on the display 194.

After the electronic device 100 determines that the first blank area exists on the display, the electronic device 100 may perform step S39063.

When the electronic device 100 determines that the first blank area does not exist on the display, the electronic device 100 may perform step S39061.

S39063: The electronic device moves the floating control to the first blank area.

When the electronic device 100 determines that the first blank area exists on the display, the electronic device 100 may move the floating control to the first blank area. In this way, the floating control does not block the content displayed in the first window, that is, does not block the content that is to be read by the user.

For an example user interface in which the electronic device moves the floating control to the first blank area, refer to user interfaces such as (c) and (d) in FIG. 35B. Details are not described herein again.

In this embodiment of this application, when determining that the eyeball gaze location of the user on the display 194 is in the first preset area and the duration of the eyeball gaze location of the user on the display 194 in the first preset area reaches the first preset duration, the electronic device 100 may determine that the floating control may block the content that is to be read by the user. In this case, the electronic device 100 may move the floating control, so that the floating control is away from the current eyeball gaze location of the user. Therefore, the user no longer needs to manually move the floating control frequently to prevent the floating control from blocking the content that is to be read, which causes reading experience to deteriorate. The electronic device automatically moves the floating control based on a reading location of the user, to prevent the floating control from blocking the content that is to be read by the user. In this way, the floating control can be normally used without affecting reading and an operation of the user, which greatly improves the reading experience of the user.

For example, in a possible implementation, after steps S3901 to S3905, when the electronic device 100 determines that the duration of the eyeball gaze location in the first preset area reaches the first preset duration, or in a possible implementation, when the electronic device 100 determines that the duration of the eyeball gaze location in the first preset area reaches the first preset duration, and the electronic device 100 determines that the floating control blocks the content displayed in the first window, the electronic device 100 may rearrange the content on the display 194, so that the floating control no longer blocks the content displayed in the first window.

For an example user interface in which the electronic device 100 rearranges the content on the display 194, so that the floating control no longer blocks the content displayed in the first window, refer to user interfaces such as (c) and (d) in FIG. 37B, and (a), (b), and (c) in FIG. 38A and FIG. 38B. Details are not described herein again.

It may be understood that the control moving method in this embodiment of this application may not only be applied to the electronic device 100, but also may be applied to another type of electronic device. The electronic device in this embodiment of this application may alternatively use another hardware structure. This is not limited herein.

Figure 40:
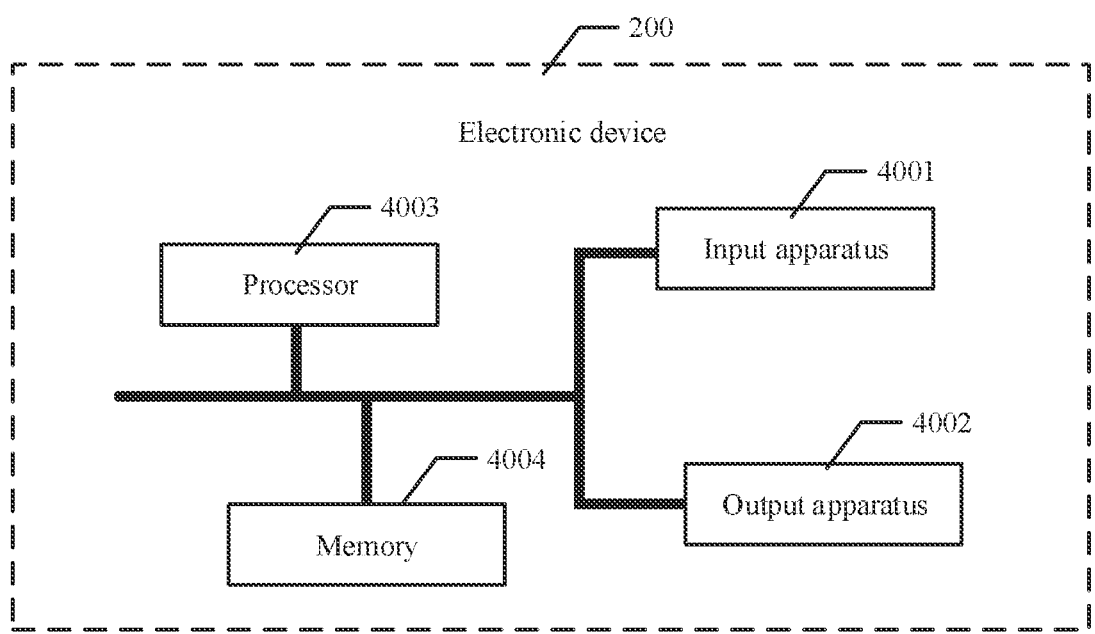
FIG. 40 is a schematic diagram of a structure of an example electronic device 200 according to an embodiment of this application.

For example, FIG. 40 is a schematic diagram of a structure of an example electronic device 200 according to an embodiment of this application.

The electronic device 200 may include an input apparatus 4001, an output apparatus 4002, a processor 4003, and a memory 4004 (there may be one or more processors 4003 in the electronic device 200, and one processor 4003 is used as an example in FIG. 40). In some embodiments of this application, the input apparatus 4001, the output apparatus 4002, the processor 4003, and the memory 4004 may be connected through a bus or in another manner. In FIG. 40, that the input apparatus 4001, the output apparatus 4002, the processor 4003, and the memory 4004 are connected through a bus is used as an example.

The input apparatus 4001 may include hardware required for implementing an eyeball tracking technology, for example, a high-definition camera or an infrared camera. The output apparatus 4002 may also include the hardware required for implementing the eyeball tracking technology, for example, a display or an infrared light emitter. This may be specifically determined based on a manner of implementing the eyeball tracking technology used during implementation, and is not limited herein.

The processor 4003 invokes an operation instruction stored in the memory 4004, so that the electronic device 200 performs a control moving method in this embodiment of this application. A specific process is similar to that in which the electronic device 100 performs the control moving method in embodiments of this application, and details are not described herein again.

In conclusion, the foregoing embodiments are merely intended for describing the technical solutions of this application, but not for limiting this application. Although this application is described in detail with reference to the foregoing embodiments, a person of ordinary skill in the art should understand that modifications can still be made to the technical solutions described in the foregoing embodiments or equivalent replacements can be made to some technical features thereof, without departing from the scope of the technical solutions of embodiments of this application.

According to the context, the term "when" used in the foregoing embodiments may be interpreted as a meaning of "if", "after", "in response to determining", or "in response to detecting". Similarly, according to the context, the phrase "when it is determined that . . . " or "if (a stated condition or event) is detected" may be interpreted as a meaning of "if it is determined that . . . ". "in response to determining . . . ", "when (a stated condition or event) is detected", or "in response to detecting (a stated condition or event)".

All or some of the foregoing embodiments may be implemented by software, hardware, firmware, or any combination thereof. When software is used to implement embodiments, all or some embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art may understand that all or some of the processes of the methods in embodiments may be implemented by a computer program instructing related hardware. The program may be stored in a computer-readable storage medium. When the program runs, the processes of the methods in embodiments are performed. The foregoing storage medium includes any medium that can store program code, such as a ROM, a random access memory RAM, a magnetic disk, or an optical disc.

What is claimed is:

1. A control moving method, comprising:
    determining, by an electronic device, an eyeball gaze location of a user on a display, wherein the display displays content on a first layer and a floating control on a second layer relatively higher than the first layer, and the floating control blocks part of the content displayed on the display;
    when the electronic device determines that the eyeball gaze location of the user enters a first preset area, determining, by the electronic device, whether duration of the eyeball gaze location in the first preset area continuously reaches a first preset duration, wherein the first preset area is a preset size of area around the floating control but does not comprise the floating control on the display; and
    moving, by the electronic device, the floating control when the electronic device determines that the duration of the eyeball gaze location in the first preset area continuously reaches the first preset duration, wherein the floating control is moved away from the eyeball gaze location so that the part of the content previously blocked by the floating control is visible to the user.

2. The method according to claim 1, wherein the first preset area surrounds the floating control but does not comprise the floating control on the display.

3. The method according to claim 2, wherein the first preset area is an area that does not comprise the floating control in a second preset area on the display, and the second preset area surrounds the floating control and a center of the second preset area moves along with the floating control.

4. The method according to claim 1, wherein the first preset area does not surround the floating control, and a boundary of the first preset area is in contact with or not in contact with a boundary of the floating control.

5. The method according to claim 4, wherein a location of the first preset area changes with a change of a location of the floating control on the display.

6. The method according to claim 1, wherein after the determining, by an electronic device, an eyeball gaze location of a user on a display, and before the moving, by the electronic device, the floating control, the method further comprises:
    determining, by the electronic device, whether the floating control blocks content displayed in a first window, wherein the first window is a window below the floating control displayed on the display; and
    wherein the moving, by the electronic device, the floating control when the electronic device determines that the duration of the eyeball gaze location in the first preset area continuously reaches the first preset duration comprises:
        moving, by the electronic device, the floating control when the electronic device determines that the duration of the eyeball gaze location in the first preset area continuously reaches the first preset duration and that the floating control blocks the content displayed in the first window, wherein the floating control is moved away from the eyeball gaze location.

7. The method according to claim 6, wherein:
    if the floating control and the first window belong to a same application, the determining, by the electronic device, whether the floating control blocks content displayed in a first window comprises:
        determining, by the application to which the floating control and the first window belong in the electronic device, whether the floating control blocks the content displayed in the first window; or
    if the floating control and the first window do not belong to a same application, the determining, by the electronic device, whether the floating control blocks content displayed in a first window comprises:
        obtaining, by the electronic device, a location area of the floating control from an application to which the floating control belongs;
        determining, by the electronic device, whether an application to which the first window belongs displays content in the location area of the floating control; and
        when the electronic device determines that the application to which the first window belongs displays the content in the location area of the floating control, determining, by the electronic device, that the floating control blocks the content displayed in the first window; or
        when the electronic device determines that the application to which the first window belongs does not display the content in the location area of the floating control, determining, by the electronic device, that the floating control does not block the content displayed in the first window.

8. The method according to claim 6, wherein before the determining, by the electronic device, whether the floating control blocks content displayed in a first window, the method further comprises:
    enabling, by the electronic device, a first function in response to a first operation of the user, wherein the first function is used to move the floating control only when the floating control blocks the displayed content, or is used to not move the floating control when the floating control does not block the displayed content.

9. The method according to claim 1, wherein the moving, by the electronic device, the floating control comprises:
    moving, by the electronic device, the floating control, wherein the first preset area no longer covers the eyeball gaze location; or
    determining, by the electronic device, whether a first blank area exists on the display, wherein the first blank area does not display content and can accommodate the floating control; and
    moving, by the electronic device, the floating control to the first blank area when determining that the first blank area exists on the display; or
    moving, by the electronic device, the floating control when determining that the first blank area does not exist on the display, wherein the first preset area no longer covers the eyeball gaze location.

10. The method according to claim 1, wherein before the determining, by an electronic device, an eyeball gaze location of a user on a display, the method further comprises:

enabling, by the electronic device, a second function in response to a second operation of the user, wherein the second function is used to move the floating control when the duration of the eyeball gaze location in the first preset area continuously reaches the first preset duration.

11. An electronic device, wherein the electronic device comprises one or more processors, a memory, and a display, and wherein the memory is coupled to the one or more processors and stores computer instructions for execution by the one or more processors to perform operations comprising:
  determining an eyeball gaze location of a user on the display, wherein the display displays content on a first layer and a floating control on a second layer relatively higher than the first layer, and the floating control blocks part of the content displayed on the display;
  when determining that the eyeball gaze location of the user enters a first preset area, determining whether duration of the eyeball gaze location in the first preset area continuously reaches a first preset duration, wherein the first preset area is a preset size of area around the floating control but does not comprise the floating control on the display; and
  moving the floating control when determining that the duration of the eyeball gaze location in the first preset area continuously reaches the first preset duration, wherein the floating control is moved away from the eyeball gaze location so that the part of the content previously blocked by the floating control is visible to the user.

12. The electronic device according to claim 11, wherein the first preset area surrounds the floating control but does not comprise the floating control on the display.

13. The electronic device according to claim 12, wherein the first preset area is an area that does not comprise the floating control in a second preset area on the display, and the second preset area surrounds the floating control and a center of the second preset area moves along with the floating control.

14. The electronic device according to claim 11, wherein the first preset area does not surround the floating control, and a boundary of the first preset area is in contact with or not in contact with a boundary of the floating control.

15. The electronic device according to claim 14, wherein a location of the first preset area changes with a change of a location of the floating control on the display.

16. The electronic device according to claim 11, wherein the operations further comprise:
  determining whether the floating control blocks content displayed in a first window, wherein the first window is a window below the floating control displayed on the display; and
  moving the floating control when determining that the duration of the eyeball gaze location in the first preset area continuously reaches the first preset duration and that the floating control blocks the content displayed in the first window, wherein the floating control is moved away from the eyeball gaze location.

17. The electronic device according to claim 16, wherein:
  if the floating control and the first window belong to a same application, the operations further comprise:
    determining whether the floating control blocks the content displayed in the first window; or
  if the floating control and the first window do not belong to a same application, the operations further comprise:
    obtaining a location area of the floating control from an application to which the floating control belongs;
    determining whether an application to which the first window belongs displays content in the location area of the floating control; and
    when determining that the application to which the first window belongs displays the content in the location area of the floating control, determining that the floating control blocks the content displayed in the first window; or
    when determining that the application to which the first window belongs does not display the content in the location area of the floating control, determining that the floating control does not block the content displayed in the first window.

18. The electronic device according to claim 16, wherein the operations further comprise:
  enabling a first function in response to a first operation of the user, wherein the first function is used to move the floating control only when the floating control blocks the displayed content, or is used to not move the floating control when the floating control does not block the displayed content.

19. The electronic device according to claim 11, wherein the operations further comprise:
  moving the floating control, wherein the first preset area no longer covers the eyeball gaze location; or
  determining whether a first blank area exists on the display, wherein the first blank area does not display content and can accommodate the floating control; and
  moving the floating control to the first blank area when determining that the first blank area exists on the display; or
  moving the floating control when determining that the first blank area does not exist on the display, so that the first preset area no longer covers the eyeball gaze location.

20. The electronic device according to claim 11, wherein the operations further comprise:
  enabling a second function in response to a second operation of the user, wherein the second function is used to move the floating control when the duration of the eyeball gaze location in the first preset area continuously reaches the first preset duration.

* * * * *

UNITED STATES PATENT AND TRADEMARK OFFICE
CERTIFICATE OF CORRECTION

| | | |
|---|---|---|
| PATENT NO. | : 12,164,759 B2 | Page 1 of 1 |
| APPLICATION NO. | : 18/006797 | |
| DATED | : December 10, 2024 | |
| INVENTOR(S) | : Liudong Xiong | |

It is certified that error appears in the above-identified patent and that said Letters Patent is hereby corrected as shown below:

On the Title Page

In Column 2 item (57) (Abstract), In Line 1, Delete "method;" and insert -- methods --.

In Column 2 item (57) (Abstract), In Line 2, Delete "device." and insert -- devices. --.

In Column 2 item (57) (Abstract), In Line 2, Delete "go" and insert -- an --.

Signed and Sealed this
Eighteenth Day of March, 2025

Coke Morgan Stewart
*Acting Director of the United States Patent and Trademark Office*